(12) United States Patent
Hageltorn et al.

(10) Patent No.: US 10,924,973 B2
(45) Date of Patent: *Feb. 16, 2021

(54) DYNAMICALLY MANAGING BAND CAPABILITY

(71) Applicant: BlackBerry Limited, Waterloo (CA)

(72) Inventors: Goran Hageltorn, Ottawa (CA); Jean-Philippe Paul Cormier, London (GB); Jeffrey William Wirtanen, Kanata (CA); Rene Faurie, Versailles (FR)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,084

(22) Filed: Jun. 2, 2017

(65) Prior Publication Data

US 2017/0289887 A1 Oct. 5, 2017

Related U.S. Application Data

(63) Continuation of application No. 14/245,490, filed on Apr. 4, 2014, now Pat. No. 9,706,442.

(30) Foreign Application Priority Data

Mar. 11, 2014 (EP) .................................... 14305351

(51) Int. Cl.
*H04W 36/00* (2009.01)
*H04W 36/20* (2009.01)
(Continued)

(52) U.S. Cl.
CPC ........... *H04W 36/20* (2013.01); *H04W 28/08* (2013.01); *H04W 28/16* (2013.01); *H04W 28/18* (2013.01);
(Continued)

(58) Field of Classification Search
CPC ... H04W 72/082; H04W 16/14; H04W 16/10; H04W 16/18
See application file for complete search history.

(56) References Cited

U.S. PATENT DOCUMENTS 6,526,279 B1 * 2/2003 Dent ................. H04W 36/0066
455/437
9,706,442 B2 * 7/2017 Hageltorn ......... H04W 36/0016
(Continued)

FOREIGN PATENT DOCUMENTS

CN 101141138 3/2008
CN 103391260 11/2013
(Continued)

OTHER PUBLICATIONS

Extended European Search Report issued in European Application No. 14305351.0 dated Oct. 21, 2014.
(Continued)

*Primary Examiner* — Khalid W Shaheed
(74) *Attorney, Agent, or Firm* — Fish & Richardson P.C.

(57) ABSTRACT

In some implementations, a method in a user equipment (UE) for dynamically managing band capacity includes communicating with a first radio access network (RAN) on a first Radio Frequency (RF) channel and a second RAN on a second RF channel, where the first RAN and the second RAN are different networks. The UE receives an indication from the first RAN (or makes a determination) to handover to a third RF channel. The UE determines that the third RF channel conflicts with the second RF channel. The UE disables an RF band including the second RF channel with the second RAN and reports updated RF Band Capabilities to one or both RANs.

14 Claims, 46 Drawing Sheets

(51) Int. Cl.
*H04W 28/18* (2009.01)
*H04W 28/08* (2009.01)
*H04W 74/04* (2009.01)
*H04W 28/16* (2009.01)
*H04W 72/04* (2009.01)
*H04W 72/08* (2009.01)
*H04W 76/27* (2018.01)
*H04W 88/06* (2009.01)

(52) U.S. Cl.
CPC ... *H04W 36/0016* (2013.01); *H04W 36/0072* (2013.01); *H04W 36/0088* (2013.01); *H04W 36/0094* (2013.01); *H04W 72/04* (2013.01); *H04W 72/0453* (2013.01); *H04W 72/08* (2013.01); *H04W 72/082* (2013.01); *H04W 74/04* (2013.01); *H04W 76/27* (2018.02); *H04W 88/06* (2013.01)

(56) References Cited

U.S. PATENT DOCUMENTS

| | | |
|---|---|---|
| 2004/0203398 A1 | 10/2004 | Durrant |
| 2008/0002638 A1* | 1/2008 | Saarela ................ H04W 88/06 370/338 |
| 2008/0075039 A1 | 3/2008 | Srinivas et al. |
| 2008/0106476 A1 | 5/2008 | Tran |
| 2009/0143095 A1* | 6/2009 | Zhang .................. H04B 1/005 455/552.1 |
| 2010/0075689 A1* | 3/2010 | Uemura ............ H04W 52/0206 455/452.1 |
| 2010/0118752 A1 | 5/2010 | Suzuki et al. |
| 2012/0213148 A1* | 8/2012 | Saito .................. H04B 7/15542 370/315 |
| 2012/0287815 A1 | 11/2012 | Attar |
| 2013/0029588 A1 | 1/2013 | Bienas et al. |
| 2013/0303235 A1 | 11/2013 | Zheng et al. |
| 2014/0016498 A1* | 1/2014 | Sharma ................ H04W 16/14 370/252 |
| 2014/0141776 A1 | 5/2014 | Ko |
| 2014/0243039 A1* | 8/2014 | Schmidt .................. H04W 4/90 455/552.1 |
| 2014/0355567 A1* | 12/2014 | Irmer .................... H04W 16/14 370/331 |
| 2015/0181566 A1* | 6/2015 | Stopler ............. H04W 72/0413 370/329 |

FOREIGN PATENT DOCUMENTS

| | | |
|---|---|---|
| CN | 102123466 | 1/2014 |
| EP | 2605604 | 6/2013 |
| WO | 01/11913 | 2/2001 |

OTHER PUBLICATIONS

Communication Pursuant to Article 94(3) EPC issued in European Application No. 14305351.0 dated Aug. 18, 2017; 4 pages.
Chinese Office Action in Chinese Application No. 201410185109.7, dated Dec. 29, 2017, 8 pages.
Communication Under Rule 71(3) EPC issued in European Application No. 14305351.0 dated Dec. 7, 2018, 87 pages.
Chinese Office Action in Chinese Application No. 201410185109.7 dated Jul. 20, 2018, 4 pages.
Extended European Search Report issued in European Application No. 19167624.6 dated Jun. 8, 2019, 22 pages.

* cited by examiner

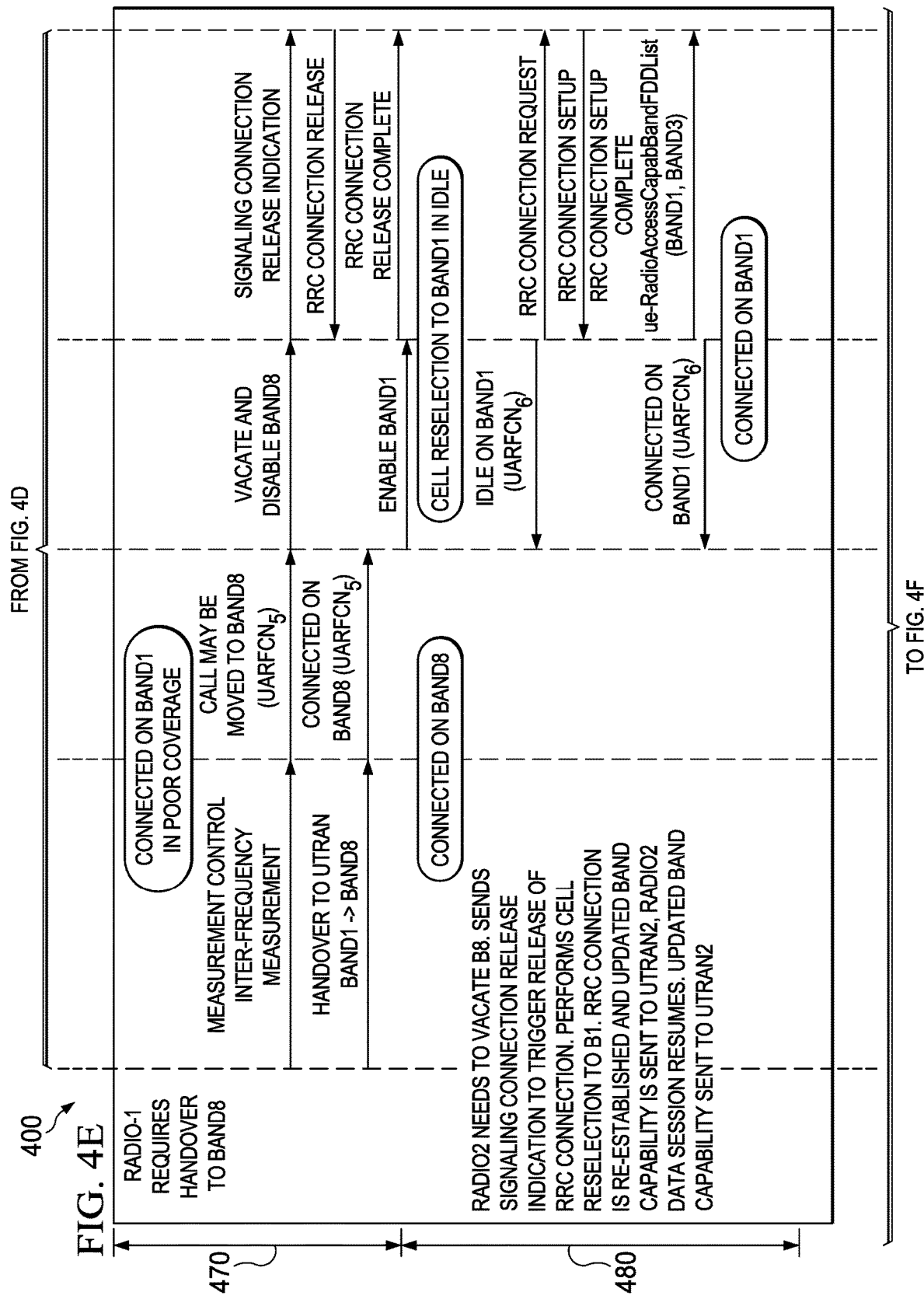

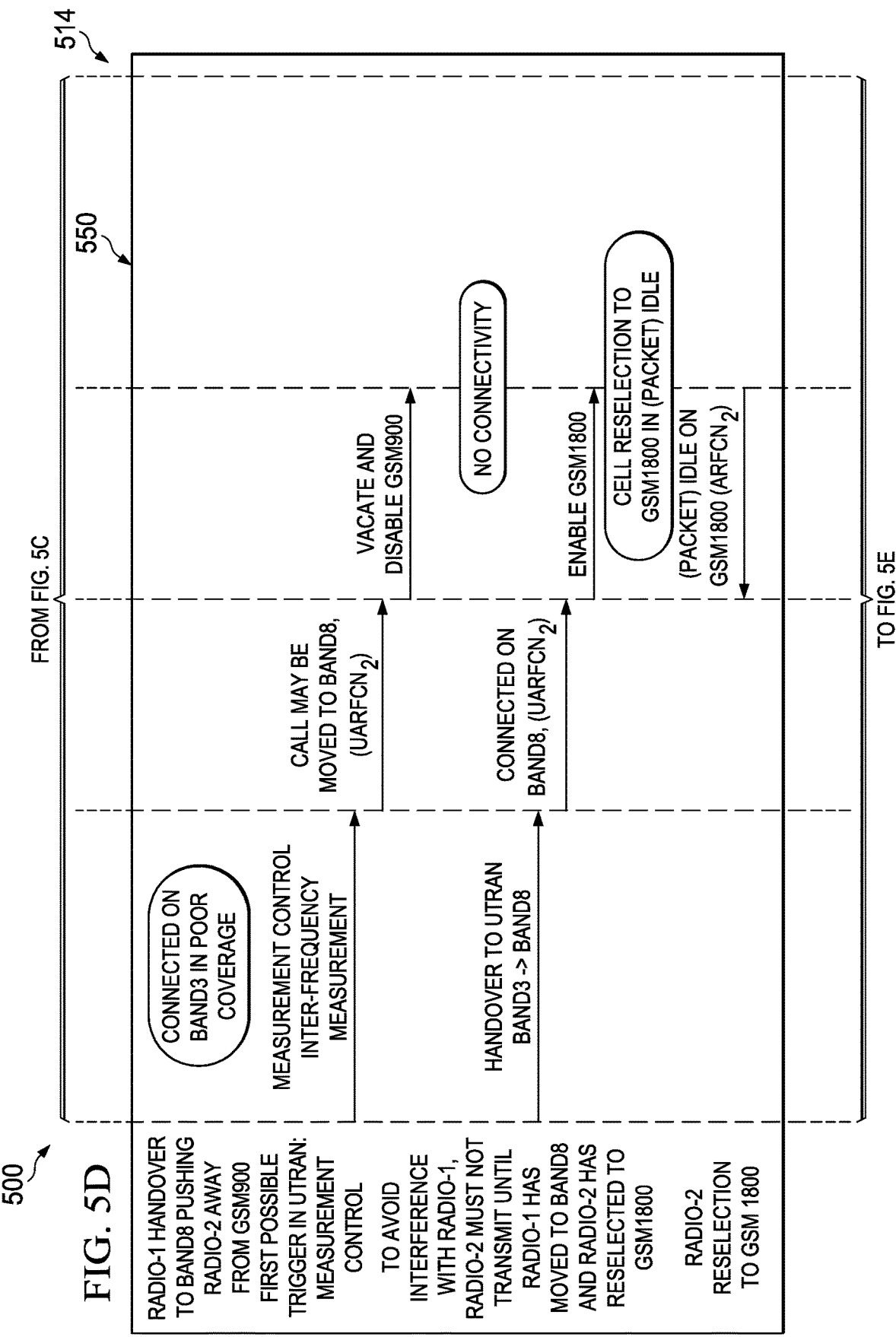

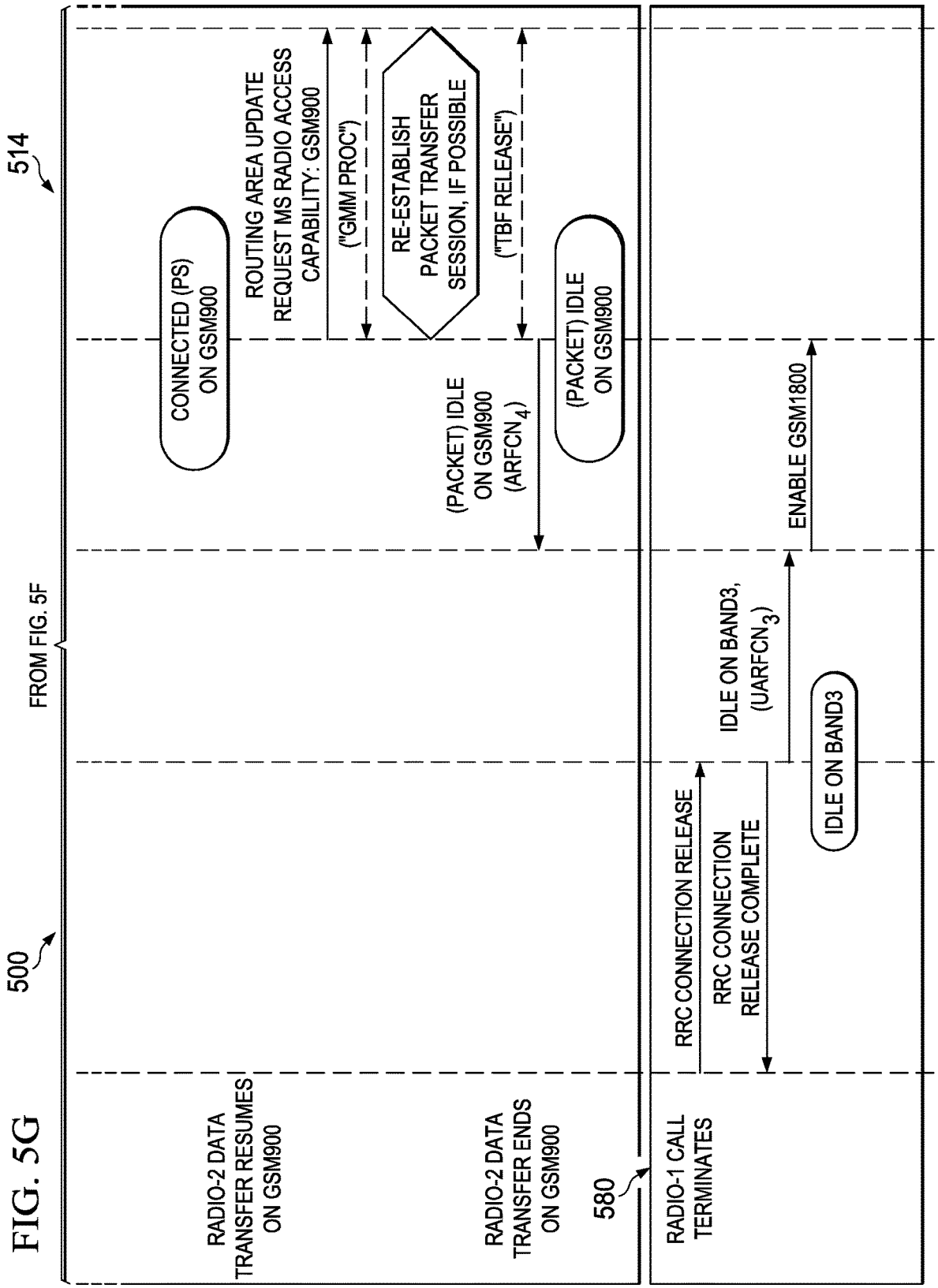

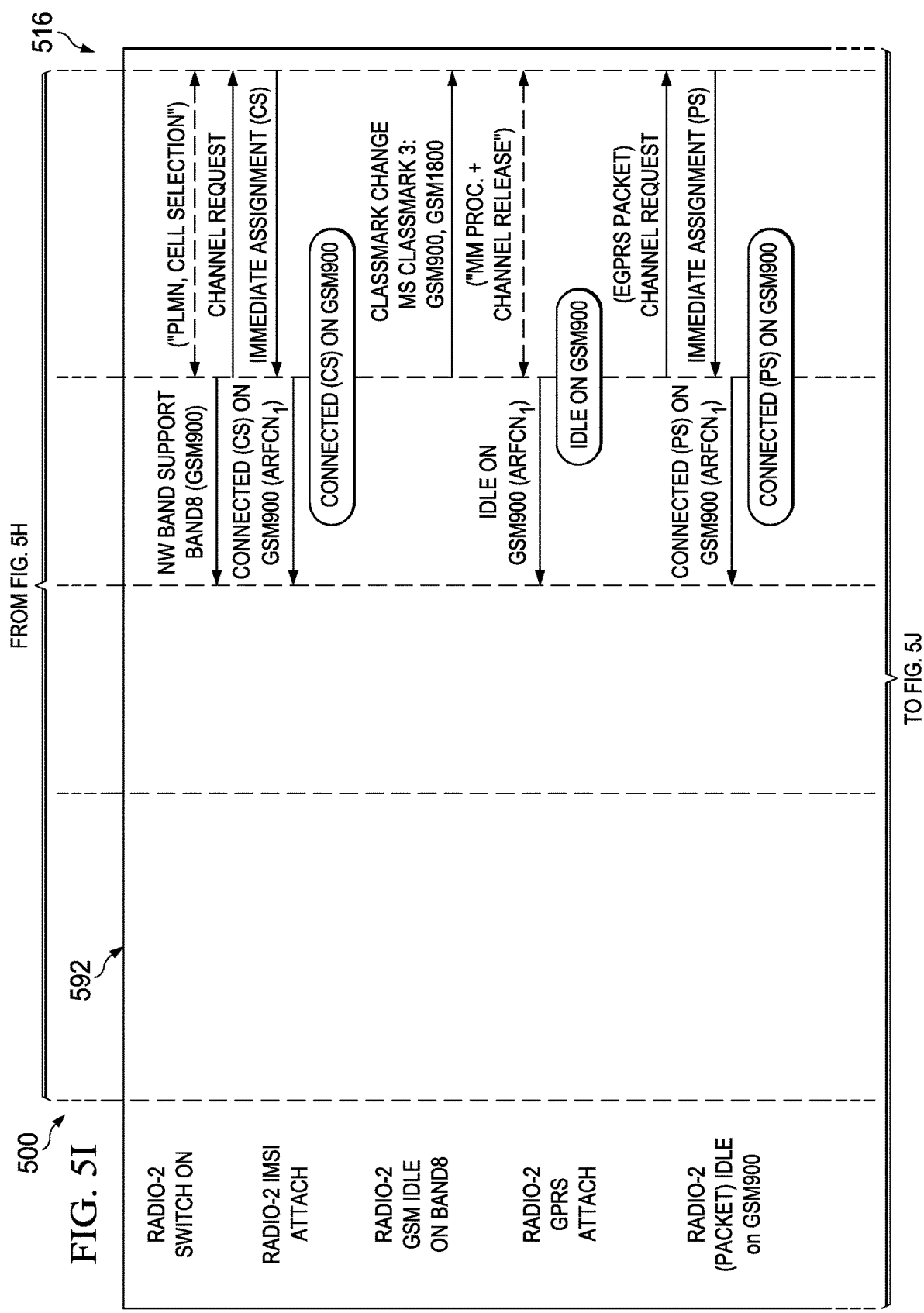

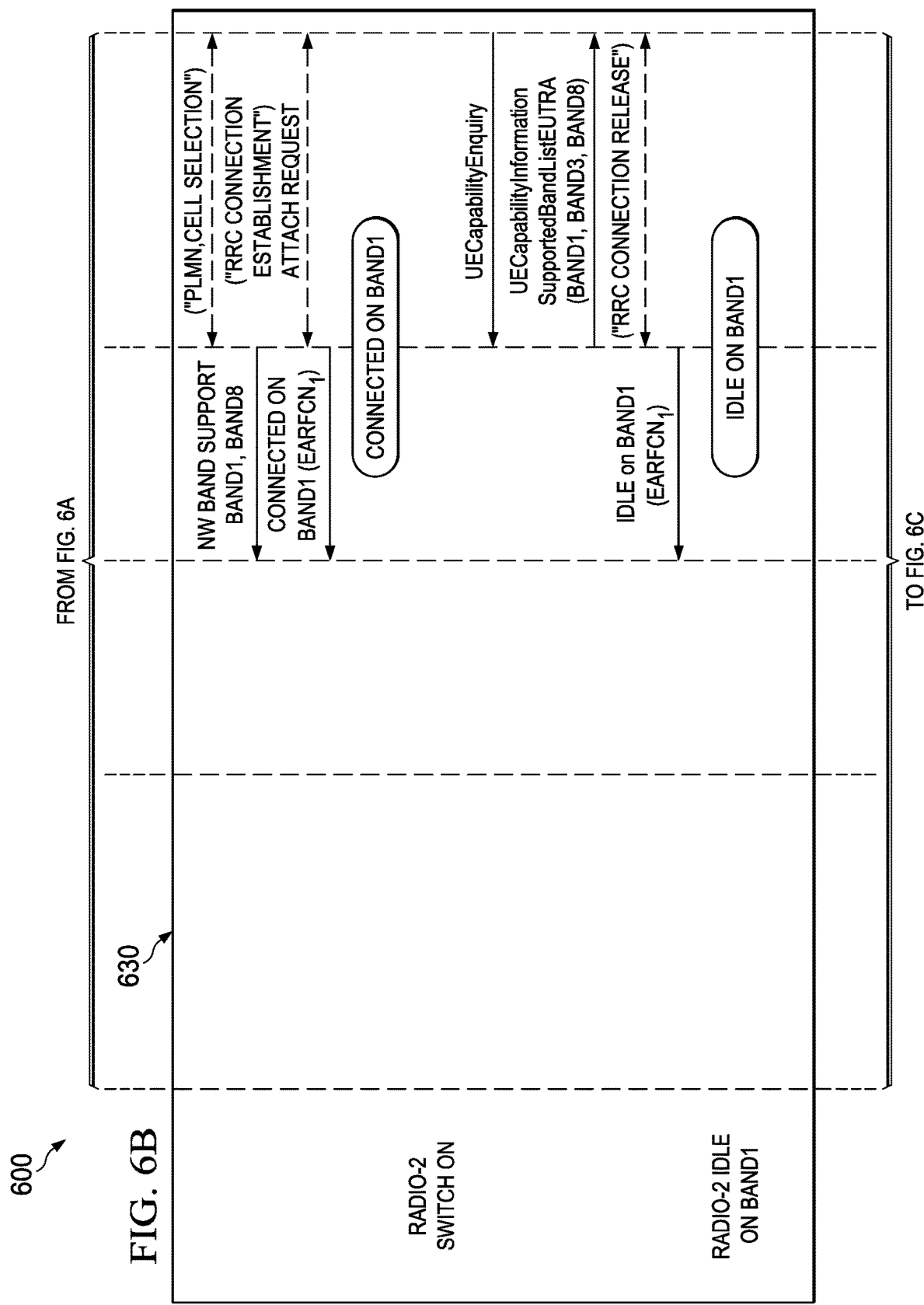

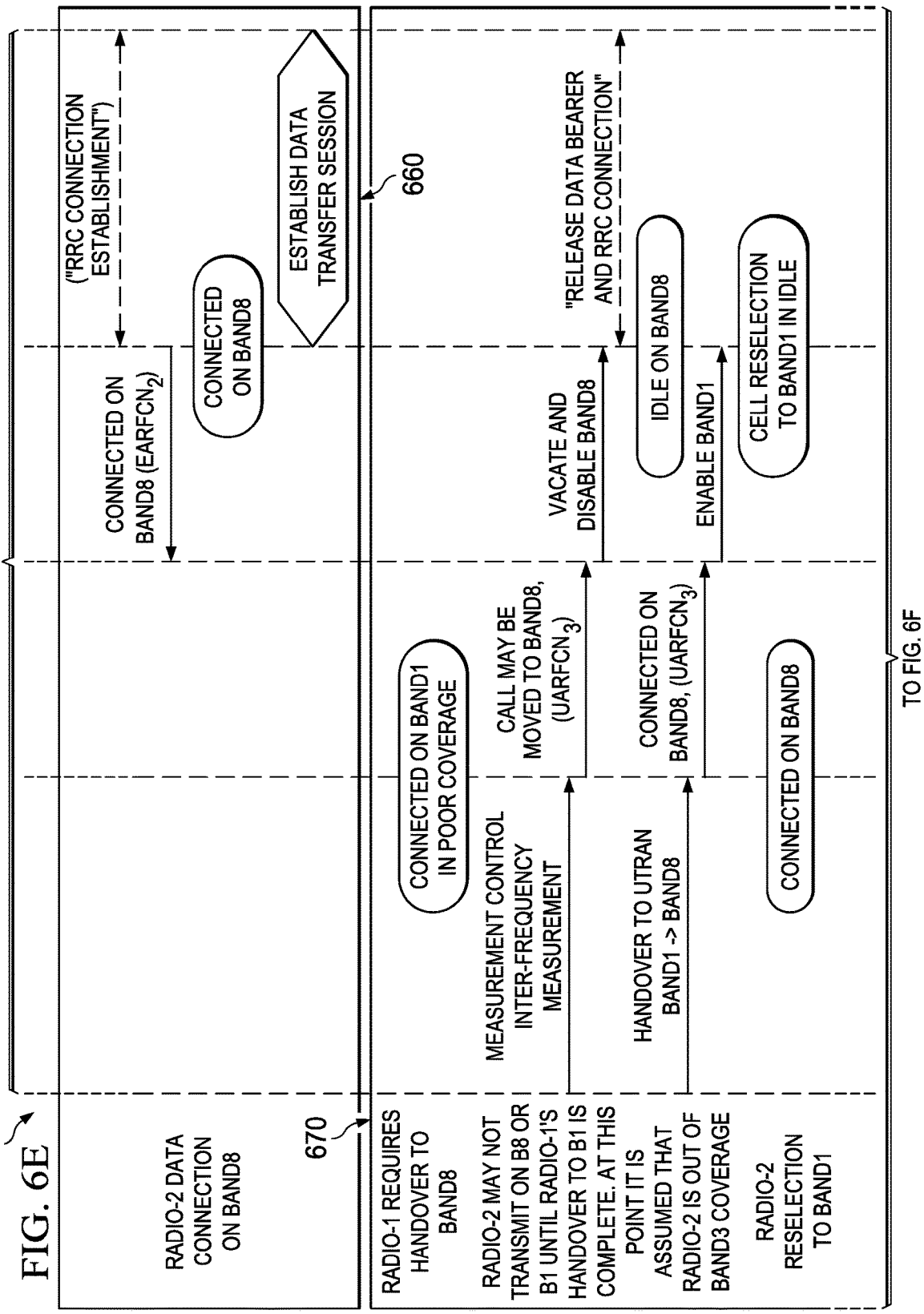

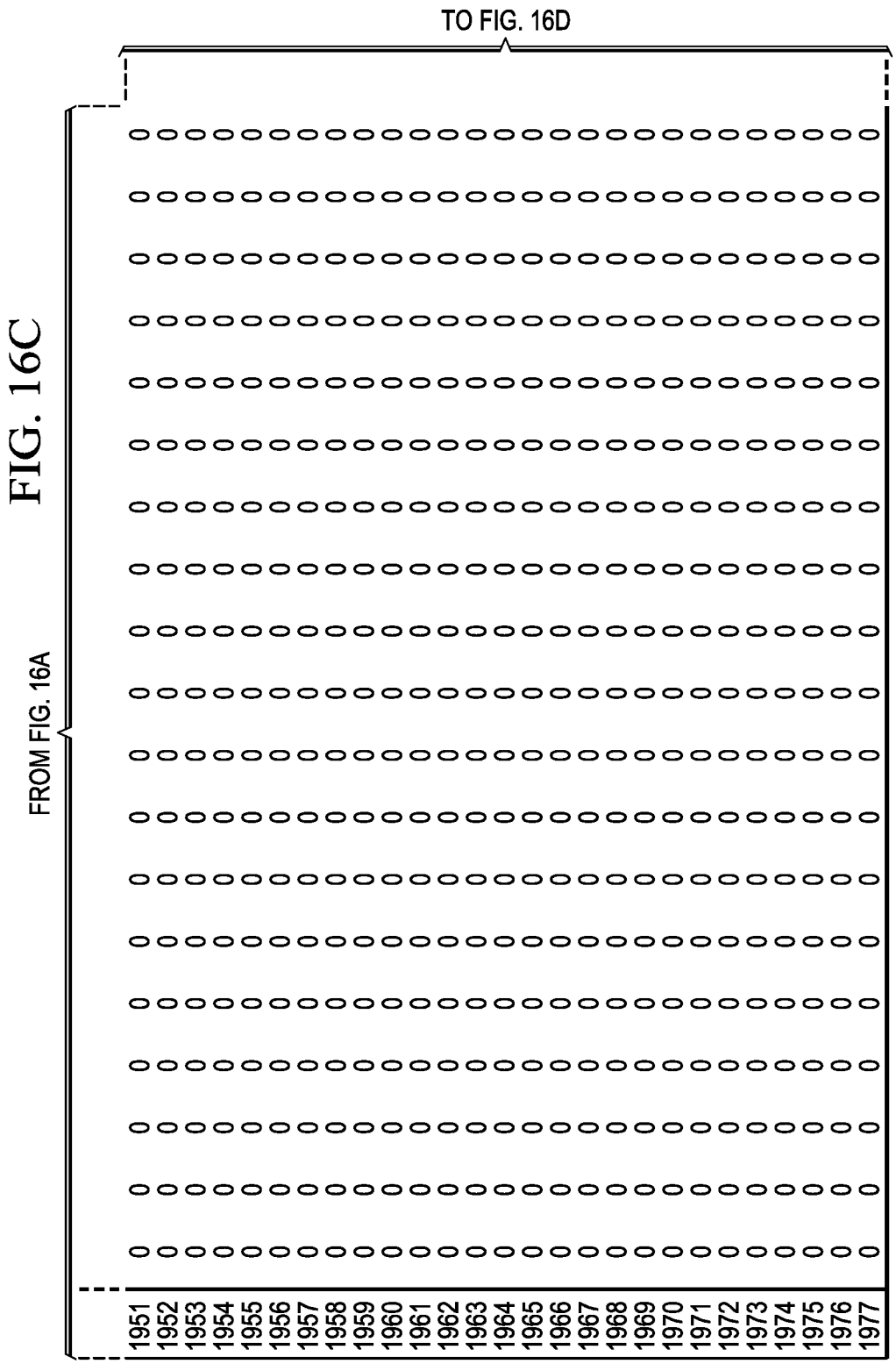

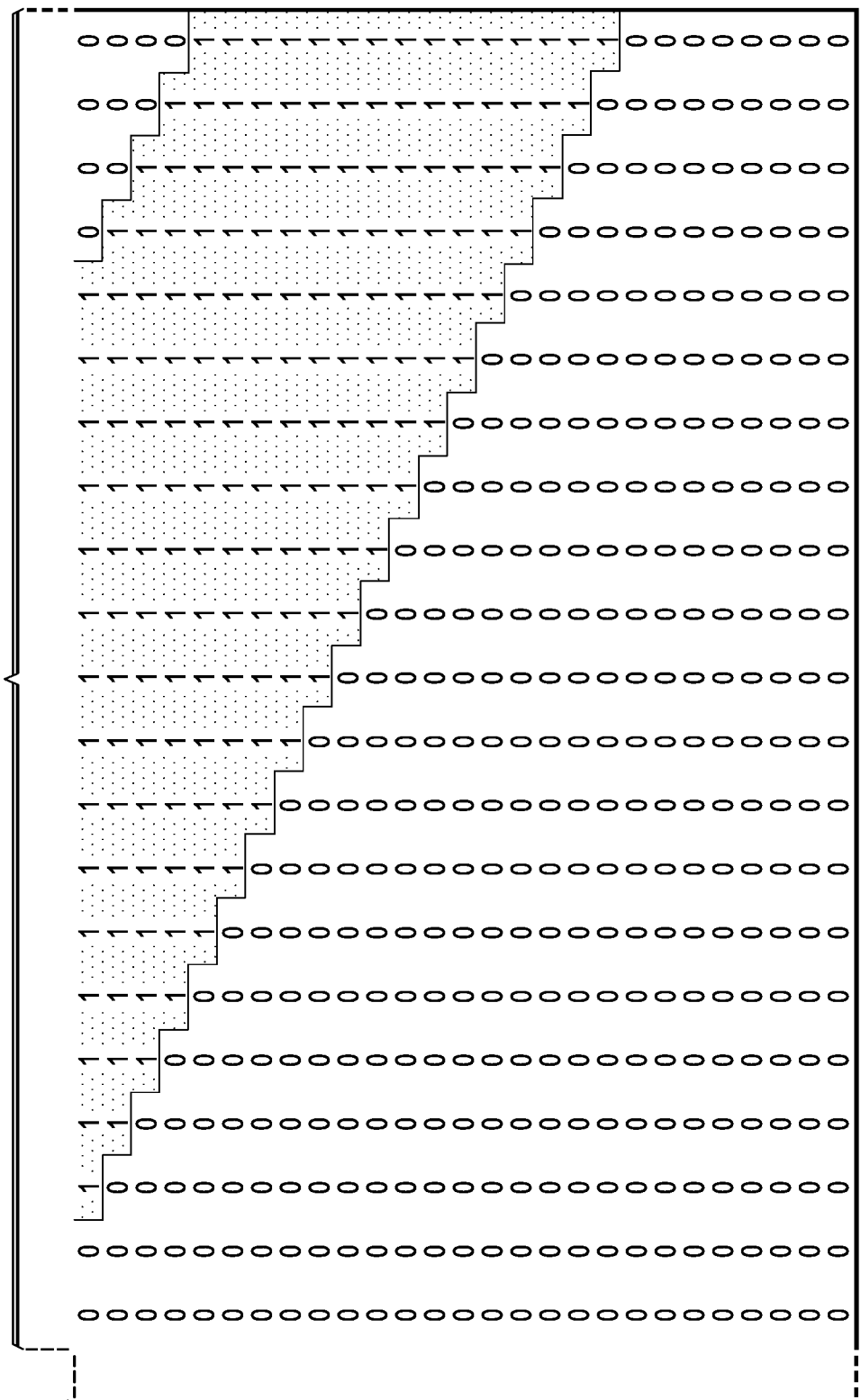

DYNAMICALLY MANAGING BAND CAPABILITY

CLAIM OF PRIORITY

This application is a continuation of U.S. application Ser. No. 14/245,490, filed Apr. 4, 2014, which claims priority under 35 USC § 119 to European Patent Application No. 14305351.0, filed on Mar. 11, 2014, the entire contents of which are hereby incorporated by reference.

TECHNICAL FIELD

This invention relates to dynamically managing band capability.

BACKGROUND

A Dual SIM Dual Active (DSDA) capable user equipment (UE) may access two Radio Access Networks (RANs) at the same time. For example, the UE may enter into an active (or connected) state with a first RAN and communicate with the first RAN using a first radio interface. At the same time, the UE may enter into an active (or connected) state with a second RAN and communicate with the second RAN using a second radio interface. In some instances, the two radio interfaces in the UE may create interference with each other. For example, the active transmission of the first radio interface may create interference that reduces the receiver performance of the second radio interface. This type of interference may be severe when the two radio interfaces are operating within the same frequency band. Even if they are operating in different bands, the interference may still be significant if they are operating in certain band combinations.

DESCRIPTION OF DRAWINGS

FIGS. 4A-4F are an example data flow diagram for dynamically managing band capability between UMTS Terrestrial Radio Access Networks (UTRANs).

FIGS. 5A-5K are example data flow diagrams for dynamically managing band capability between a GSM EDGE Radio Access Network (GERAN) and a UTRAN.

FIGS. 6A-6G are an example data flow diagram for dynamically managing band capability between an Evolved UMTS Terrestrial Radio Access Network (EUTRAN) and a UTRAN.

FIGS. 16A-16D are an example channel conflict table for a UTRAN operating in Band1 with 5 MHz channel bandwidth, a UTRAN operating in Band4 with 5 MHz channel bandwidth, and 2 MHz guard band.

DETAILED DESCRIPTION

The present disclosure is directed to dynamically managing band capability. As previously mentioned, DSDA-capable UEs may communicate with two RANs at the same time, so the UE may manage its band capability to prevent or otherwise reduce interference between two RF channels. In some implementations, the UE may manage the band capability statically. For example, the UE may divide the supported frequency bands into non-overlapping subsets. In these instances, each subset includes the frequency bands that do not interfere with the frequency bands in other subsets. The UE reports the non-overlapping subsets to the RANs, and, consequently, communicate with RANs on the RF channels within the frequency bands in one subset. Two different RANs may select RF channels that do not interfere with each other based on the reported non-overlapping sub sets.

Figure 1:
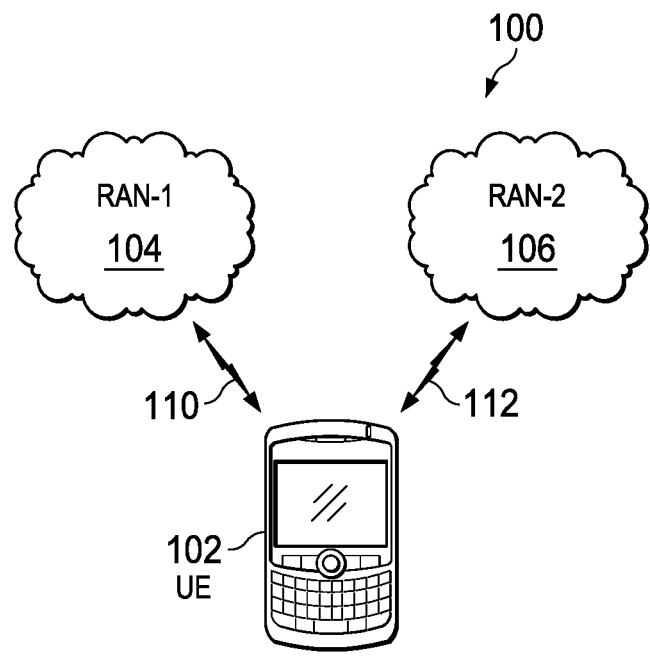
FIG. 1 is a schematic of an example mobile communication system for dynamically managing band capability.

Alternatively or in combination, a UE may manage band capability dynamically. FIG. 1 is a schematic illustrating an example mobile communication system 100 for dynamically managing band capability. For example, in a mobile communication system, a DSDA-capable UE may communicate with a first RAN on a first RF channel and with a second RAN on a second RF channel, where the first RAN is different than the second RAN. In some embodiments the first and second RAN may be a shared RAN and in some embodiments the first RAN and the second RAN may be the same. The UE may receive an indication from the first RAN to handover to a third RF channel. The UE may determine whether the third RF channel conflicts with the second RF channel. If the third RF channel conflicts with the second RF channel, the UE may disable the band that includes the second RF channel with the second RAN. In some implementations, the UE may transmit a signaling connection release indication to the second RAN to release the radio resources on the band that includes the second RF channel.

The UE may use a Radio Resource Control (RRC) message to transmit the signaling connection release indication to the second RAN. The UE may indicate to the second RAN, by using an RRC Connection Setup Complete message or any other relevant signaling means, that the UE does not support the band which includes the second RF channel. The UE may then select a fourth RF channel on a band other than the disabled band. The UE may re-establish connection with the second RAN on the fourth RF channel. The UE may dynamically report its RF capability to the second RAN to exclude the disabled band.

In some implementations, a DSDA-capable UE may monitor a first RAN on a first RF channel and a second RAN on a second RF channel, where the first RAN may be different from the second RAN but may also be the same as the second RAN or shared with the second RAN. The UE may determine that the first RF channel conflicts with the second RF channel. The UE may receive an indication from the first RAN to establish an RRC Connection on the first RF channel. The UE may disable the band including the second RF channel with the second RAN. For example, the UE may perform a cell reselection procedure to select a band that is different than the disabled band. The UE may continue to monitor the second RAN on a third RF channel in the new band. During the cell reselection procedure, the UE may also inform the second RAN about the new selected band.

Dynamically managing band capability may provide one or more advantages. For example, dynamic management of band capability does not impose hardware limitations on band support for each radio interface to handle DSDA operations. A DSDA-capable UE may configure its radio interfaces to include identical frequency band capability for each RAN. This approach may provide greater flexibility for each radio to make use of available frequency bands and may improve network coverage and handover performances. The advantage of this solution is that today's RANs have multiple RF layers, so by forfeiting one band the radio interface doesn't forfeit service since it can make use of the other layers of the network RF layers to maintain service.

At a high level, the example mobile communication system 100 includes a DSDA-capable UE 102, a RAN-1 104 communicably coupled with the UE 102 on a RF channel 110, and a RAN-2 106 communicably coupled with the UE 102 on a RF channel 112. The UE 102 can include any hardware, software, firmware, or combination thereof to dynamically manage band capability. In the illustrated implementation, the UE 102 communicates with the RAN-1 104 on the RF channel 110 and communicates with the RAN-2 106 on the RF channel 112. In some instances, the UE 102 may receive a request from the RAN-1 104 to handover to a third RF channel. The UE may determine that the third RF channel conflicts with the RF channel 112 and may then disable the band including the RF channel 112 with the RAN-2 106. If the radio interface is on a UTRAN RAN, the UE may release the radio resources by sending a signaling connection release indication to the RAN-2 106. The UE may transmit the signaling connection release indication using a Radio Resource Control (RRC) message. FIGS. 3A-3E and associated descriptions provide additional details of these implementations.

Turning to a general description of the elements, the UE 102 may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102 may include a device and several removable memory modules, such as a Universal Integrated Circuit Card (UICC) that includes a Subscriber Identity Module (SIM) application, a Universal Subscriber Identity Module (USIM) application, or a Removable User Identity Module (R-UIM) application. The memory module may not be removable such as an embedded secure element (eSE) or a soft or software SIM. The term "UE" can also refer to any hardware or software component that can terminate a communication session for a user. In addition, the terms "user equipment," "UE," "user equipment device," "user agent," "UA," "user device," and "mobile device" can be used synonymously herein. The UE could be a Simultaneous Voice and LTE (SVLTE) device where the first radio uses the CDMA standard and the second radio uses the LTE standard. The UE could be a Simultaneous GSM and LTE (SGLTE) device where the first radio uses the GSM standard and the second radio uses the UMTS or LTE standards. Other combinations are possible where the each of the first and second radios could support one or more of 3GPP and 3GPP2 wireless communications standards, including but not limited to: GSM, UMTS, LTE-FDD, LTE-TDD, 1×RTT, EV-DO and TD-SCDMA.

A RAN (e.g., the RAN-1 104 or the RAN-2 106) is part of a mobile communication system which implements a radio access technology (RAT), such as GSM, UMTS, and LTE. For example, a RAN included in an LTE telecommunication system is called an Evolved UMTS Terrestrial Radio Access Network (EUTRAN). Similarly, a RAN included in a GSM EDGE telecommunication system is called a GSM EDGE Radio Access Network (GERAN), and a RAN included in a UMTS telecommunication system is called a UMTS Terrestrial Radio Access Network (UTRAN). A RAN can provide radio interface within their coverage area or a cell for the UEs to communicate. A RAN directly communicates with one or more UEs, other RANs, and the core network. In some implementations, the RAN-1 104 and the RAN-2 106 may comprise the same type of RAT or different types of RATs.

Figure 2:
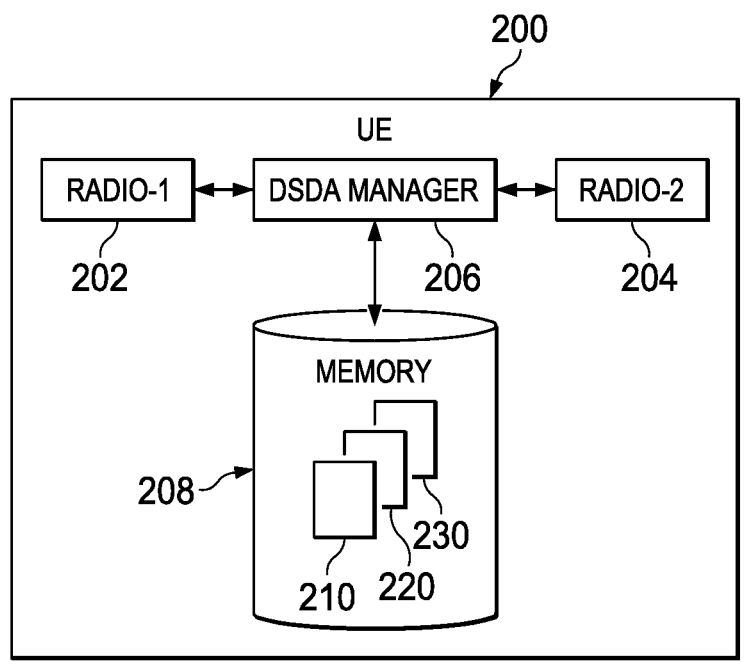
FIG. 2 is a schematic illustrating an example user equipment (UE) for dynamically managing band capability.
Figure 3A:
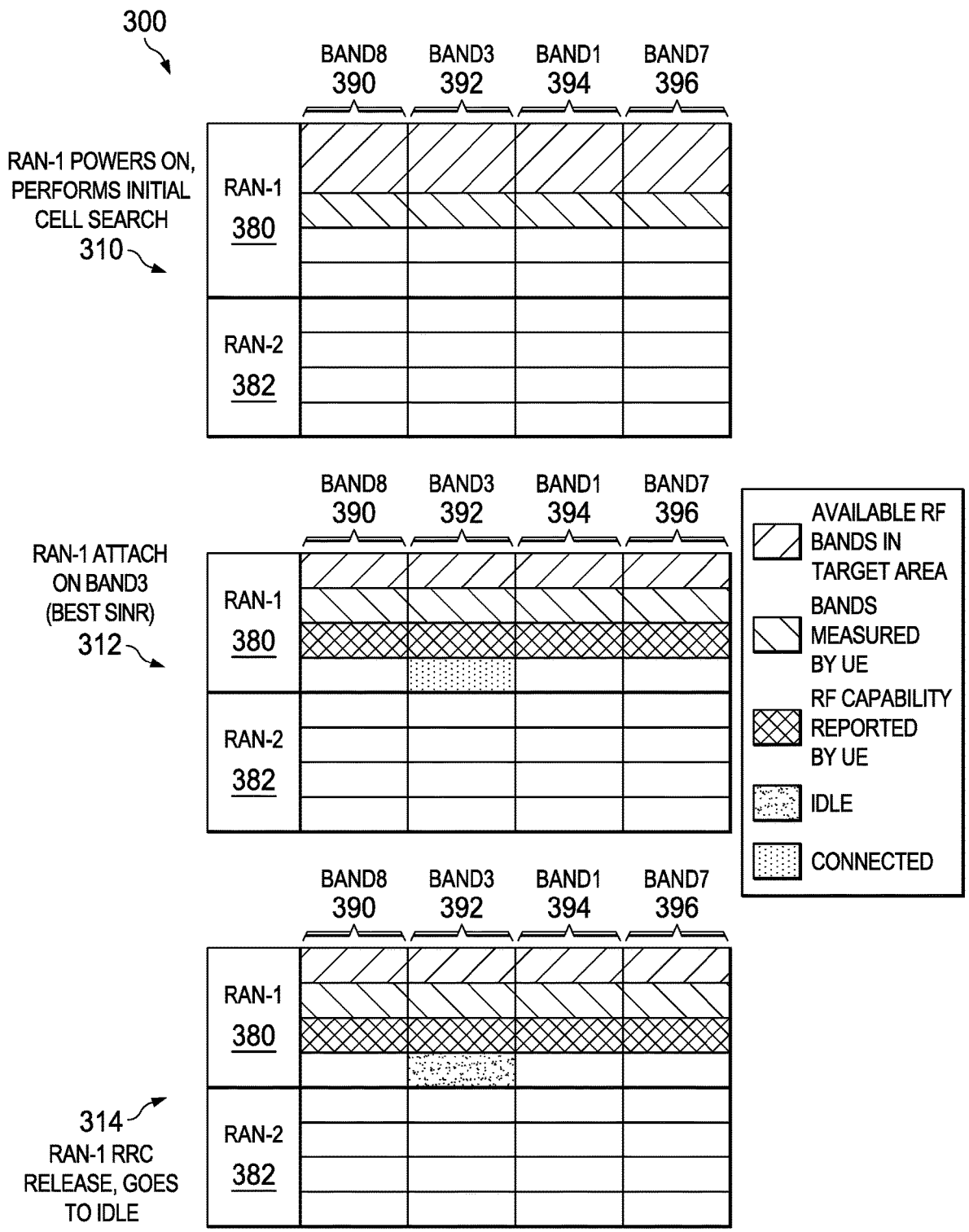
FIGS. 3A-3E are a schematic illustrating step actions for dynamically managing band capability.
Figure 3B:
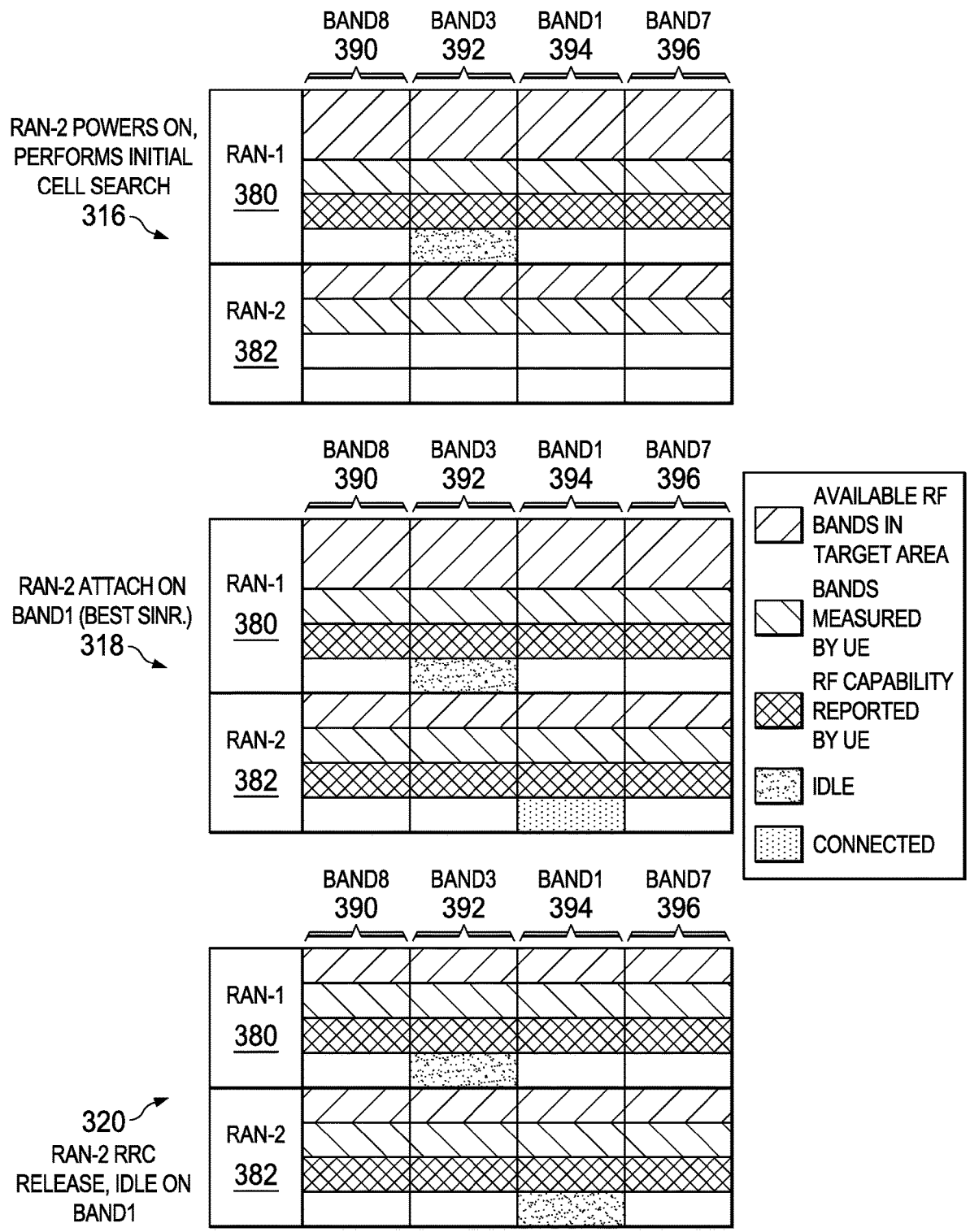
Figure 3C:
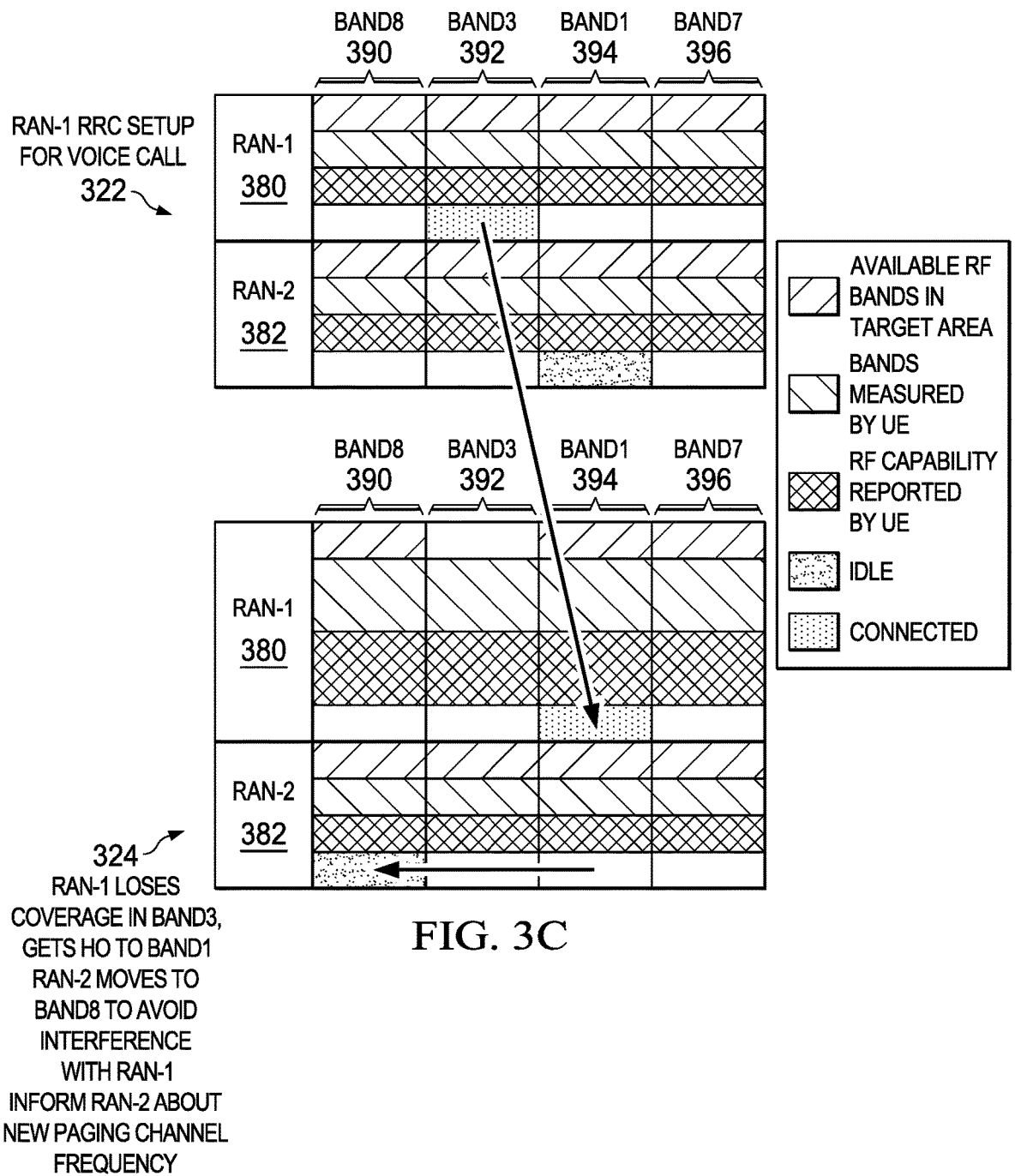
Figure 3D:
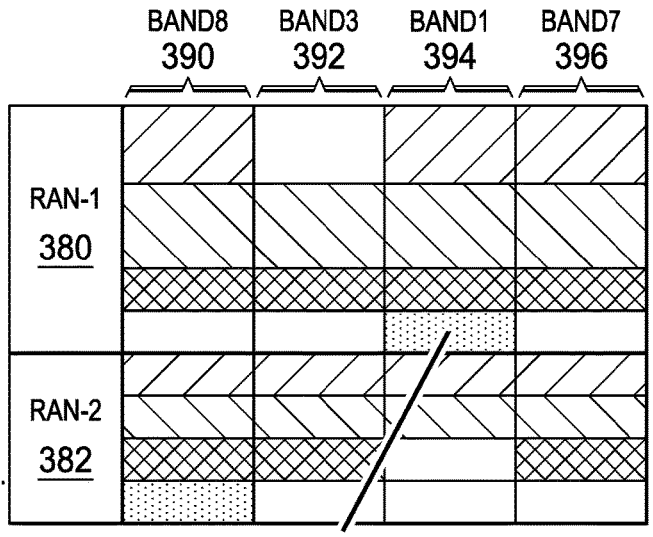
Figure 3D:
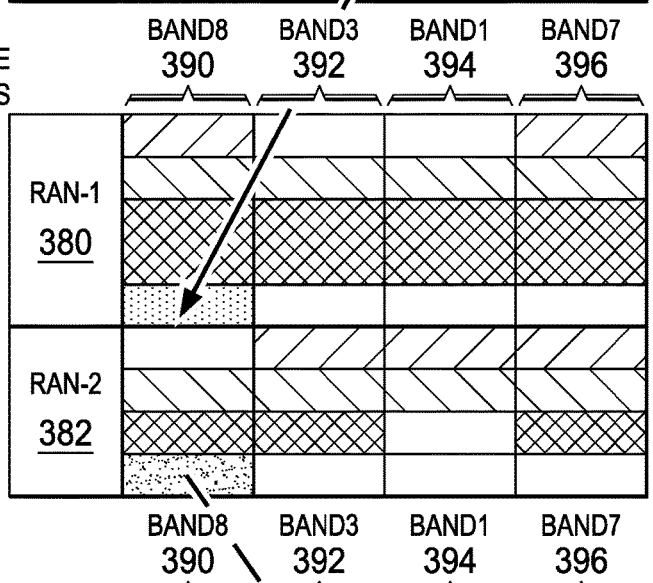
Figure 3D:
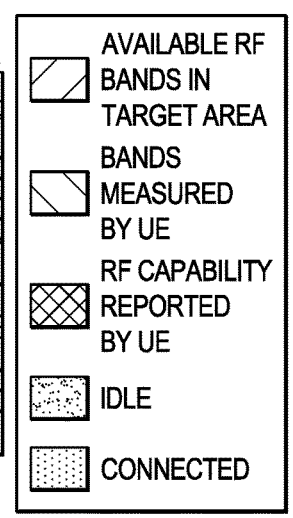
Figure 3D:
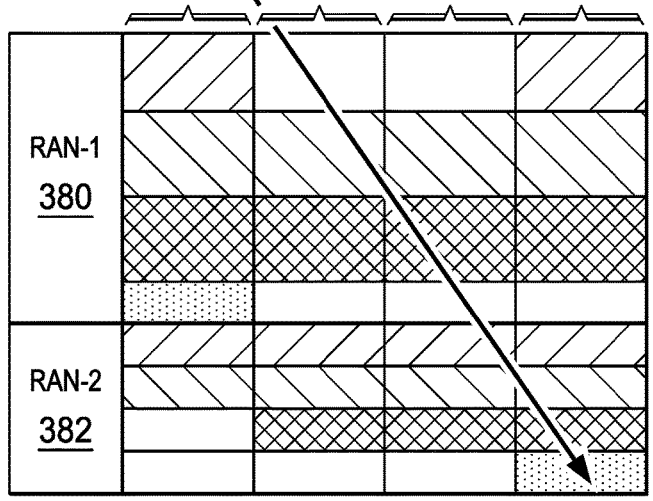
Figure 3E:
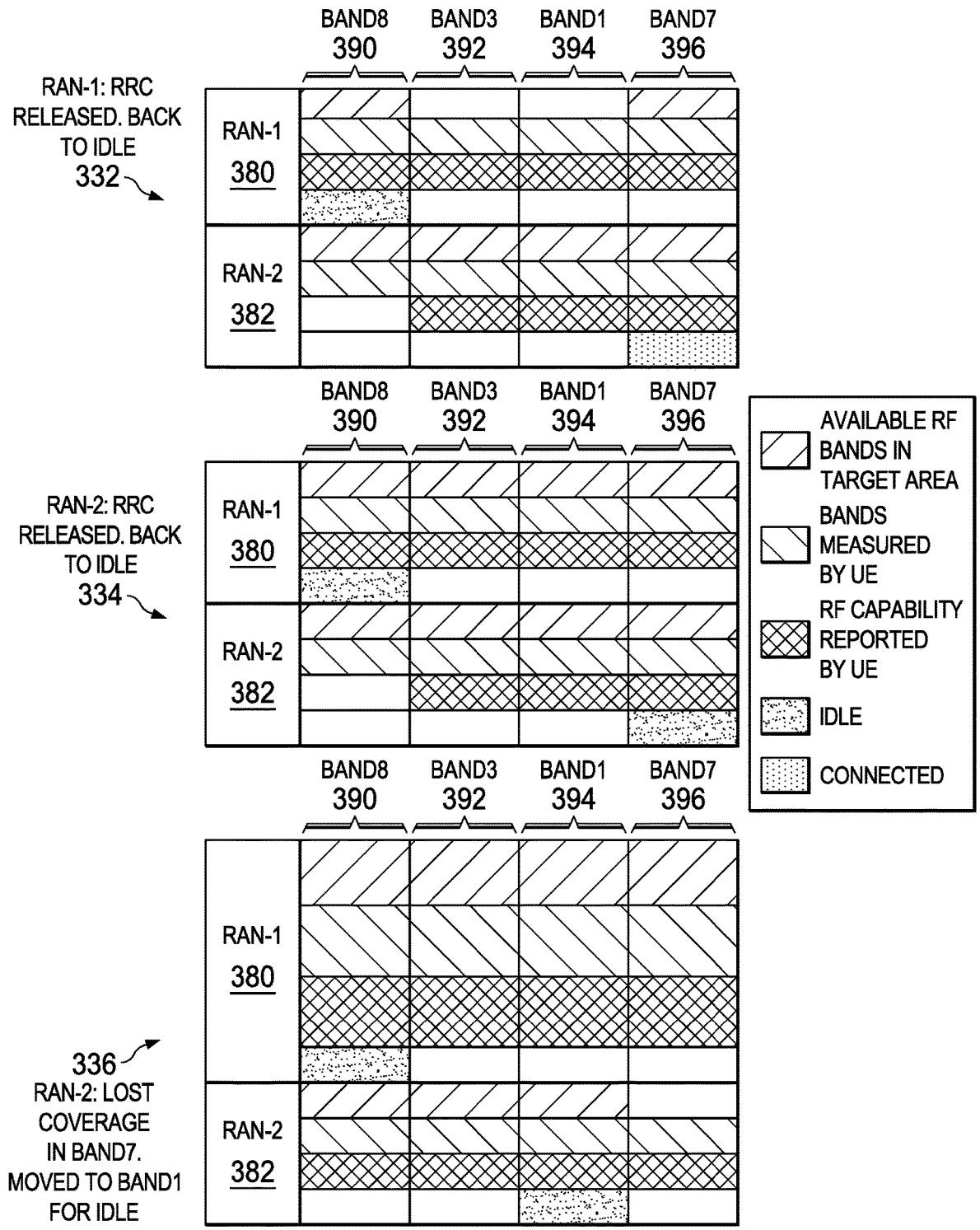
Figure 4A:
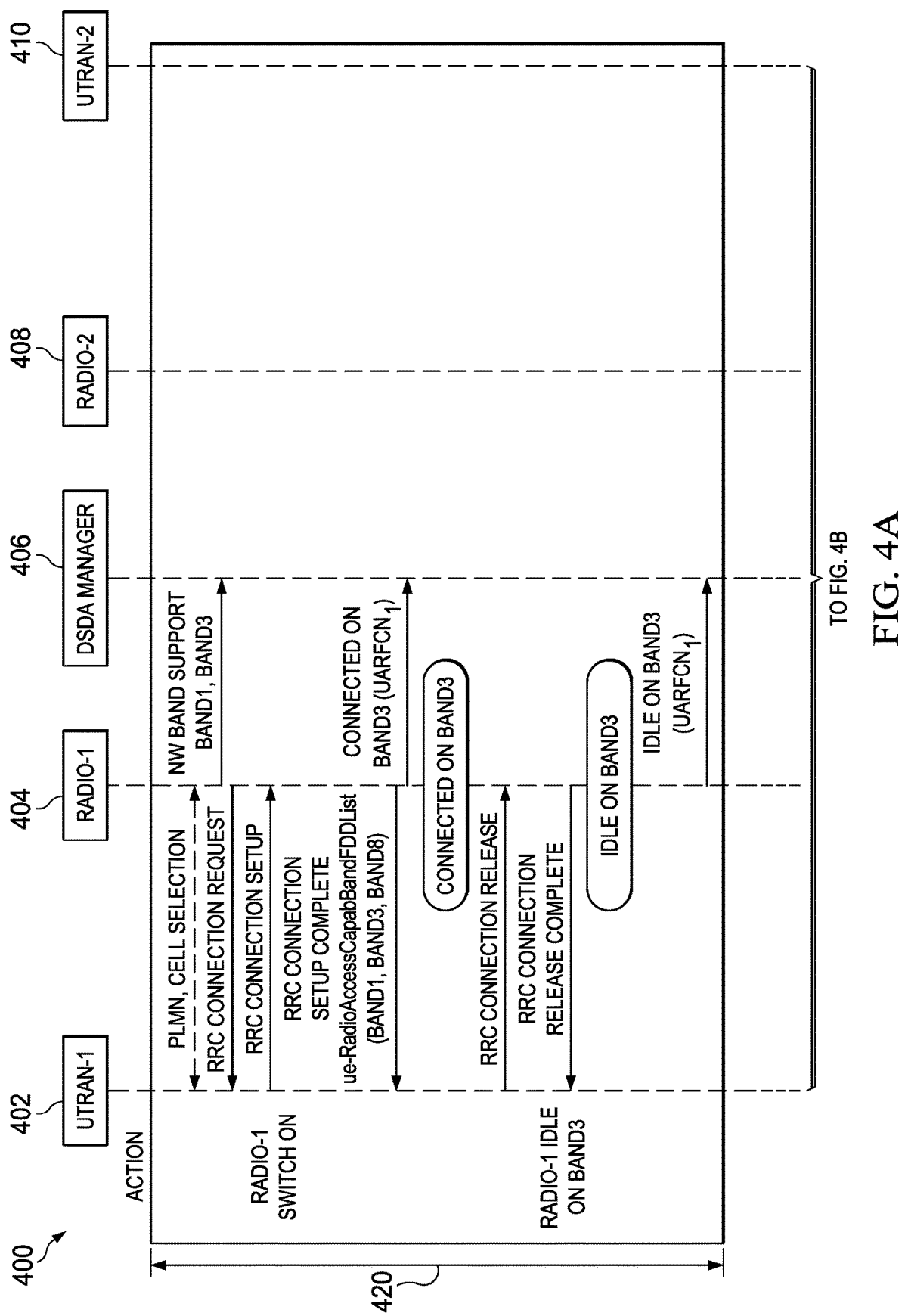
Figure 4B:
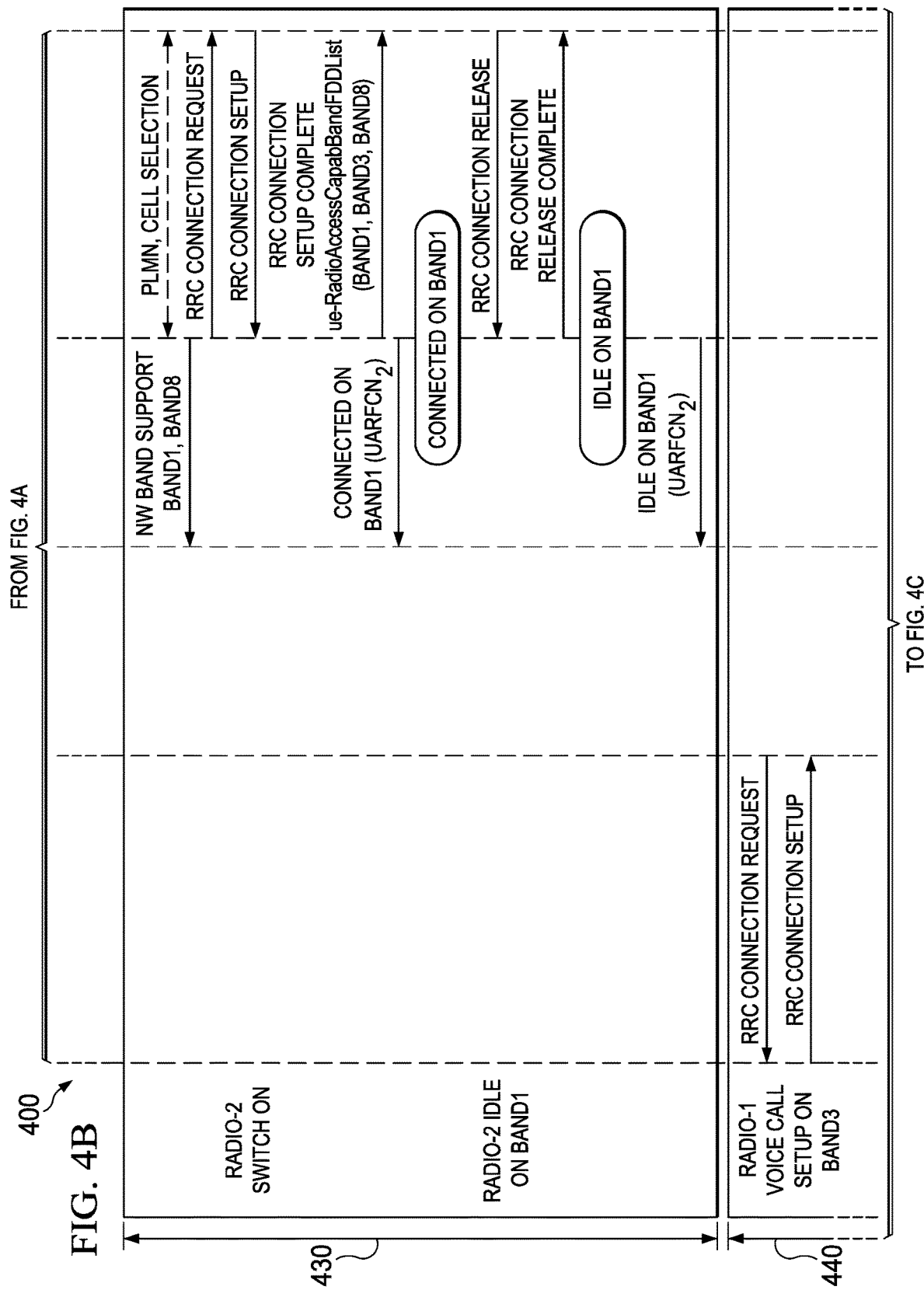
Figure 4C:
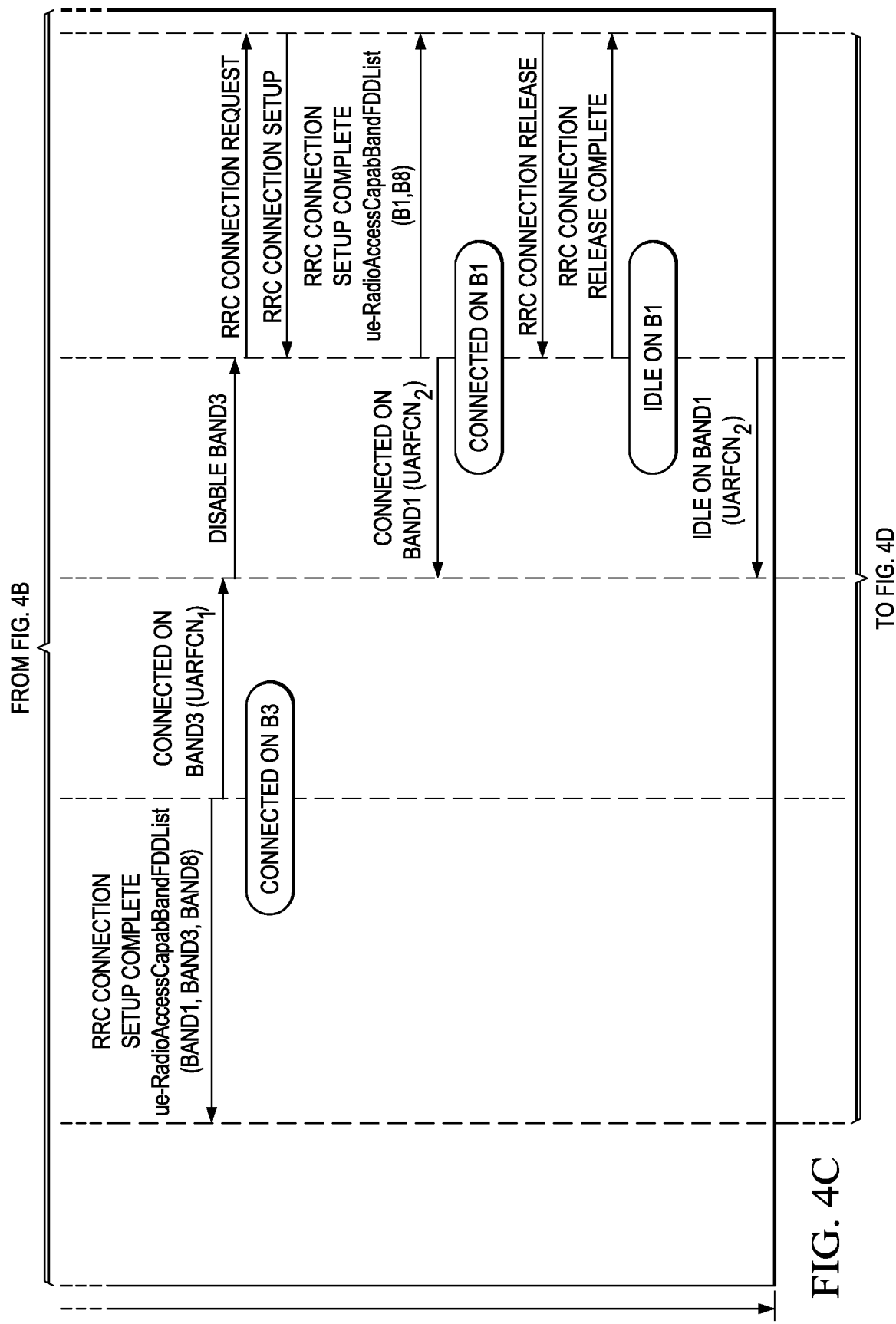
Figure 4D:
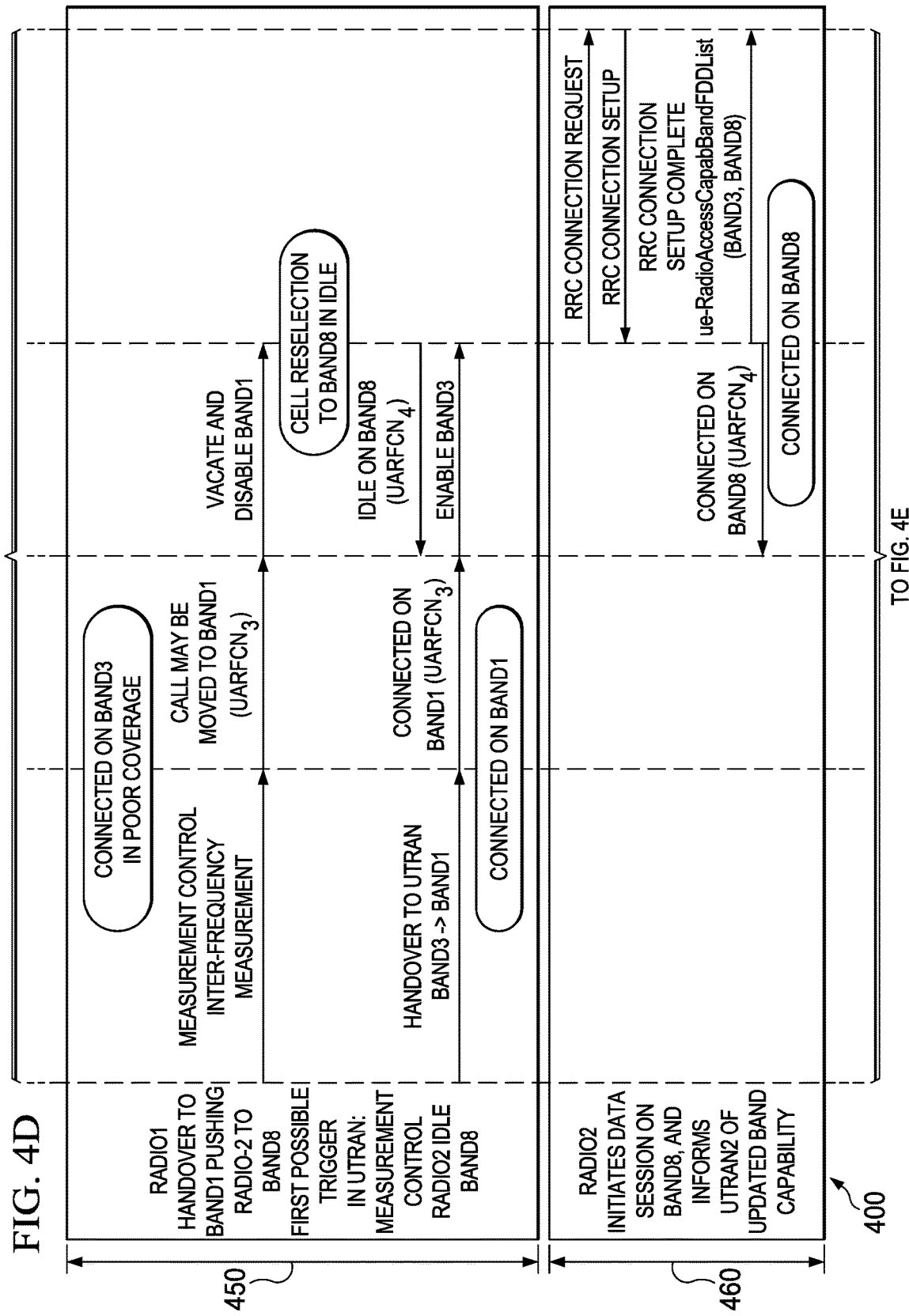
Figure 4F:
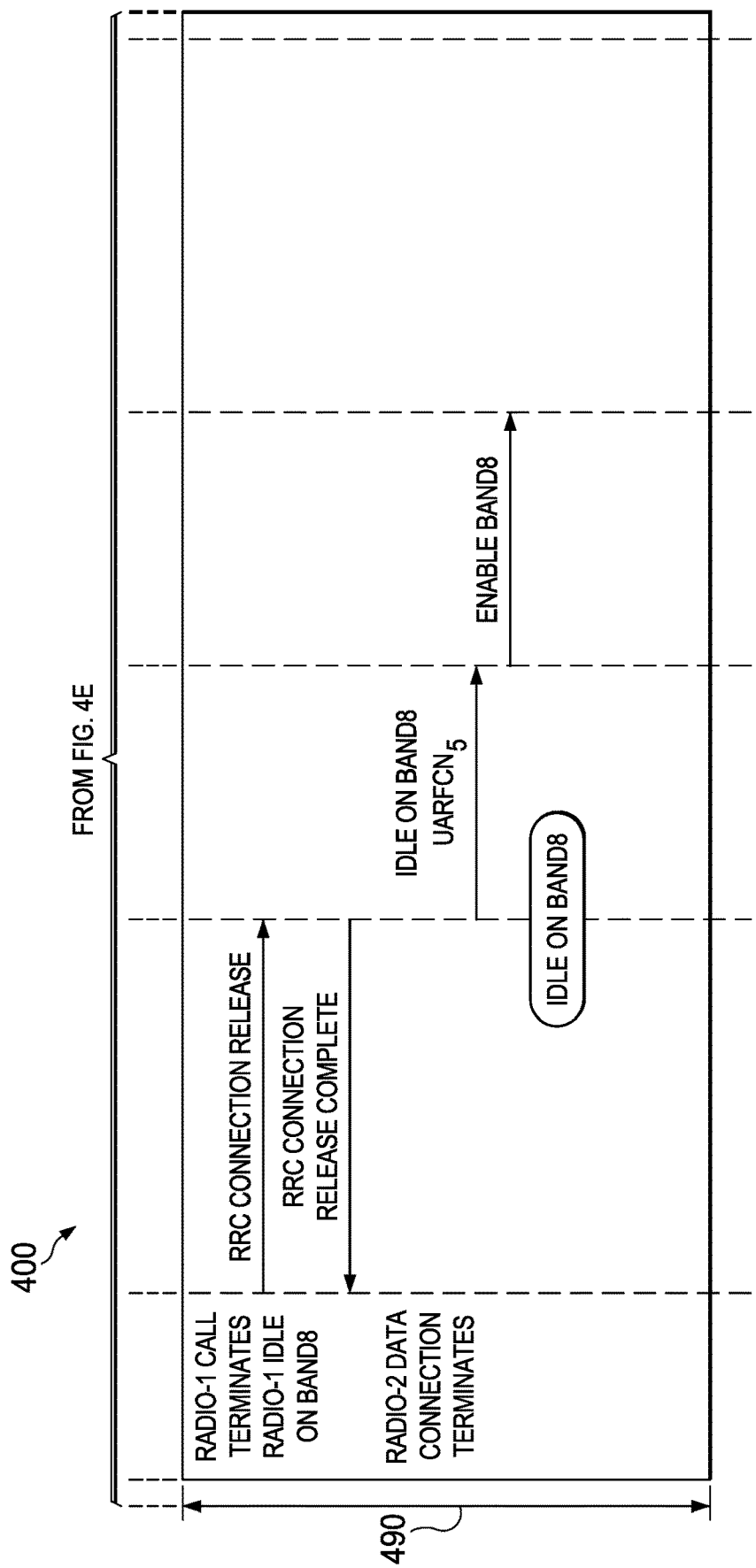
Figure 5A:
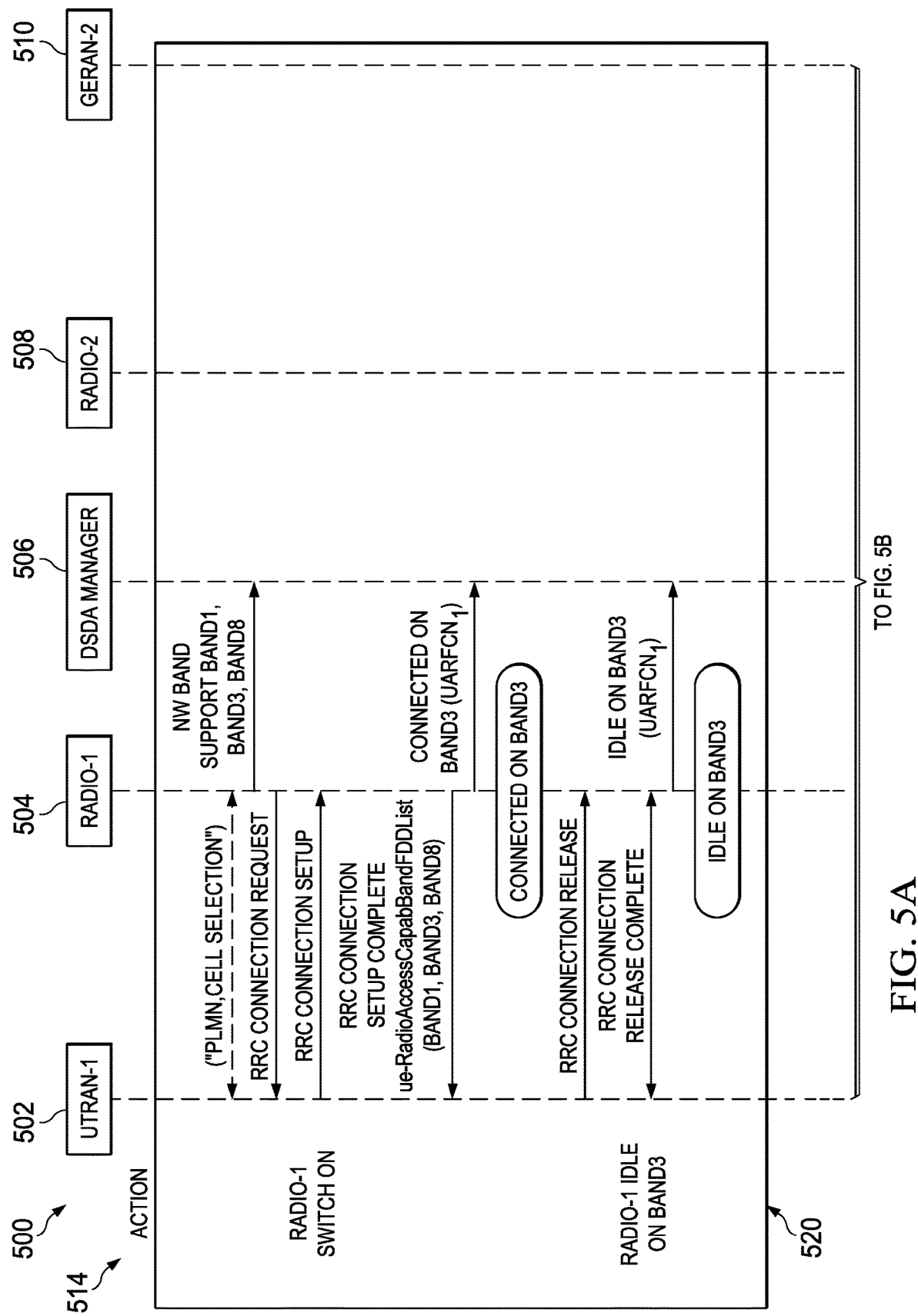
Figure 5B:
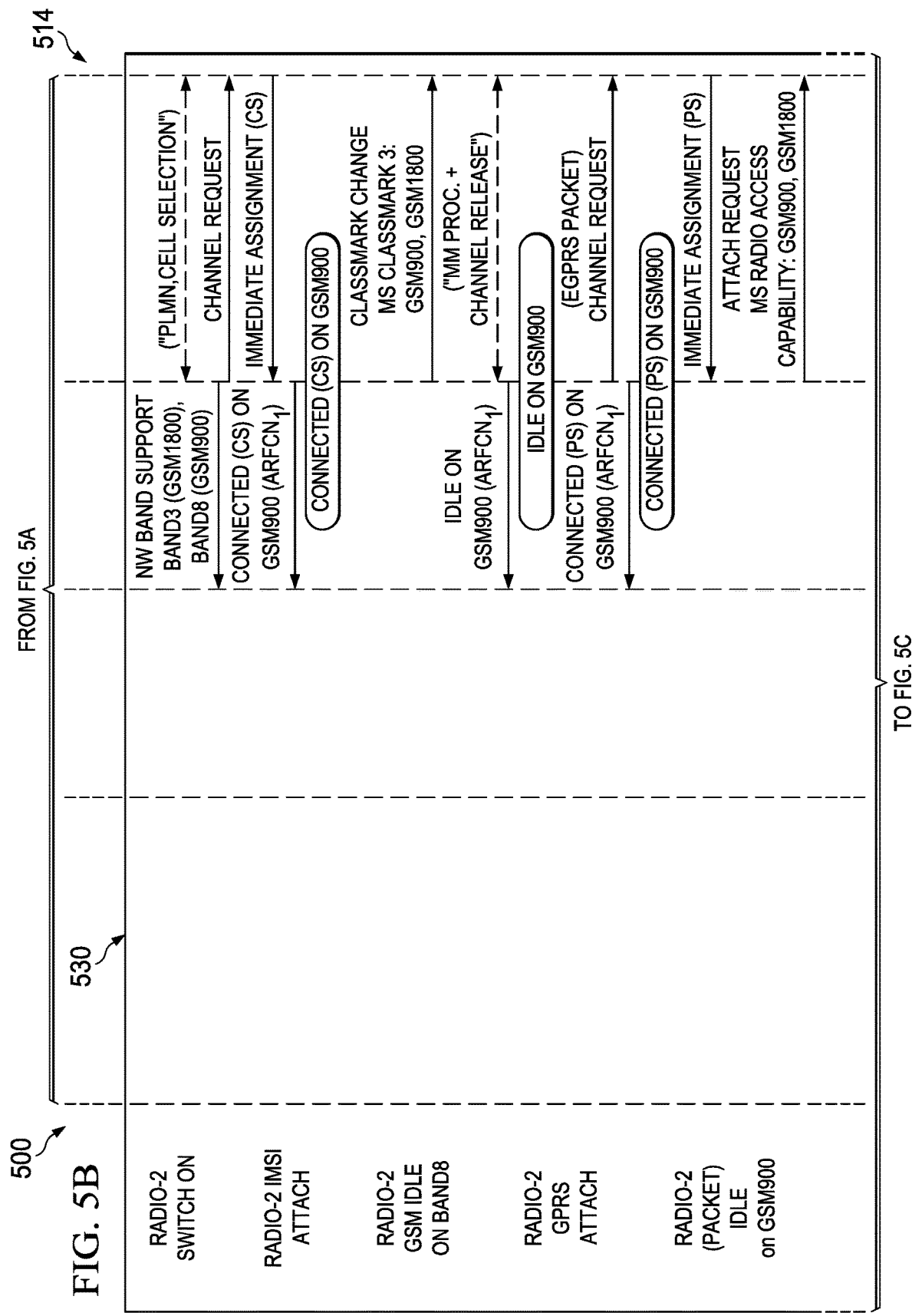
Figure 5C:
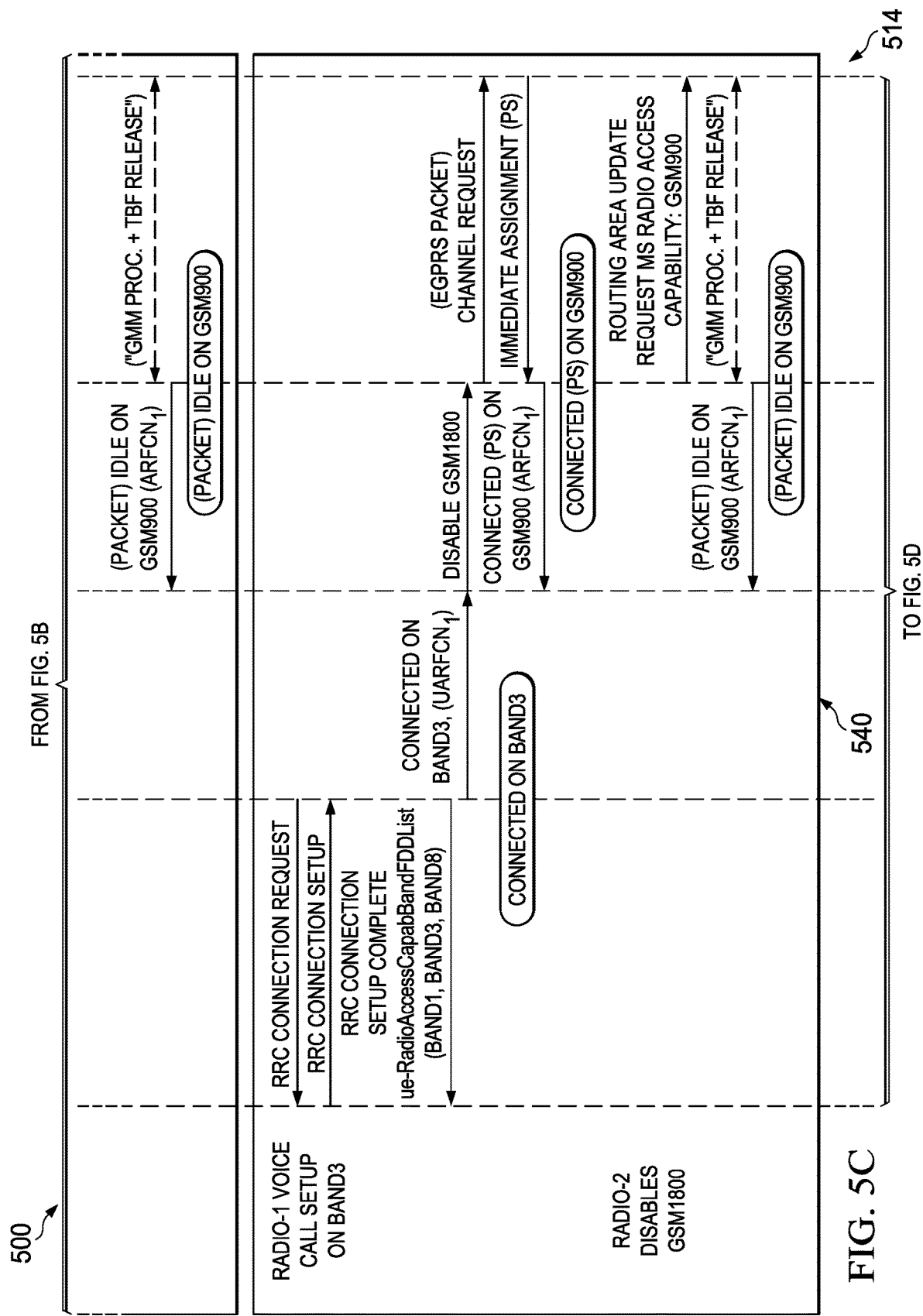
Figure 5E:
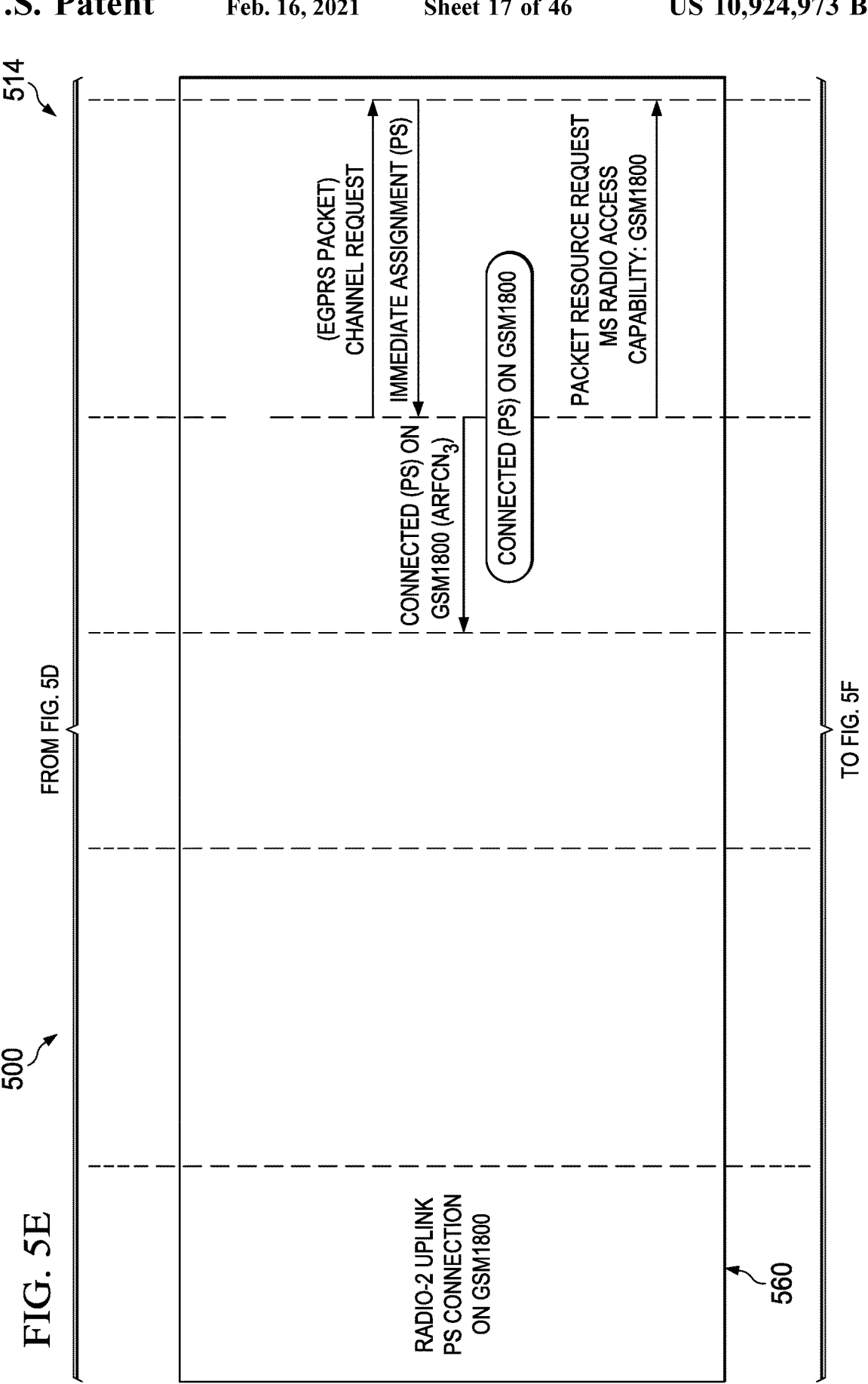
Figure 5F:
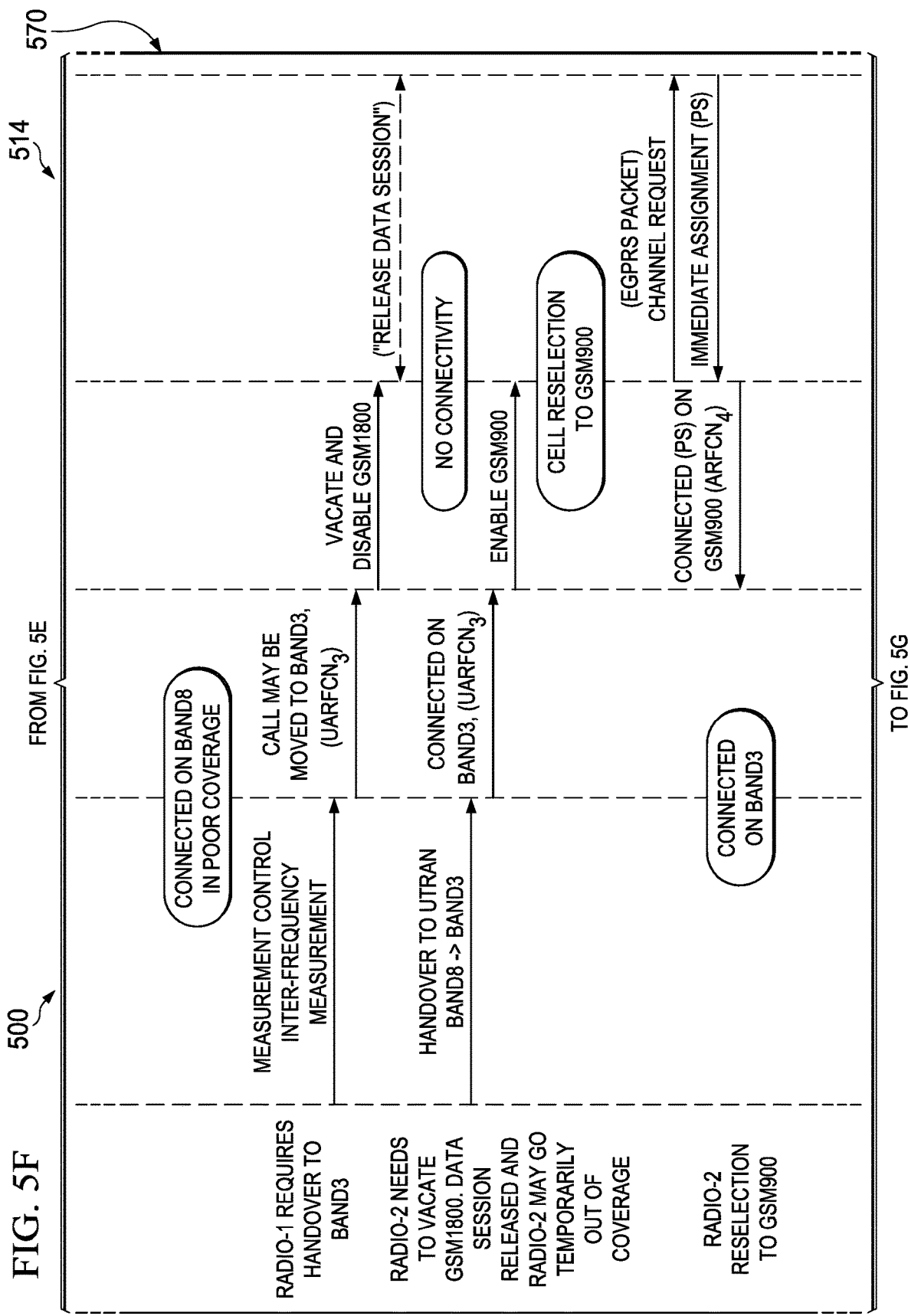
Figure 5H:
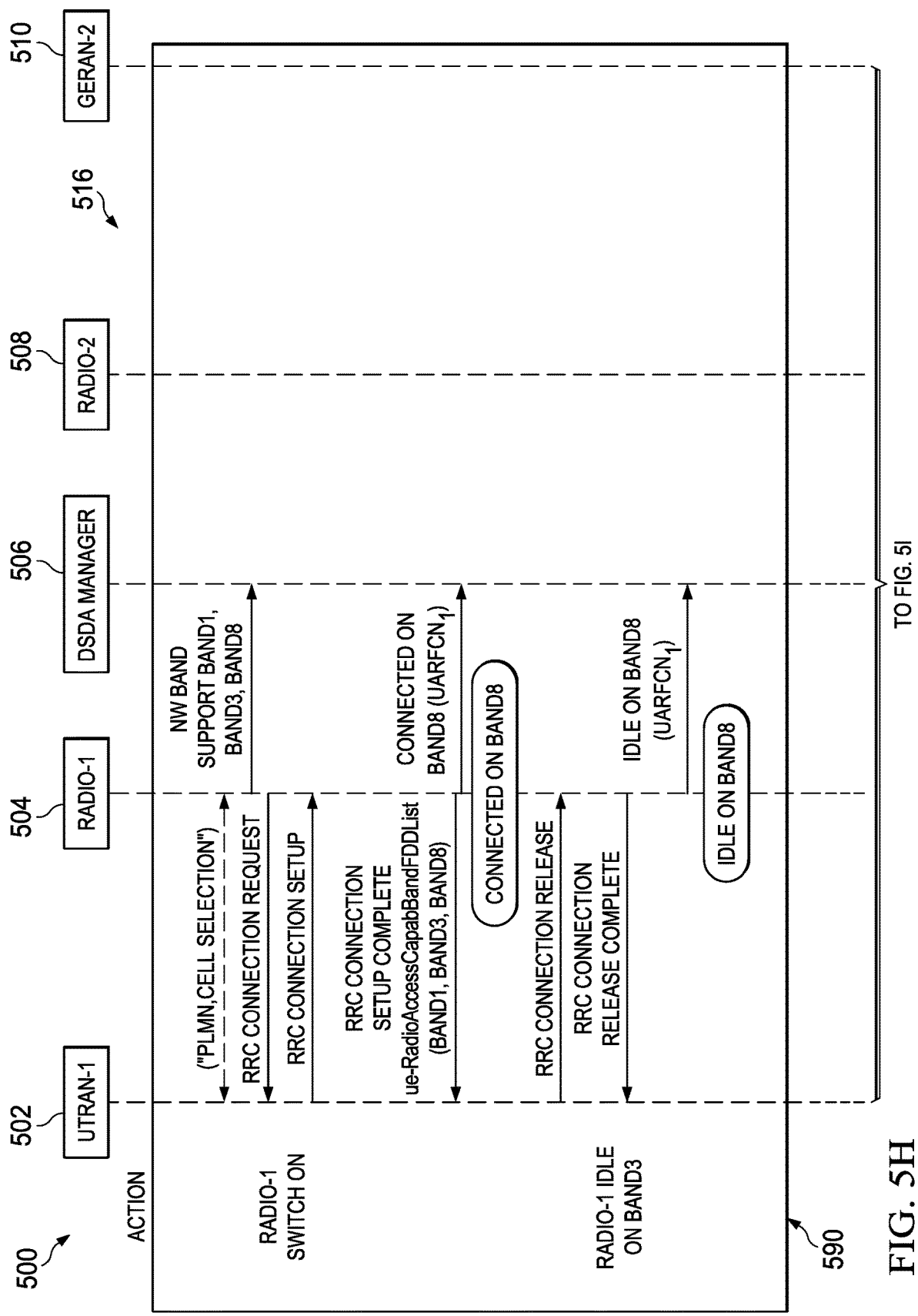
Figure 5J:
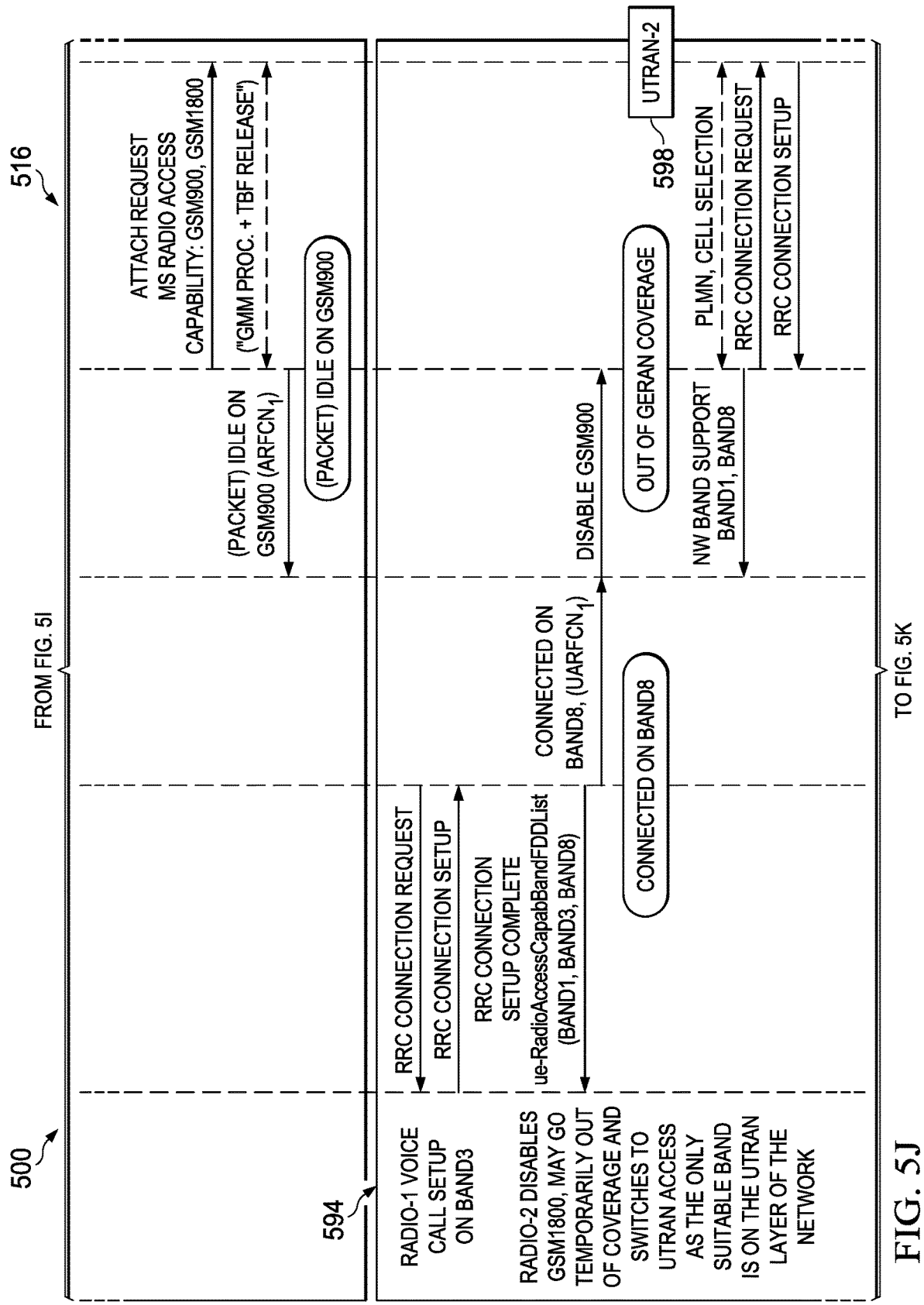
Figure 5K:
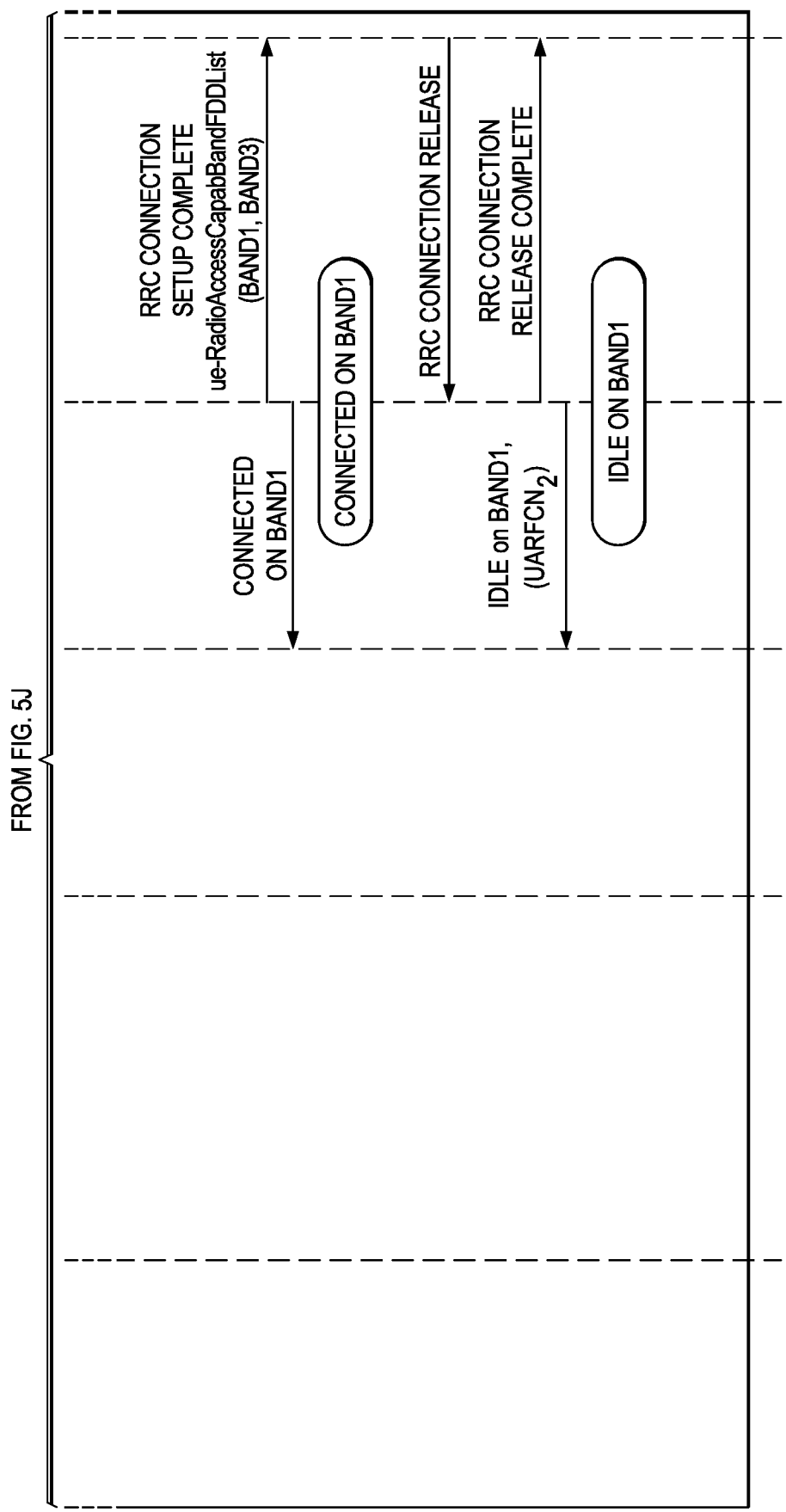
Figure 6A:
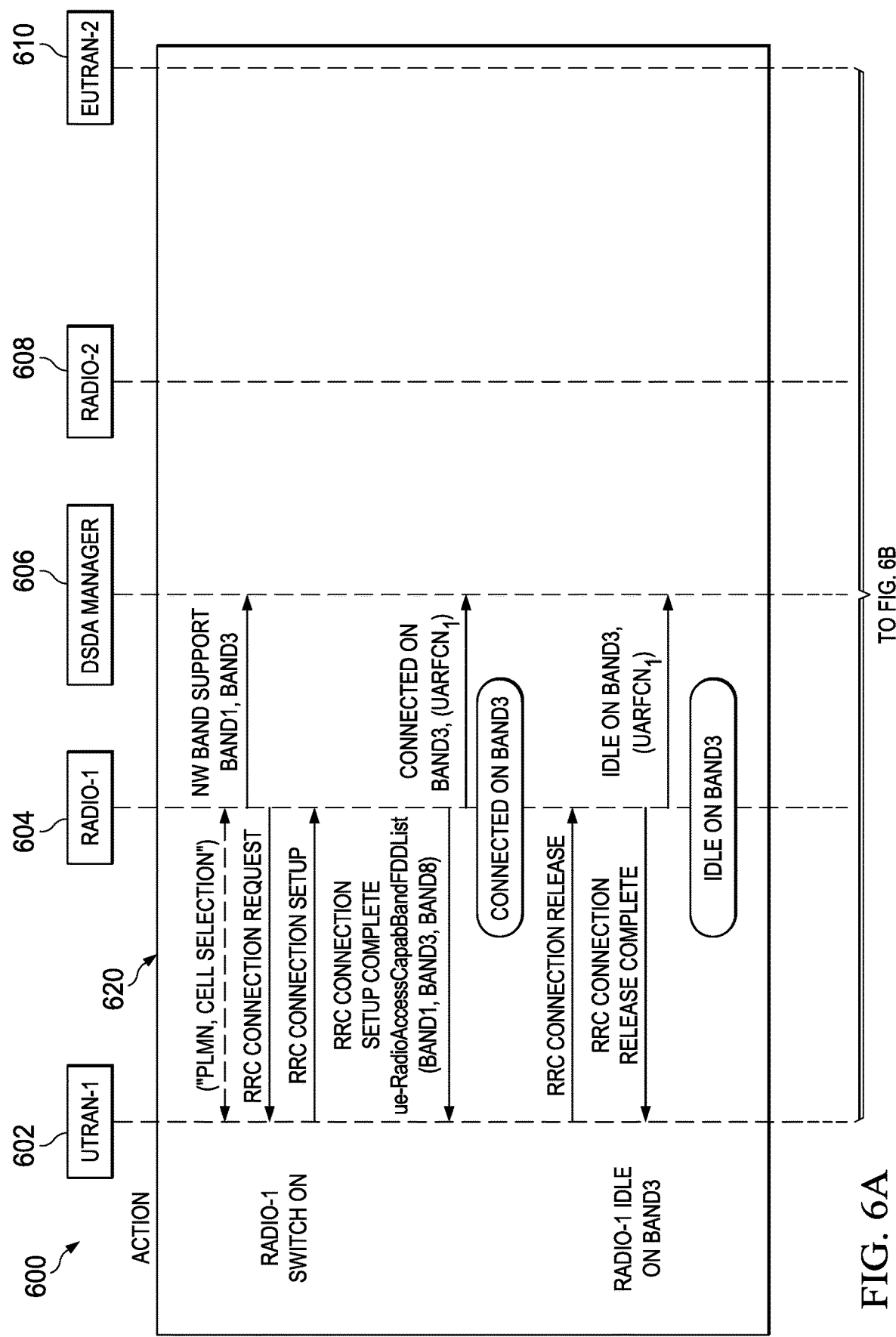
Figure 6C:
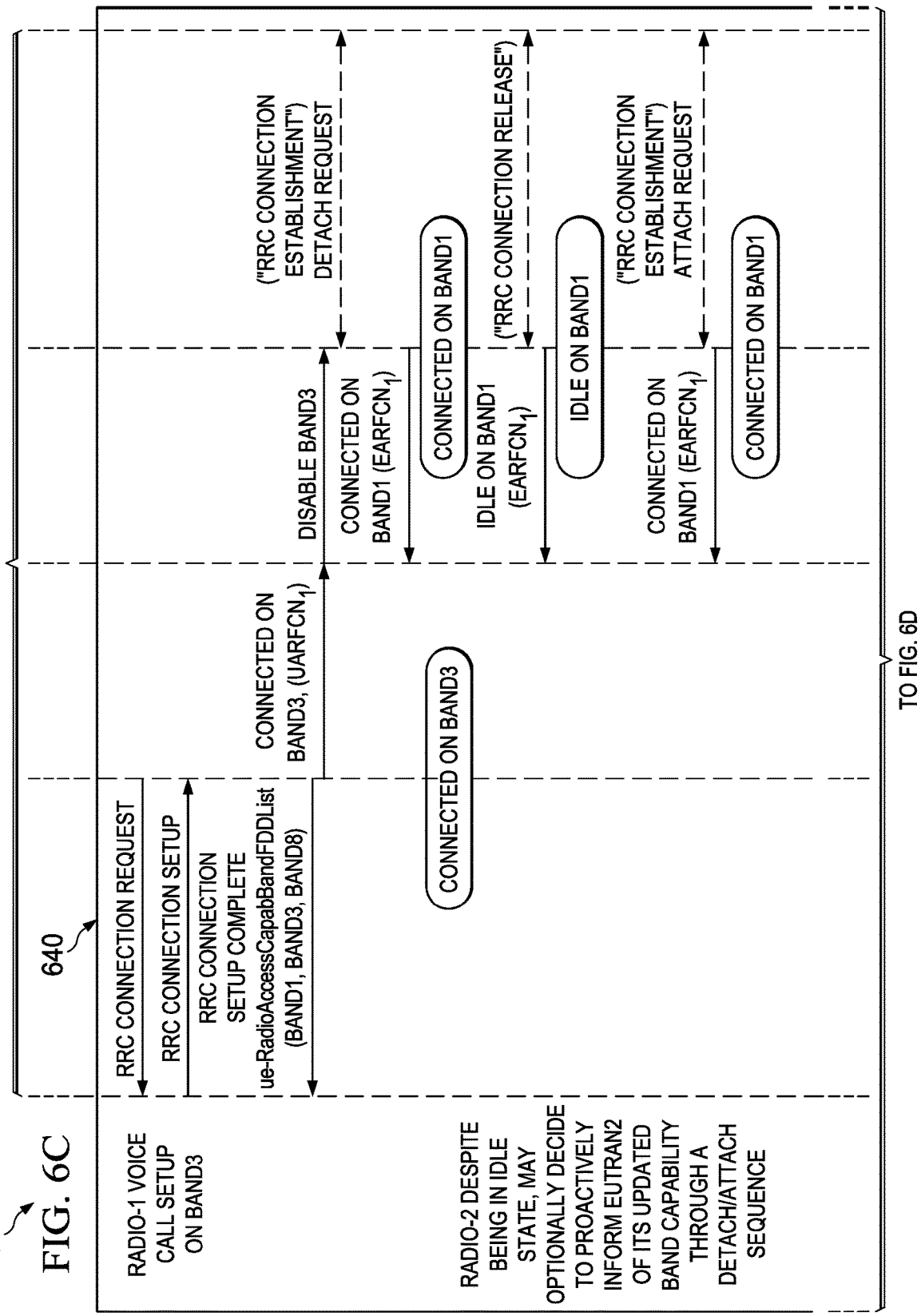
Figure 6D:
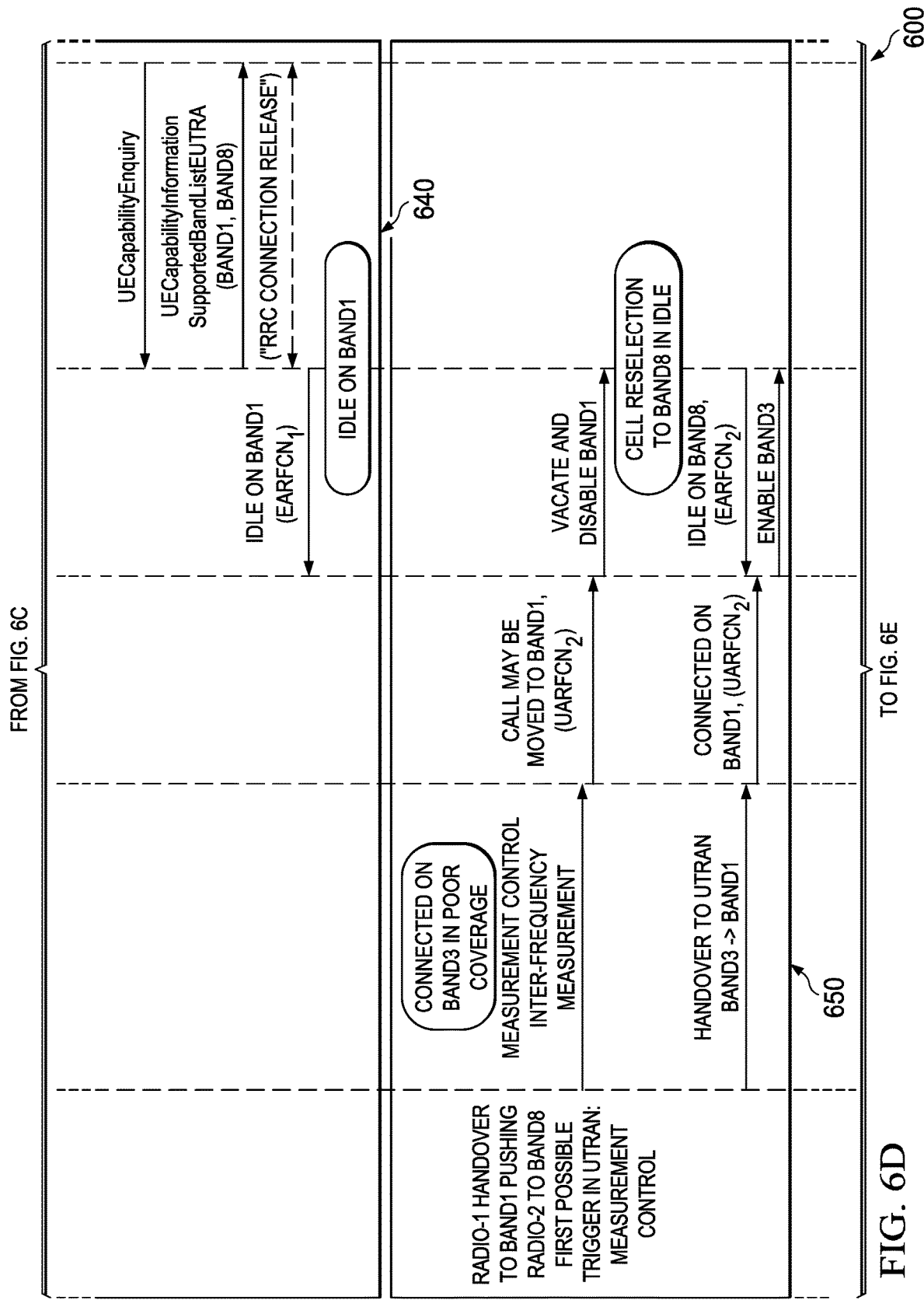
Figure 6F:
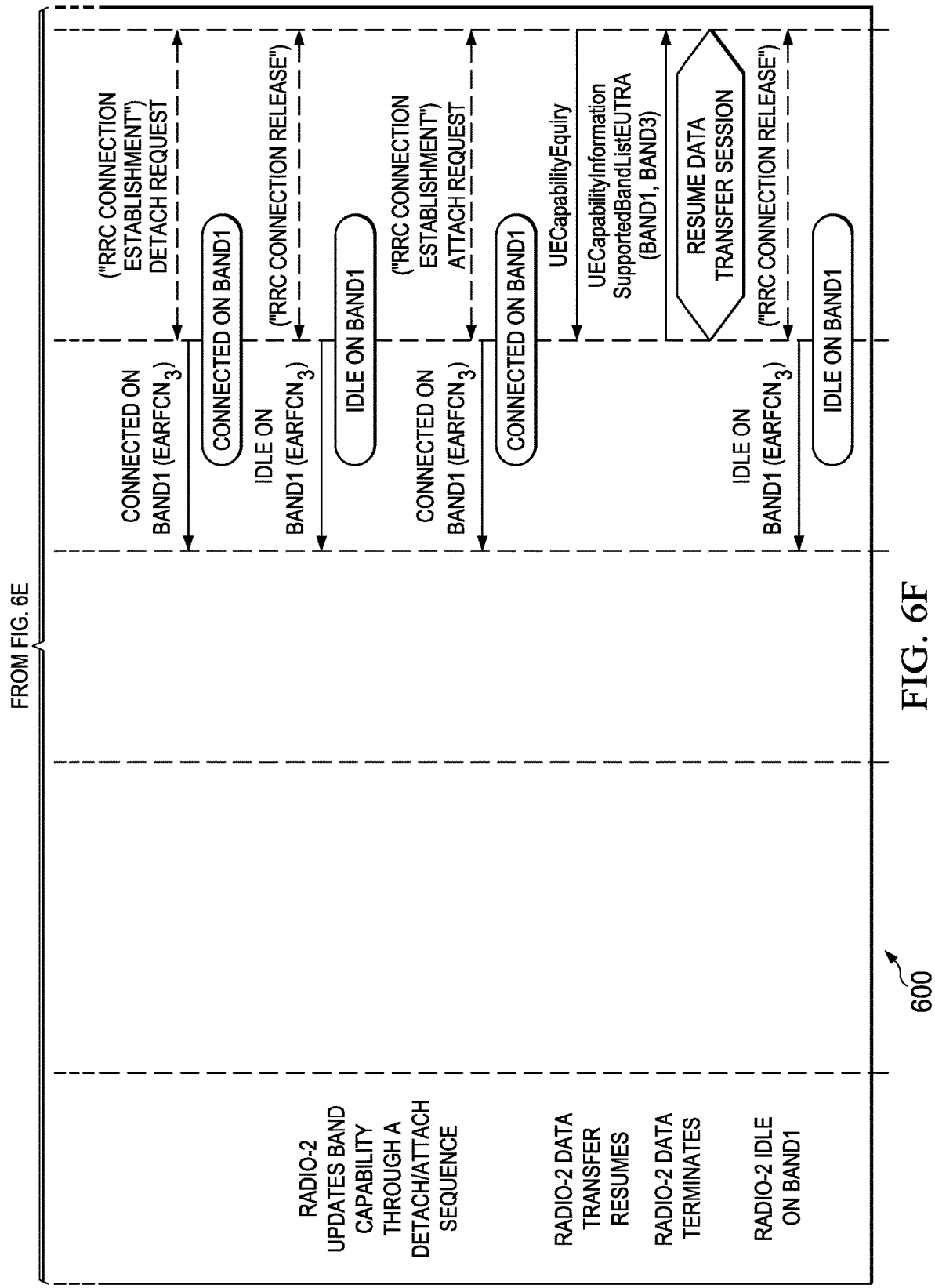
Figure 6G:
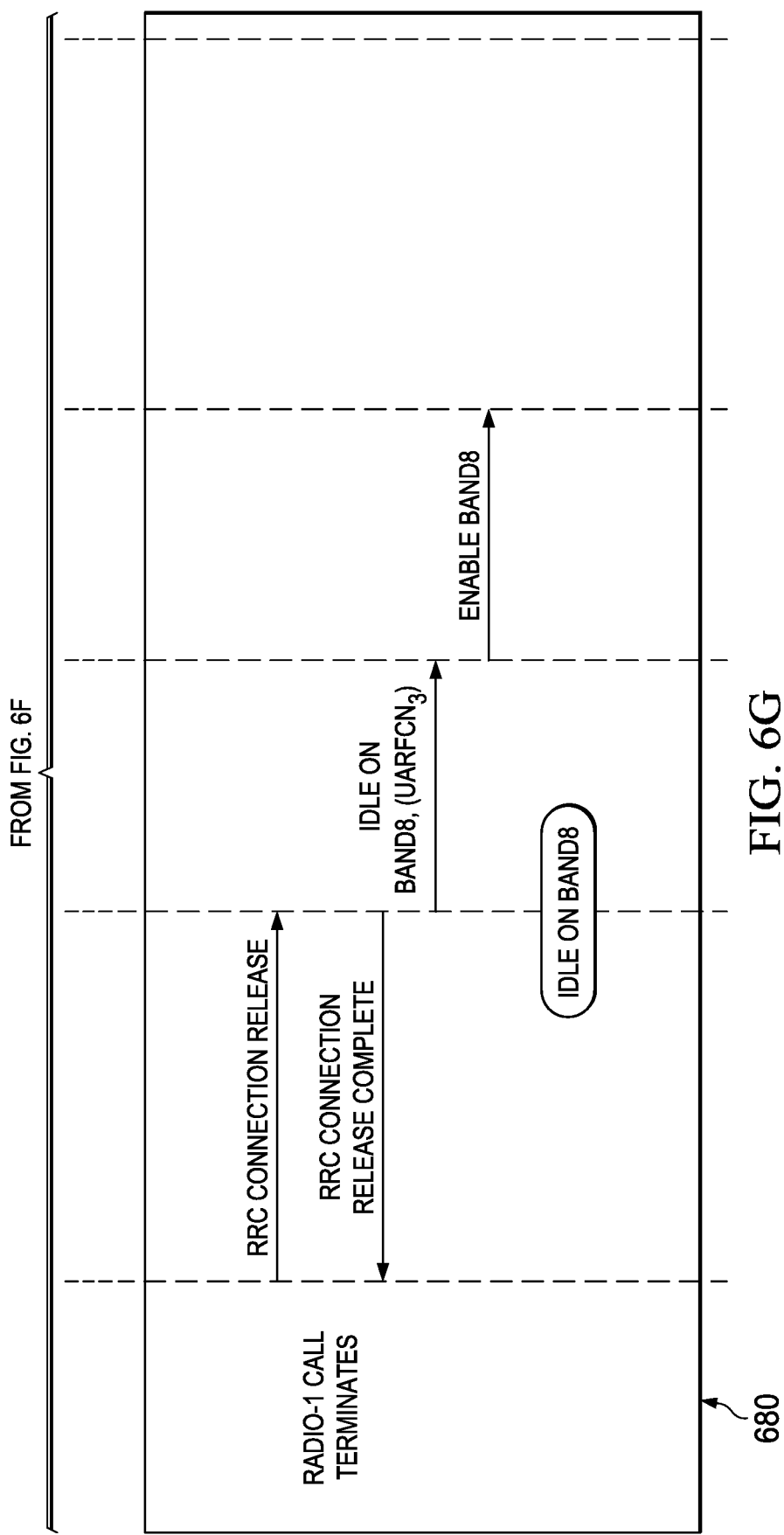

FIG. 2 is a schematic illustrating an example UE 200 that dynamically manages bands. The example UE 200 includes a radio-1 module 202 for communicating with a first RAN, a radio-2 module 204 for communicating with a second RAN, a DSDA manager 206 for managing bands in response to events, and a memory 208 for storing rules for evaluating band conflicts. The example UE 200 may also include one or more central processing units (CPUs) and Inputs/Outputs (I/Os). In the illustrated example, the radio-1 module 202 includes a radio interface for the UE 200 to communicate with the RAN-1 104. The UE may also use the radio-1 module 202 to monitor the RAN-1 104 in a RRC Idle state. Similarly, the radio-2 module 204 includes a radio interface for the UE 200 to communicate with the RAN-2 106 or to monitor the RAN-2 106. The radio interfaces in the radio-1 module 202 and the radio-2 module 204 may include transmitter and receiver modules that can transmit to and receive from RANs that use the same or different RATs. For example, the radio interface in the radio-1 module 202 may include RF components, baseband processing components, and signaling protocol modules that enable the UE 200 to transmit to and receive from a GERAN, a UTRAN, an EUTRAN or a CDMA RAN. Similarly, the radio interface in the radio-1 module 204 may include RF components, baseband processing components, and signaling protocol modules that enable the UE 200 to transmit to and receive from a GERAN, a UTRAN, an EUTRAN or a CDMA RAN.

The DSDA manager 206 can include any software, hardware, firmware, or a combination thereof to determine whether one RF channel conflicts with another RF channel during a handover procedure or a RRC connection setup procedure. In some implementations, the DSDA manager 206 may be software applications stored in a memory sub-system and executed by a processing sub-system. For example, the DSDA manager 206 may be stored in the flash memory, RAM, or a combination thereof and executed by the microprocessor, digital signal processor (DSP), or a combination thereof of the UE 200.

Figure 7:
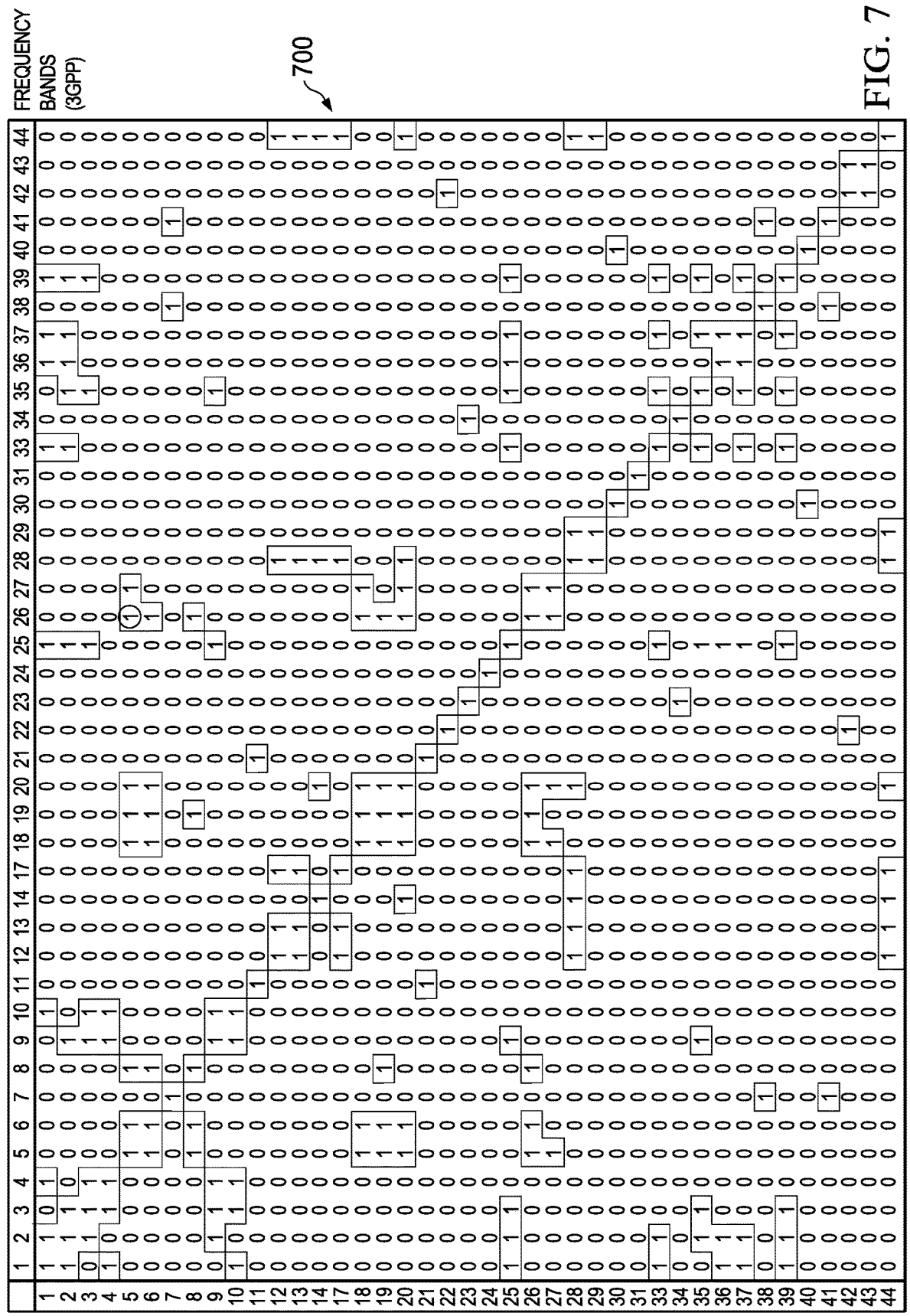
FIG. 7 is an example band conflict table.

In some implementations, the DSDA manager 206 may determine whether two RF channels conflict with each other based on a band conflict table. For example, a band conflict table may include entries that denote whether one band for one RAN conflicts with another band for another (or the same) RAN. The DSDA manager 206 can look up the frequency bands of the RF channels to determine whether they conflict with each other. FIG. 7 and associated descriptions provide additional details of these implementations. In some implementation, the DSDA manager 206 may determine whether two RF channels conflict based on a channel conflict table. A channel conflict table may include entries that denote whether one RF channel in one band conflict with another RF channel in another band. The DSDA manager 206 can look up two specific RF channels in the channel conflict table to determine whether they conflict with each other. The UE 200 may construct the channel conflict table based on the channel bandwidth of different RANs. The UE 200 may also construct the channel conflict table based on a requirement of the guard band. FIG. 10-17 and associated descriptions provide additional details of these implementations. Alternatively or in combination, the DSDA manager 206 may determine whether two RF channels conflict based on real-time or non-real-time calculations.

In some implementation, the DSDA manager 206 may determine whether the RAN-2 106 has a higher priority than the RAN-1 104. The radio-1 module 202 receives an indication from the RAN-1 104 to handover to a RF channel that conflicts with the RF channel that the radio-2 module 204 uses to communicate with RAN-2 106. In some implementations, the indication may be a request for measurements. In some implementations, the radio-1 module 202 may determine that the radio conditions with the RAN-1 104 have worsened through an increase of the bit error rate and/or a decrease of SNR. The DSDA manager 206 may further determine whether the RAN-1 104 or the RAN-2 106 has a higher priority based on usage scenarios of the RAN-1 104 and the RAN-2 106. The DSDA manager 206 may also determine the relative priorities of the RAN-1 104 and the RAN-2 106 based on the state of each radio. For example, if the radio-2 module 204 is idle then the RAN-1 104 has a higher priority. If the RAN-2 106 has a higher priority than the RAN-2 106, the DSDA manager 206 may instruct the radio-1 module 202 to suggest a different RF channel to the RAN-1 104 as the handover target or force the radio-1 module 202 to drop the call FIGS. 3A-3E and associated descriptions provide additional details of these implementations.

The memory 208 stores the band conflict table 210, and the channel conflict tables 220 and 230. The memory 208 may be implemented as a flash memory, RAM, or a combination thereof. As described above, the DSDA manager 206 can access the band conflict table 210, and the channel conflict tables 220 and 230 to determine whether two RF channels conflict with each other.

While FIG. 2 is described as containing or being associated with a plurality of elements, not all elements illustrated within the example UE 200 of FIG. 2 may be utilized in each alternative implementation of the present disclosure. Additional, one or more of the elements described herein may be located external to the example UE 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purpose, in addition to those purpose described herein.

FIGS. 3A-3E are a schematic 300 illustrating example step actions of dynamically managing band capability. In the illustrated example, the UE 200 uses the radio-1 module 202 to access the RAN-1 380. The UE 200 also uses the radio-2 module 204 to access the RAN-2 382. The available RF bands in the target area include the Band8 390, the Band3 392, the Band1 394, and the Band7 396. At step 310, the UE 200 turns on the power of the radio-1 module 202 and performs an initial cell search for the RAN-1380.

At step 312, the radio-1 module 202 measures the signal strength of all the available bands in the target area, including the Band8 390, the Band3 392, the Band1 394, and the Band7 396. The radio-1 module 202 determines that the Band3 392 has the best signal to interference and noise ratio (SINR), so the RF channels in Band3 392 may provide the best signal quality for communications with the RAN-1 380. The radio-1 module 202 starts to transmit and receive on the Band3 392 to perform an attach procedure. The radio-1 module 202 performs the attach procedure using Radio Resource Control (RRC) protocols to communicate with the RAN-1 380. During the attach procedure, the radio-1 module 202 reports its band capability to the RAN-1 380, which includes all four bands available in the target area.

At step 314, the radio-1 module 202 completes the attach procedure and performs a RRC connection release procedure. In the illustrated example, the radio-1 module 202 enters the Idle state. In the Idle state, the radio-1 module 202 monitors the Band3 392 to detect incoming Paging messages. At step 316, the UE 200 turns on the power of the radio-2 module 204 and performs an initial cell search for the RAN-2 382.

At step 318, the radio-2 module 204 measures the signal strength of all the available bands in the target area, including the Band8 390, the Band3 392, the Band1 394, and the Band1 396. The radio-2 module 204 determines that the Band1 394 has the best signal to interference and noise radio (SINR), so the RF channels in Band1 394 may provide the best signal quality for communications with the RAN-2 382. The radio-2 module 204 starts to transmit and receive on the Band1 394 to perform an attach procedure. The radio-2 module 204 performs the attach procedure using Radio Resource Control (RRC) protocols to communicate with the RAN-2 382. During the attach procedure, the radio-2 module 204 reports its band capability to the RAN-2 382, which includes all four bands available in the target area.

At step 320, the radio-2 module 204 completes the attach procedure and performs a RRC connection release procedure. The radio-2 module 204 enters the Idle state, and monitors the Band1 394 to detect incoming Paging messages.

At step 322, the radio-1 module 202 sets up a voice call with the RAN-1 380. The radio-1 module 202 starts to transmit and receive on the Band3 392 to perform a call setup procedure. The radio-1 module 202 performs the call setup procedure using Radio Resource Control (RRC) protocols to communicate with the RAN-1 380. The DSDA manager 206 determines that there is no conflict for RF channels in the Band3 392 and the Band1 394. The radio-1 module 202 enters into an active state with the RAN-1 380 and continues to transmit and receive on an RF channel in the Band3 392.

At step 324, the signal quality of the RF channel in the Band3 392 deteriorates. The radio-1 module 202 receives a handover indication from the RAN-1 380 to handover to a different RF channel. One example of the handover indication is a measurement control message. The RAN-1 380 may send a measurement control message to request the radio-1 module 202 to start the inter-frequency measurement procedure. During the inter-frequency measurement procedure, the radio-1 module 202 searches other RF channels in its supported bands to find an RF channel with the best signal quality. In the illustrated example, the radio-1 module 202 finds that the Band1 394 has the best signal quality and reports it to the RAN-1 380 as a handover candidate. Accordingly, the RAN-1 380 sends a handover message to request the radio-1 module 202 to handover the voice call to an RF channel in the Band1 394. Because the radio-2 module 204 uses the Band1 394 to monitor the RAN-2 382, the DSDA manager 206 determines that there is a conflict between the RF channels of the RAN-1 380 and the RAN-2 382. The DSDA manager 206 instructs the radio-2 module 204 to disable the Band1 394 with the RAN-2 382. The radio-2 module 204 performs a cell reselection procedure. During the cell reselection procedure, the radio-2 module 204 searches other frequency bands. In the illustrated example, the radio-2 module 204 finds that the Band8 390 has the best signal quality in the remaining bands. The radio-2 module 204 thus informs the RAN-2 382 that it monitors the Band8 390 for Paging messages from the RAN-2 382. The radio-1 module 202 completes the handover procedure and continues the voice call with the RAN-1 380 on the Band1 394 the reselection and handover procedures of each radio module may occur in sequence or at the same time; they do not need to have a dependency on each other.

At step 326, the radio-2 module 204 sets up a data session with the RAN-2 382. The radio-2 module 204 starts to transmit and receive on the Band8 390 to perform PDP Context activation procedures. The DSDA manager 206 then determines the relative priorities of the RAN-1 380 and the RAN-2 382. The DSDA manager 206 may determine the relative priorities of different RANs based on a number of factors. One example of the factors is the usage scenario. For example, a voice call may have higher priority than a data session because this is a conversational service, which requires continuous transmission, thus it is important to ensure that the voice call has access to the RF channels with the best signal quality. Because the RAN-1 380 currently carries a voice call, it has a higher priority than the RAN-2 382, which carries a data session. Other priority factors may include types of RAT, user classes, service types, and service provider preferences. In the illustrated example, the DSDA manager 206 determines that the RAN-1 380 has a higher priority. It instructs the radio-2 module 204 to remove the Band1 394 from its band capability to prevent the RAN-2 382 from sending a handover command to handover its data session to the Band1 394 and preventing any unwanted reselection or redirection to the vacated band. The radio-2 module 204 reports the updated band capability to the RAN-2 384, which includes the Band8 390, the Band3 392, and the Band1 396.

At step 328, the signal quality of the RF channel in the Band1 394 deteriorates. The radio-1 module 202 receives a handover indication from the RAN-1 380 to handover to a different RF channel. Similar to step 324, the RAN-1 380 may send a measurement control message to request the radio-1 module 202 to start inter-frequency measurement and report procedure. In the illustrated example, the radio-1 module 202 finds that the Band8 390 has the best signal quality. Because the radio-2 module 204 uses the Band8 390 to communicate with the RAN-2 382 on a data session, the DSDA manager 206 determines that there is a conflict between the RF channels of the RAN-1 380 and the RAN-2 382. The DSDA manager 206 then determines the relative priorities of the RAN-1 380 and the RAN-2 382. If the RAN-1 380 has a lower priority than the RAN-2 382, then the DSDA manager 206 may instruct the radio-2 module 204 to continue to use the Band8 390 for its ongoing call with the RAN-2 382, and instruct the radio-1 module 202 to suggest a different RF channel to the RAN-1 380 as a handover target or allow the call to drop. In the illustrated example, because the RAN-1 380 has a voice call, the DSDA manager 206 determines that it has a higher priority than the RAN-2 382. In some implementations, the DSDA manager 206 may instruct the radio-2 module 204 to report to the RAN-2 382 that it has poor signal quality in the Band8 390 to try and force an network initiated handover. The radio-2 module 204 may perform a RRC connection release procedure with the RAN-2 382 and to go into an RRC Idle state. To trigger the RRC connection release procedure, the radio-2 module 204 may send a signaling connection release indication to the RAN-2 382 or start a PDP context deactivation procedure. In LTE, radio-2 module, can use the Connection release requested by upper layers procedure to release the radio resources. The radio-2 module 204 may transmit the signaling connection release indication using a RRC message. The radio-1 module 202 reports the Band8 390 to the RAN-1 380 as a handover candidate. Accordingly, the RAN-1 380 sends a handover message to request the radio-1 module 202 to handover the voice call to an RF channel in the Band8 390.

At step 330, the radio-2 module 204 searches other frequency bands. In the illustrated example, the radio-2 module 204 finds that the Band7 396 has the best signal quality in the remaining bands. The radio-2 module 204 re-establishes the data session with the RAN-2 382 on an RF channel in the Band7 396. The radio-2 module 204 may send a RRC Connection Request message to re-establish the data session, or an RRCConnectionReestablishment message. The radio-2 module 204 also updates its band capability to the RAN-2 382, which includes the Band1 394, but excludes the Band8 390. At step 332, the radio-1 module 202 terminates the voice call with the RAN-1 380. It performs a RRC connection release procedure and enters into RRC Idle state on the Band8 390. At step 334, the radio-2 module 204 terminates the data session with the RAN-2 382. It performs a RRC connection release procedure and enters into RRC Idle state on the Band7 396. At step 336, the radio-2 module 204 loses coverage with the RAN-2 382 in the Band7 396. It performs a cell reselection procedure and moves to the Band1 394 to continue in RRC Idle state. The radio-2 module 204 may inform the RAN-2 382 of the new frequency that it monitors in the Band1 394.

FIGS. 4A-4F are a schematic 400 illustrating an example Data Flow Diagram (DFD) for dynamically managing band capability between UTRANs. In the illustrated example, a UE communicates with two UTRANs. The UE uses the radio-1 module 404 to communicate with the UTRAN-1 402, and uses the radio-2 module 408 to communicate the UTRAN-2 410. The UE uses the DSDA manager 406 to dynamically manage its band capability for the two UTRANs.

At step 420, the UE switches the radio-1 module 404 on to perform an attach procedure with the UTRAN-1 402. The radio-1 module 404 uses RRC protocols for the attach procedure. During the attach (not shown in the figure), the radio-1 module 404 reports to the UTRAN-1 402 that it supports Band1, Band3, and Band8. The UE may use other procedures to communicate with the UTRAN-1 402. The radio-1 module 404 also indicates to the DSDA manager 406 that UTRAN-1 402 supports Band1 and Band3. The radio-1 module 404 informs the DSDA manager 406 that is connected to UTRAN-1 402 on the RF channel numbered as UTRA Absolute Radio Frequency Channel Number (UARFCN) 1 in Band3. After the attach, the radio-1 module 404 and the UTRAN-1 402 perform an RRC connection release procedure. The radio-1 module 404 enters into the RRC Idle state with the UTRAN-1 402 in Band3. The radio-1 module 404 informs the DSDA manager 406 that it currently monitors the UTRAN-1 402 on the RF channel UARFCN 1 in Band3.

At step 430, the UE switches the radio-2 module 408 on to perform an attach procedure with the UTRAN-2 410. During the attach (not shown in the figure), the radio-2 module 408 reports to the UTRAN-2 410 that it supports Band1, Band3, and Band8. The UE may use other procedures to communicate with the UTRAN-2 410. The radio-2 module 408 indicates to the DSDA manager 406 that UTRAN-2 410 supports Band1 and Band8. The radio-2 module 408 informs the DSDA manager 406 that it is connected to the UTRAN-2 410 on UARFCN 2 in Band1. After the attach, the radio-2 module 408 and the UTRAN-2 410 perform a RRC connection release procedure. The radio-2 module 408 enters into the RRC Idle state in Band1. The radio-2 module 408 informs the DSDA manager 406 that it currently monitors the UTRAN-2 410 on UARFCN 2 in Band1.

At step 440, the radio-1 module 404 uses RRC protocol to set up a voice call with the UTRAN-1 402. The radio-1 module 404 informs the DSDA manager 406 that it now enters into an RRC connected state with the UTRAN-1 402 on UARFCN 1 in Band3 for a voice call. The DSDA manager 406 determines that a voice call has a higher priority. Therefore to ensure the channel quality for the voice call with the UTRAN-1 402, it instructs the radio-2 module 408 to disable Band3. Even though, Radio-2 module 408, is now in Idle state, it optionally proactively informs UTRAN2 of its modified band support although in general this may not be required for radio modules in Idle or other similar states. As described previously, the DSDA manager 406 may also consider other factors in determining the relative priorities between radio modules.

At step 450, the radio-1 module 402 receives an indication from the UTRAN-1 402 to handover to an RF channel in Band1. In the illustrated example, the UTRAN-1 402 transmits the indication using a measurement control message. The measurement control message requests the radio-1 module 404 to start the inter-frequency measurement procedure. The radio-1 module 404 indicates to the DSDA manager 406 that it may handover the call to UARFCN 3 in Band1 because it has the best channel quality. Because the radio-2 module 408 currently monitors the UTRAN-2 410 on UARFCN 2 in Band1, the DSDA manager 406 determines that a conflict exists between the two RF channels. The DSDA manager 406 further determines that the voice call with the UTRAN-1 402 has a higher priority and therefore it can use Band1. It instructs the radio-2 module 408 to vacate and disable Band1. The radio-2 module 408 performs a cell reselection procedure and informs the DSDA manager 406 that it has entered into the Idle state with the UTRAN-2 410 on UARFCN 4 in Band8. The radio-1 module 404 reports the measurement information of UARFCN 3 in Band1 to the UTRAN-1 402. The radio-1 module 404 receives a handover message from the UTRAN-1 402. The radio-1 module 404 completes the handover procedure and continues the voice call on UARFCN 3 in Band1. The radio-1 module 404 informs the DSDA manager 406 that it is connected with the UTRAN-1 402 on UARFCN 3 in Band1. The DSDA manager 406 also instructs the radio-2 module 408 to enable Band3 because the radio-1 module 402 has stopped using it for active transmission with the UTRAN-1 402

At step 460, the radio-2 module 408 sets up a data session with the UTRAN-2 410. The radio-2 module 408 transmits and receives RRC messages in Band8. In its band capability report (in this example ue-RadioAccessCapabBandFD-DList) which is part of the RRC Connection setup complete message to the UTRAN-2 410, the radio-2 module 408 includes Band3 and Band8, but excludes Band1. The radio-2 module 408 informs the DSDA manager 406 that it is connected with the UTRAN-2 410 on UARFCN 4 in Band8.

At step 470, the radio-1 module 402 receives an indication from the UTRAN-1 402 to handover to an RF channel in Band8. In the illustrated example, the UTRAN-1 402 transmits the indication using a measurement control message. The measurement control message requests the radio-1 module 404 to start the inter-frequency measurement procedure. The radio-1 module 404 indicates to the DSDA manager 406 that it may handover the call to UARFCN 5 in Band8. Because the radio-2 module 408 is in a data session with the UTRAN-2 410 on UARFCN 4 in Band8, the DSDA manager 406 determines that a conflict exists between the two RANs. The DSDA manager 406 further determines that the voice call with the UTRAN-1 402 has a higher priority over the data session with the UTRAN-2 410. It instructs the radio-2 module 408 to vacate and disable Band8. The radio-2 module 408 sends a signaling connection release indication to the UTRAN-2 410. The signaling connection release indication may be transmitted using an RRC message. The UTRAN-2 410 sends an RRC connection release message to the radio-2 module 408. The radio-1 module 404 receives a handover message from the UTRAN-1 402. The radio-1 module 404 completes the handover procedure and continues the voice call on UARFCN 5 in Band8. The DSDA manager 406 instructs the radio-2 module 408 to enable Band1.

At step 480, the radio-2 module 408 performs a cell reselection procedure and selects UARFCN 6 in Band1. The radio-2 module 408 informs the DSDA manager 406 that it enters in RRC Idle state with the UTRAN-2 410 on UARFCN 6 in Band1. The radio-2 module 408 performs a RRC Connection Request procedure with the UTRAN-2 410 to resume its data session. The radio-2 module 408 also updates its band capability to the UTRAN-2 410 using the ue-RadioAccessCapabBandFDDList in the RRC Connection setup complete message. In the band capability report, the radio-2 module 408 includes Band1 and Band3, but excludes Band8. The radio-2 module 408 informs the DSDA manager 406 that it is connected to the UTRAN-2 410 on UARFCN 6 in Band1.

At step 490, the voice call between the radio-1 module 404 and the UTRAN-1 402 terminates. The radio-1 module 404 and the UTRAN-1 402 perform an RRC connection release procedure. The radio-1 module 404 enters into the Idle state with the UTRAN-1 402 in Band8 and informs the DSDA manager 406. The DSDA manager 406 instructs the radio-2 module 408 to enable Band8.

FIGS. 5A-5K are a schematic 500 illustrating example DFDs for dynamically managing band capability between a GERAN and a UTRAN. The schematic 500 includes an example DFD 514 where the UE stays in coverage with the GERAN and an example DFD 516 where the UE goes temporarily out of coverage (or loses connectivity) with the GERAN. In the illustrated example, a UE uses the radio-1 module 504 to communicate with the UTRAN-1 502, and uses the radio-2 module 508 to communicate the GERAN-2 510. The UE uses the DSDA manager 506 to dynamically manage its band capability.

The DFD 514 illustrates an example DFD where the UE stays in coverage with the GERAN. At step 520, the UE switches the radio-1 module 504 on to perform an attach procedure with the UTRAN-1 502. The radio-1 module 504 indicates to the DSDA manager 506 that UTRAN-1 502 supports Band1, Band3 and Band8. The radio-1 module 504 enters into the RRC Idle state with the UTRAN-1 502 in Band3. The radio-1 module 504 informs the DSDA manager 506 that it currently monitors the UTRAN-1 502 on the RF channel numbered as UARFCN 1 in Band3.

At step 530, the UE switches the radio-2 module 508 on to perform an attach (GPRS Mobility Management) procedure with the GERAN-2 510. After the completion of the attach procedure, the radio-2 module 508 enters into the Idle state with the GERAN-2 510 and informs the DSDA manager 506 that it currently monitors the GERAN-2 510 on ARFCN 1 in GSM900. The UE then performs a GPRS attach (GPRS Mobility Management) procedure with the GERAN-2 510. After completing the GPRS attach procedure, the radio-2 module 508 enters into the (Packet) Idle state with the GERAN-2 510 and updates the DSDA manager 506 accordingly.

At step 540, the radio-1 module 504 uses RRC protocol to set up a voice call with the UTRAN-1 502. The radio-1 module 504 informs the DSDA manager 506 that it now enters into an RRC connected state with the UTRAN-1 502 on UARFCN 1 in Band3 for a voice call. The DSDA manager 506 determines that Band3 and GSM1800 conflict with each other. The DSDA manager 506 further determines that a voice call has a higher priority. Therefore to ensure the channel quality for the voice call with the UTRAN-1 502, it instructs the radio-2 module 508 to disable GSM1800. The radio-2 module 508 in (Packet) Idle state, may optionally proactively indicate to the GERAN-2 510 its new band support using the MS Radio Access capability information element in the Routing Area Update Request message.

At step 550, the radio-1 module 502 receives an indication from the UTRAN-1 502 to handover to an RF channel in Band8. The radio-1 module 504 indicates to the DSDA manager 506 that it may handover the call to UARFCN 2 in Band8 because it has the best channel quality. The DSDA manager 506 determines that a conflict exists between Band8 and GSM900. It instructs the radio-2 module 508 to vacate and disable GSM900. As both GSM900 and GSM1800 bands are disabled, the radio-2 module 508 has temporarily no connectivity to the GERAN-2 510. The radio-1 module 504 completes the handover procedure and continues the voice call on UARFCN 2 in Band8 and informs the DSDA manager 506. The DSDA manager 506 instructs the radio-2 module 508 to enable GSM1800. The radio-2 module 508 performs a cell reselection procedure and enters into the (Packet) Idle state with the GERAN-2 510. The radio-2 module 508 informs the DSDA manager 506 that it enters in the (Packet) Idle state on ARFCN 2 in GSM1800.

At step 560, the radio-2 module 508 connects with the GERAN-2 510 and initiates a data session. The radio-2 module 508 informs the DSDA manager 506 that it enters into a Connected (PS) state with the GERAN-2 510 on ARFCN 3 in GSM1800.

At step 570, the radio-1 module 502 receives an indication from the UTRAN-1 502 to handover to an RF channel in Band3. The radio-1 module 504 indicates to the DSDA manager 506 that it may handover the call to UARFCN 3 in Band3. The DSDA manager 506 determines that a conflict exists between the two RANs. The DSDA manager 506 further determines that the voice call with the UTRAN-1 502 has a higher priority over the data session with the GERAN-2 510. It instructs the radio-2 module 508 to vacate and disable GSM1800. As both GSM900 and GSM1800 bands are disabled, the radio-2 module 508 has temporarily no connectivity to the GERAN-2 510. The radio-1 module 504 completes the handover procedure and continues the voice call on UARFCN 3 in Band3. The DSDA manager 506 instructs the radio-2 module 508 to enable GSM900. The radio-2 module 508 performs a cell reselection procedure. The radio-2 module indicates opportunistically to GERAN2 its new band support using the MS Radio Access capability information element in the Routing Area update Request message. The radio-2 module 508 resumes the data transfer, then terminates the session, e.g. by releasing a Temporary Block Flow (TBF). The radio-2 module 508 then informs the DSDA manager 506 that it enters into a (Packet) Idle state with the GERAN-2 510 on ARFCN 4 in GSM900.

At step 580, the voice call between the radio-1 module 504 and the UTRAN-1 502 terminates. The radio-1 module 504 enters into the Idle state with the UTRAN-1 502 in Band3 and informs the DSDA manager 506. The DSDA manager 506 instructs the radio-2 module 508 to enable GSM1800.

The DFD 516 illustrates an example DFD where the UE goes out of GERAN coverage or loses connectivity with the GERAN network. At step 590, the UE switches the radio-1 module 504 on and enters into the RRC Idle state with the UTRAN-1 502 in Band8. At step 592, the UE switches the radio-2 module 508 on and enters (Packet) Idle state with the GERAN-2 510 on ARFCN 1 in GSM900. The radio-2 module 508 may optionally decide to proactively indicate to the GERAN-2 510 its new band support using the MS Radio Access capability information element.

At step 594, the radio-1 module 504 uses RRC protocol to set up a voice call with the UTRAN-1 502. The radio-1 module 504 informs the DSDA manager 506 that it now enters into an RRC connected state with the UTRAN-1 502 on UARFCN 1 in Band8 for a voice call. The DSDA manager 506 determines that Band8 and GSM900 conflict with each other. The DSDA manager 506 further determines that a voice call has a higher priority. Therefore to ensure the channel quality for the voice call with the UTRAN-1 502, it instructs the radio-2 module 508 to disable GSM900 with the GERAN-2 510. The radio-2 module 508 may determine that it goes temporarily out of coverage or that it has lost connectivity with the GERAN-2 510. It reselects to UTRAN access and enters into Idle state in Band1 with the UTRAN-2 598.

FIGS. 6A-6G are a schematic 600 illustrating an example DFD for dynamically managing band capability between a UTRAN and an EUTRAN. In the illustrated example, a UE uses the radio-1 module 604 to communicate with the UTRAN-1 602, and uses the radio-2 module 608 to communicate with the EUTRAN-2 610. The UE uses the DSDA manager 606 to dynamically manage its band capability.

At step 620, the radio-1 module 604 enters into the RRC Idle state with the UTRAN-1 602 on UARFCN 1 in Band3 and informs the DSDA manager 606. At step 630, the radio-2 module 608 informs the DSDA manager 606 that it enters into the RRC Idle state with the EUTRAN-2 610 on EARFCN 1 in Band1.

At step 640, the radio-1 module 604 informs the DSDA manager 606 that it now enters into an RRC connected state with the UTRAN-1 602 on UARFCN 1 in Band3 for a voice call. The DSDA manager 606 instructs the radio-2 module 608 to disable Band3. The radio-2 module 608 updates its band capability to exclude Band3. Radio-2 being in Idle state, may optionally proactively report its new band capability to EUTRAN-2 by a Detach/Attach sequence using the UECapabilityInformation message.

At step 650, the radio-1 module 602 receives an indication from the UTRAN-1 602 to handover to an RF channel in Band1. The DSDA manager 606 instructs the radio-2 module 608 to vacate and disable Band1. The radio-2 module 608 performs a cell reselection procedure and informs the DSDA manager 606 that it has now entered an Idle state on EARFCN 2 in Band8.

The radio-1 module 604 completes the handover procedure and informs the DSDA manager 606. The DSDA manager 606 instructs the radio-2 module 608 to enable Band3. As radio-2 module 608 is currently in Idle state, it may decide to not indicate its updated band capability with EUTRAN-2 610 at this time.

At step 660, the radio-2 module 608 sets up a data session with the EUTRAN-2 610, and informs the DSDA manager 606 that it enters connected state with the EUTRAN-2 610 on EARFCN 2 in Band8. At step 670, the radio-1 module 602 hands over its voice call to UARFCN 3 in Band8. The DSDA manager 606 instructs the radio-2 module 608 to disable Band8 and enable Band1. The DSDA manager may be proactive and disable Band8 as a result of a measurement report on the conflicting band or disable Band8 after the handover has occurred. The radio-2 module 608 requests the release of the bearer(s) associated to the data transfer, performs cell re-selection procedure once the RRC connection has been released. It then re-enters into connected state with the EUTRAN-2 610 to perform a Detach/Attach sequence and reports its updated band capability using the UECapabilityInformation message. Alternatively the radio-2 module 608 may use the Tracking Area update procedure instead of the Detach/Attach sequence to update its band capabilities by indicating to the EUTRAN-2 610 that a UE radio capability information update is needed in the TRACKING AREA UPDATE REQUEST message. At step 680, the voice call between the radio-1 module 604 and the UTRAN-1 602 terminates. The DSDA manager 606 radio-2 module 608 instructs the radio-2 module 608 to enable Band8.

FIG. 7 illustrates an example band conflict table 500. In some implementations, a UE may use one or more band conflict tables to store conflict information of RF channels in different bands. In the illustrated example, the band conflict table 700 lists the 3GPP bands in both rows and columns. Each entry in the band conflict table 700 indicates whether the band indicated by its row number conflicts with the band indicated by its column number. In the illustrated example, an entry of "1" indicates that the two bands conflict with each other. An entry of "0" indicates that the two bands do not conflict with each other. In the illustrated example, a band conflicts with another band if the two bands overlap with each other, either fully or in part. For example, the entry at (row-1, column-1) is "1," because Band1 and Band1 fully overlap. The entry at (row-5, column-26) is also "1," because Band5 and Band26 partially overlaps. In some implementations, the band conflict table 700 can be modified to include other factors such as Intermodulation and Harmonic Interference. These and other factors could help the DSDA decide if vacating a band would place the impacted radio in a no-coverage situation and the DSDA may decide not to force the module to vacate the band. A DSDA manager may access band conflict tables to determine whether RF channels in one band conflict with RF channels in another band. For example, a DSDA manager may access the band conflict table 700 and determine that any RF channel in Band5 conflict with any RF channel in Band26.

Figure 8:
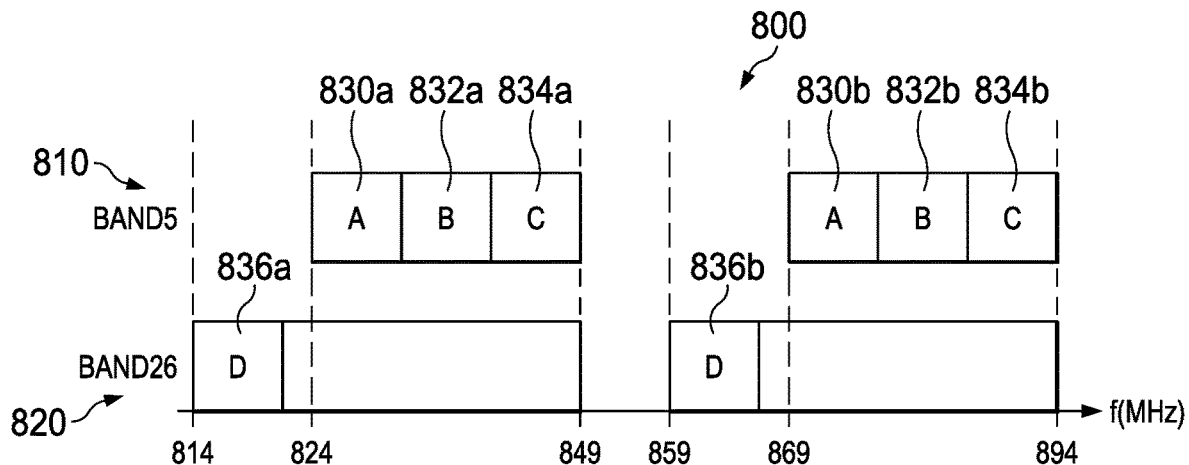
FIG. 8 is a schematic illustrating a conflicting band combination of Band5 and Band26.

FIG. 8 is a schematic 800 illustrating a conflict band combination of Band5 and Band26. The Band5 810 occupies RF channels from 824 MHz to 849 MHz and from 869 MHz to 894 MHz. The Band26 820 occupies RF channels from 814 MHz to 849 MHz and from 859 to 894 MHz. Therefore a part of the Band26 820 overlaps with the Band5 810, while a part of the Band26 820 does not overlap with the Band5 810. In some implementations, a DSDA manager may access a band conflict table to determine that all RF channels in the Band26 820 conflict with RF channels in the Band5 810. But it may conduct a finer analysis and determine that some of RF channels in the Band26 820 do not conflict with some RF channels in the Band5 810. In the illustrated example, the Band5 810 is divided into the subband-A 830a-b, the subband-B 832a-b, and the subband-C 834a-b. Part of the Band26 820 on the left side is designated as the subband-D 836a-b. Because a radio module operating in the Band26 820 covers the entire Band5 810, an RF channel in the subband-D 836a-b may experience a large interference from an RF channel in the subband-A 830a-b, subband-B 832a-b, or subband-C 834a-b. On the other hand, because a radio module operating in the Band5 810 does not need to cover RF channels in the subband-D 836a-b, an RF channel in the subband-A 830a-b, subband-B 832a-b, or subband-C 834a-b may experience less interference from an RF channel in the subband-D 836a-b.

Figure 9:
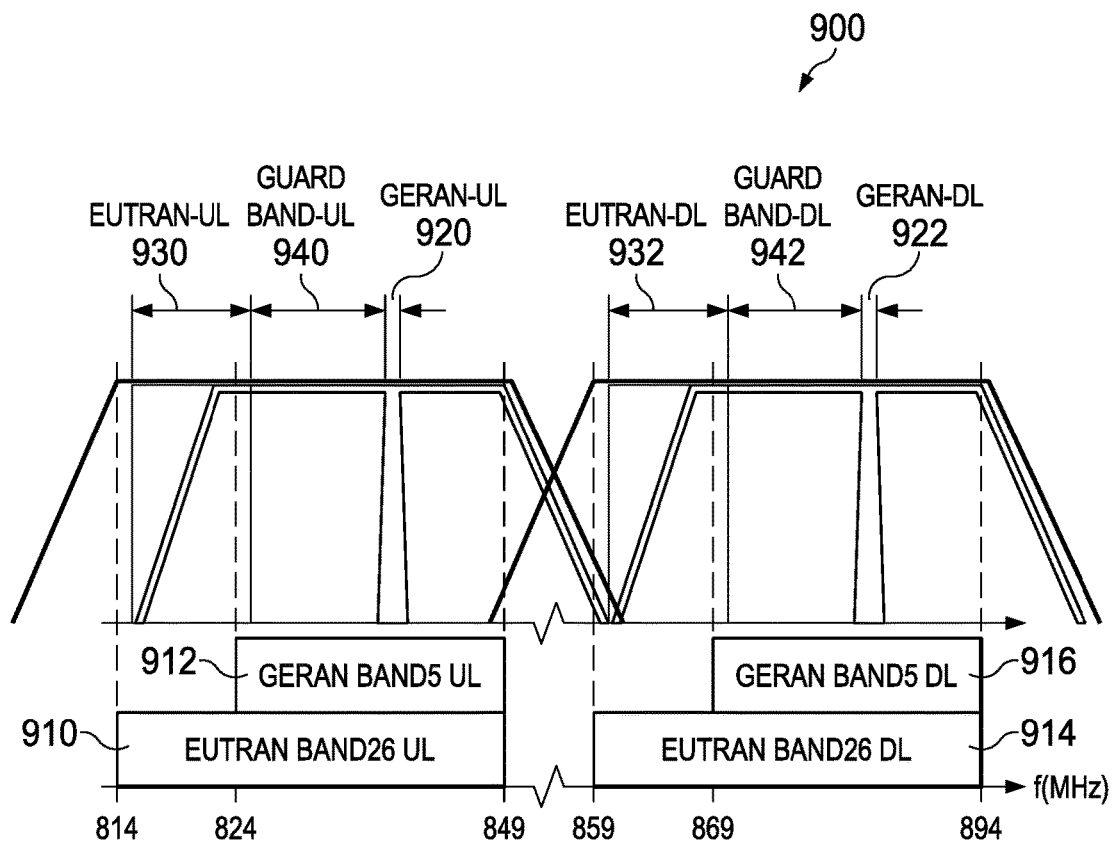
FIG. 9 is a schematic illustrating conflicting RF channels between a GERAN operating in Band5 and an EUTRAN operating in Band26.

FIG. 9 is a schematic 900 illustrating conflicting channels between a GERAN operating in Band5 and an EUTRAN operating in Band26. As described previously, in some implementations, although Band5 and Band26 overlap, some RF channels in Band26 may not conflict with some RF channels in Band5. The UE may determine whether two RF channels conflict with each other based on parameters such as transceiver chain isolation, channel bandwidths of the RANs, filter characteristics, and guard band requirements, so a DSDA manager may fine tune its conflict determination process and enables radio modules to use a wider range of RF channels with their respective RANs.

In the illustrated example, a UE communicates with a GERAN on an RF channel in the GERAN Band5-UL 912 and the GERAN Band5-DL 916. The UE also communicates with an EUTRAN on an RF channel in the EUTRAN Band26-UL 910 and the EUTRAN Band26-DL 914. In the illustrated example, a UE transmits to a GERAN on the RF channel GERAN-UL 920. The UE receives from the GERAN on the RF channel GERAN-DL 922. The GERAN-UL 920 resides in the GERAN Band5-UL 912, and the GERAN-DL 922 resides in the GERAN Band5-DL 916. Both the GERAN-UL 920 and GERAN-DL 922 have a channel bandwidth of 0.2 MHz. In the illustrated example, the UE may set a guard band-UL 940 on both sides of the GERAN-UL 920. The UE may allocate the remaining part of the EURAN Band26-UL 910 to the EUTRAN-UL 930. An RF channel in the guard band-UL 940 conflicts with the GERAN-UL 920. On the other hand, an RF channel in the EUTRAN-UL 930 does not conflict with the GERAN-UL 920 because it is outside of the guard band. Similarly, the UE may set a guard band-DL 942 on both sides of the DERAN-DL 922. The UE may allocate the remaining part of the EURAN Band26-DL 914 to the EUTRAN-DL 932. An RF channel in the guard band-DL 932 conflicts with the GERAN-DL 922. On the other hand, an RF channel in the EUTRAN-DL 932 does not conflict with the GERAN-DL 922 because it is outside of the guard band.

Figure 10:
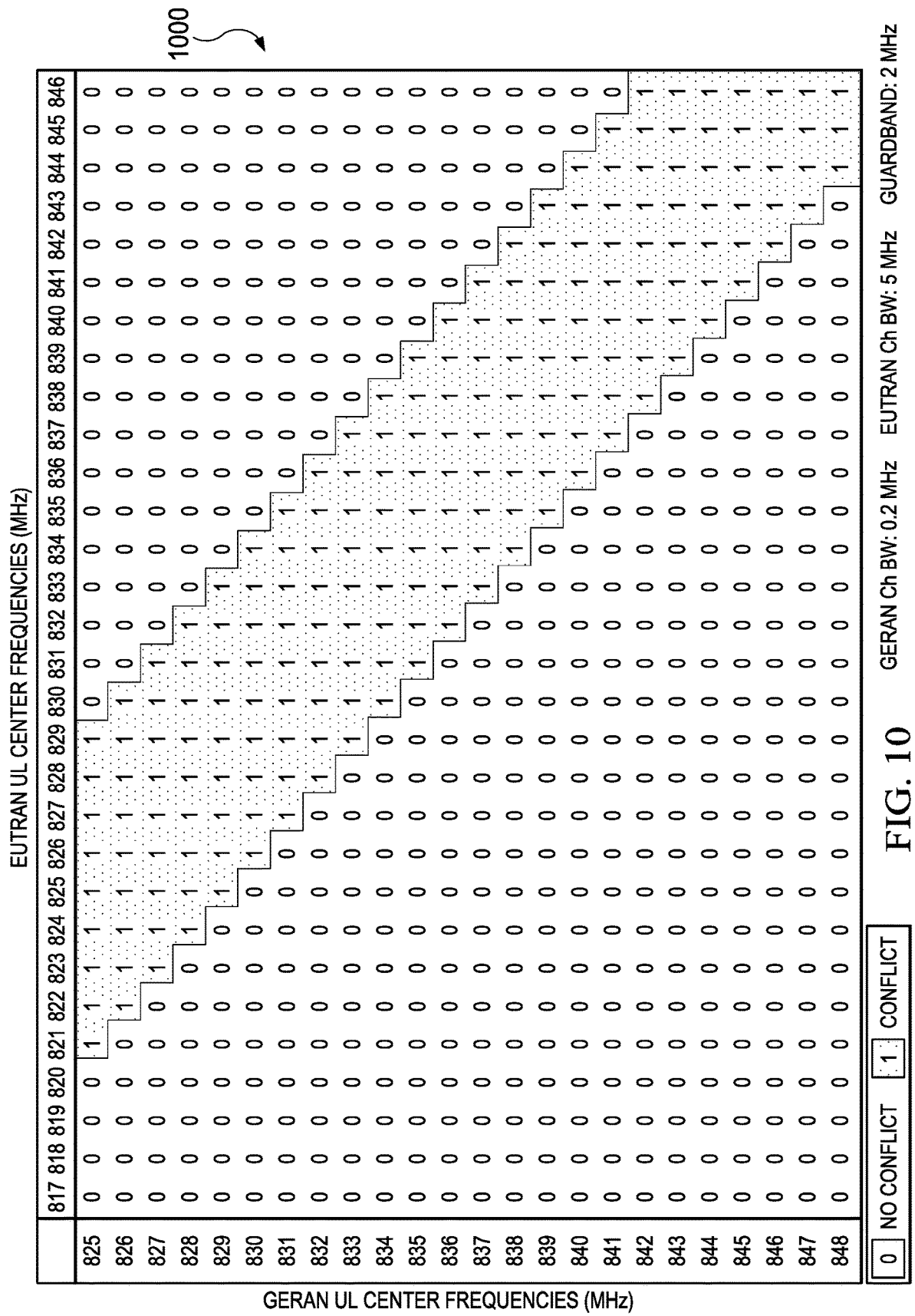
FIG. 10 is an example channel conflict table for a GERAN operating in Band5, an EUTRAN operating in Band26 with 5 MHz channel bandwidth, and 2 MHz guard band.

FIG. 10 illustrates an example channel conflict table 1000. In some implementations, a UE may use one or more channel conflict tables to store conflict information of RF channels for bands that may conflict with each other. The channel conflict table 1000 indicates the conflict information for a GERAN operating in Band5, an EUTRAN operating in Band26 with 5 MHz channel bandwidth, and 2 MHz guard band. In the illustrated example, each row of the channel conflict table 800 represents an UL center frequency allocation for the GERAN in unit of MHz. Each column of the channel conflict table 1000 represents an UL center frequency allocation for the EUTRAN UL in unit of MHz. Each entry in the channel conflict table 1000 indicates whether an RF channel allocated in a frequency indicated by the row number conflicts with an RF channel allocated in a frequency indicated by the column number. In the illustrated example, an entry of "1" indicates that the two RF channels conflict with each other. An entry of "0" indicates that the two RF channels do not conflict with each other. For example, at row-825, the entries under columns 817-820 and columns 830-846 are "0," while the entries under columns 821-829 are "1." Therefore if a UE communicates with a GERAN using an RF channel with an UL center frequency of 825 MHz, communication with an EUTRAN on any RF channels with an UL center frequency from 821 MHz to 829 MHz will result in a conflict. On the other hand, the UE may communicate with an EUTRAN on an RF channel with an UL center frequency from 817 MHz to 820 MHz, or from 830 MHz to 846 MHz. These RF channels do not conflict with the RF channel used to communicate with the GERAN.

A UE may consider both the DL and UL frequencies when it generates the channel conflict table 1000. In some implementations, the UE may use a channel numbering scheme to index the tables instead of using frequency allocation. Examples of these channel numbering schemes include Absolute Radio Frequency Channel Number (ARFCN), UTRA Absolute Radio Frequency Channel Number (UARFCN), and EUTRA Absolute Radio Frequency Channel Number (EARFCN). In some implementations, the UE may use interpolation to determine conflict information for frequencies not listed in the channel conflict table 1000.

Figure 11:
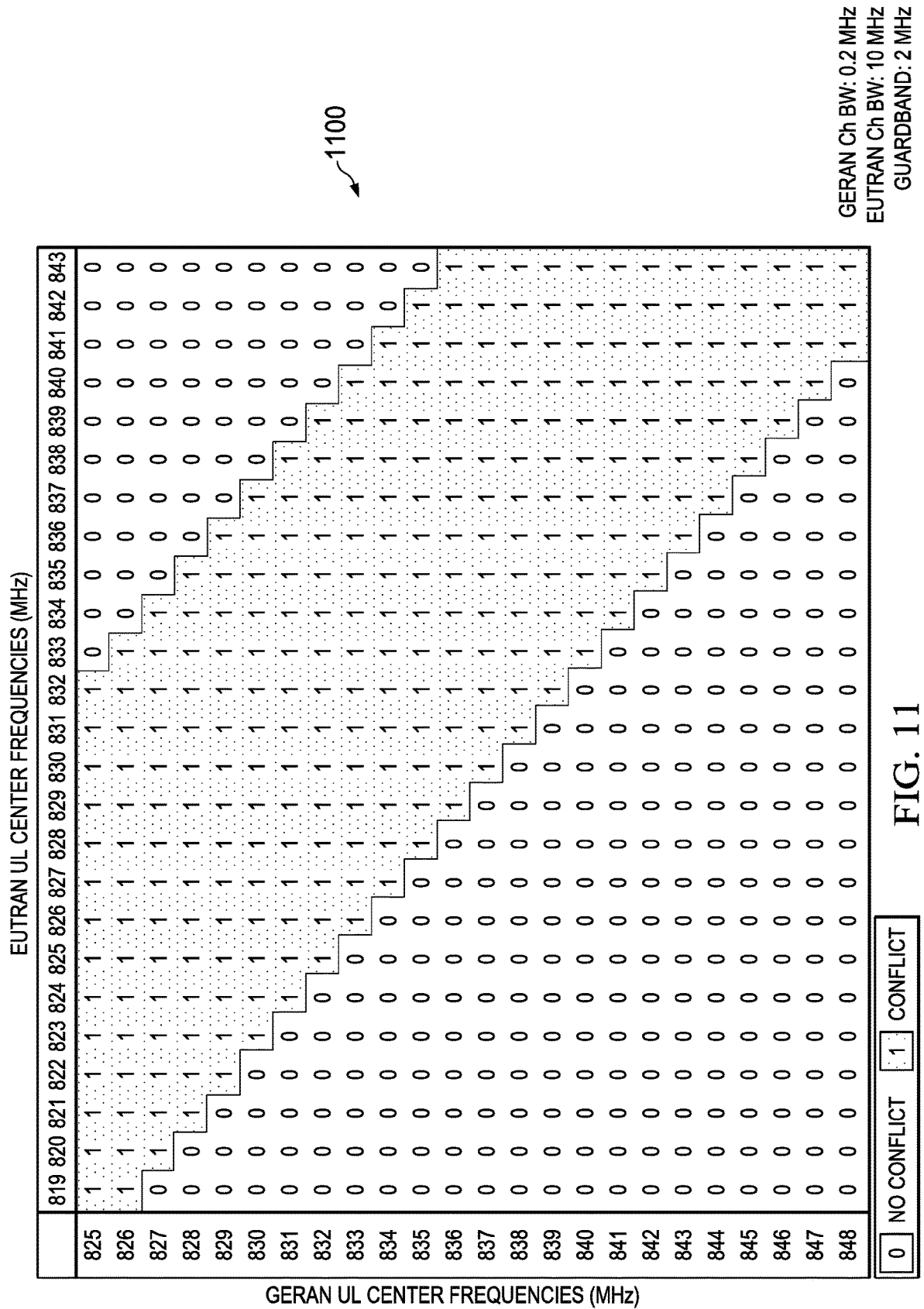
FIG. 11 is an example channel conflict table for a GERAN operating in Band5, an EUTRAN operating in Band26 with 10 MHz channel bandwidth, and 2 MHz guard band.

FIG. 11 illustrates another example channel conflict table 1100. The channel conflict table 1100 indicates the conflict information for a GERAN operating in Band5, an EUTRAN operating in Band26 with 10 MHz channel bandwidth, and 2 MHz guard band. This example shows that as the EUTRAN channel bandwidth increases from 5 MHz to 10 MHz, more RF channels used by the EUTRAN may conflict with a RF channel used by the GERAN. For example, at row-825, the entries under columns 833-843 are "0," while the entries under columns 819-832 are "1." Therefore if a UE communicates with a GERAN using an RF channel with an UL center frequency in 825 MHz, any RF channels for communication with an EUTRAN with an UL center frequency from 819 MHz to 832 MHz will result in a conflict. The number of columns in the channel conflict table 1000 is less than the channel conflict table 900 because as the bandwidth of the EUTRAN increases, the available allocation for UL center frequency of the EUTRAN decreases.

Figure 12:
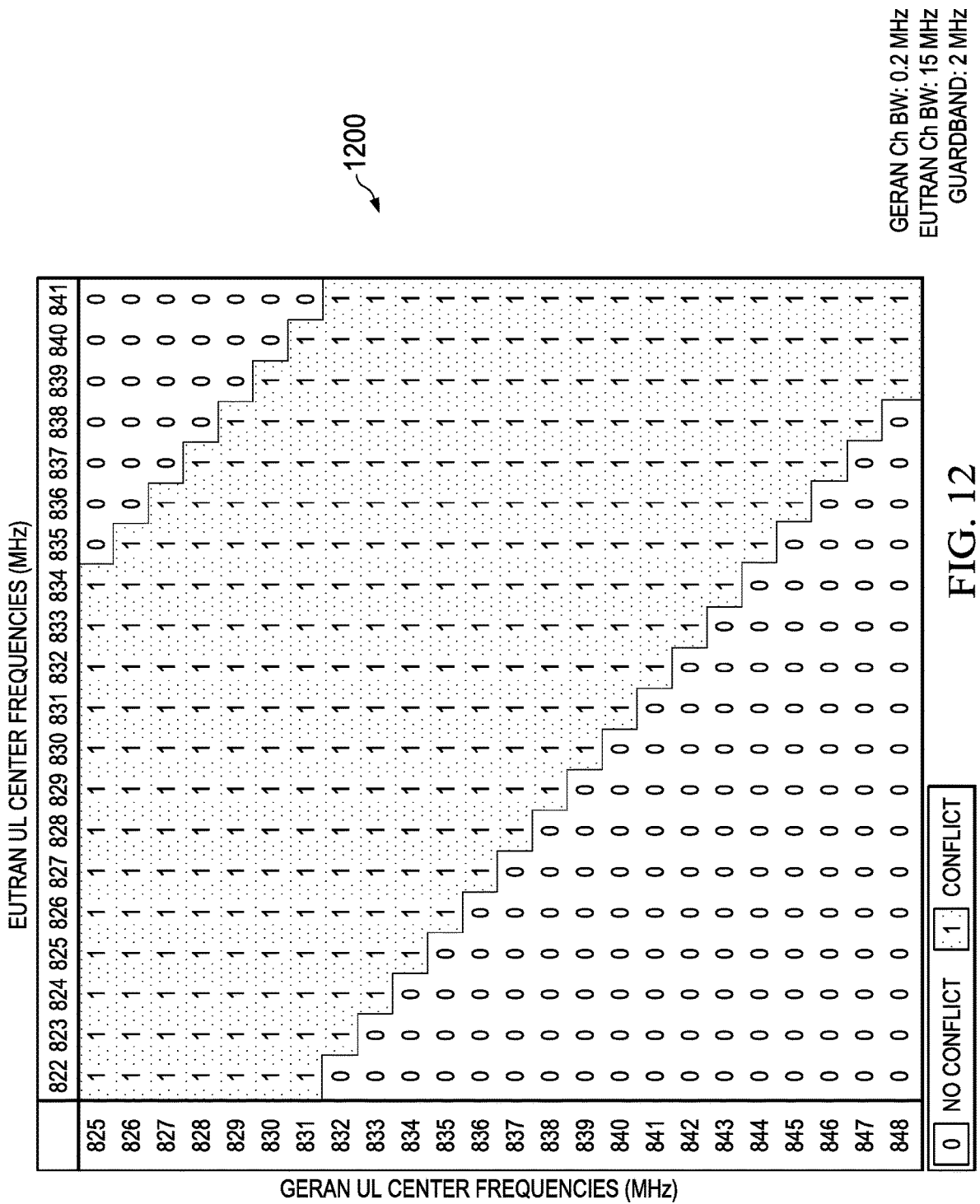
FIG. 12 is an example channel conflict table for a GERAN operating in Band5, an EUTRAN operating in Band26 with 15 MHz channel bandwidth, and 2 MHz guard band.

FIG. 12 illustrates a channel conflict table 1200 that indicates the conflict information for a GERAN operating in Band5, an EUTRAN operating in Band26 with 15 MHz channel bandwidth, and 2 MHz guard band. The example shows that as the EUTRAN channel bandwidth continues to increase, more RF channels used by the EUTRAN may conflicts with a RF channel used by the GERAN. For example, at row-825, the entries under columns 835-841 are "0," while the entries under columns 822-834 are "1." Therefore if a UE communicates with a GERAN using an RF channel with an UL center frequency in 825 MHz, any RF channels for communication with an EUTRAN with an UL center frequency from 822 MHz to 834 MHz will result in a conflict.

Figure 13:
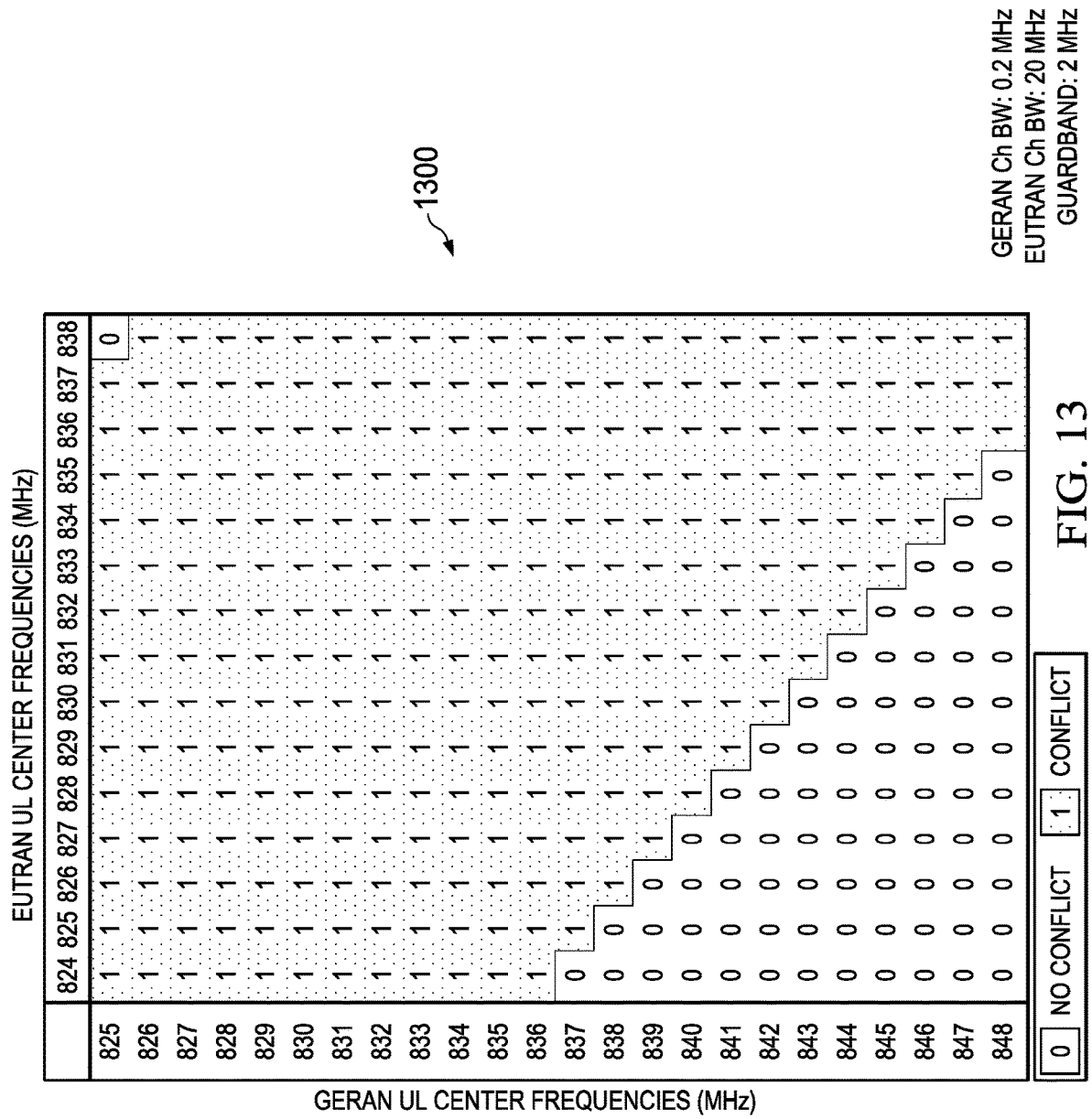
FIG. 13 is an example channel conflict table for a GERAN operating in Band5, an EUTRAN operating in Band26 with 20 MHz channel bandwidth, and 2 MHz guard band.

FIG. 13 illustrates a channel conflict table 1300 that indicates the conflict information for a GERAN operating in Band5, an EUTRAN operating in Band26 with 20 MHz channel bandwidth, and 2 MHz guard band. The example further shows that as the EUTRAN channel bandwidth continues to increase, more RF channels used by the EUTRAN may conflicts with the RF channels used by the GERAN.

Figure 14:
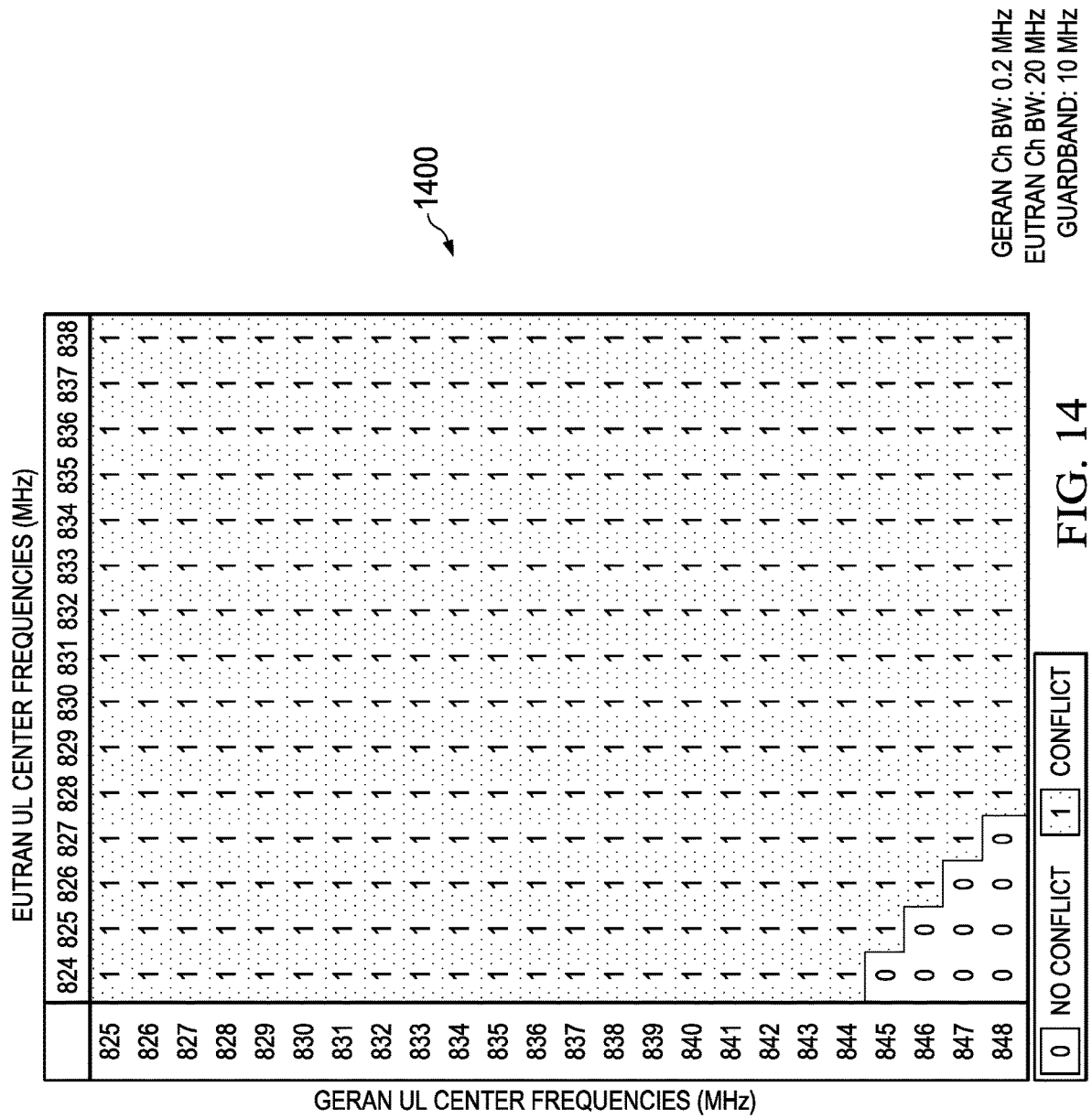
FIG. 14 is an example channel conflict table for a GERAN operating in Band5, an EUTRAN operating in Band26 with 20 MHz channel bandwidth, and 10 MHz guard band.

FIG. 14 illustrates a channel conflict table 1400 that indicates the conflict information for a GERAN operating in Band5, an EUTRAN operating in Band26 with 20 MHz channel bandwidth, and 10 MHz guard band. This example shows that as the guard band increases, more RF channels used by the EUTRAN may conflicts with the RF channels used by the GERAN. For example, at row-825, all the entries are "1." Therefore if a UE communicates with a GERAN using an RF channel with an UL center frequency in 825 MHz, all RF channels for communication with an EUTRAN in Band26 will result in a conflict.

Figure 15:
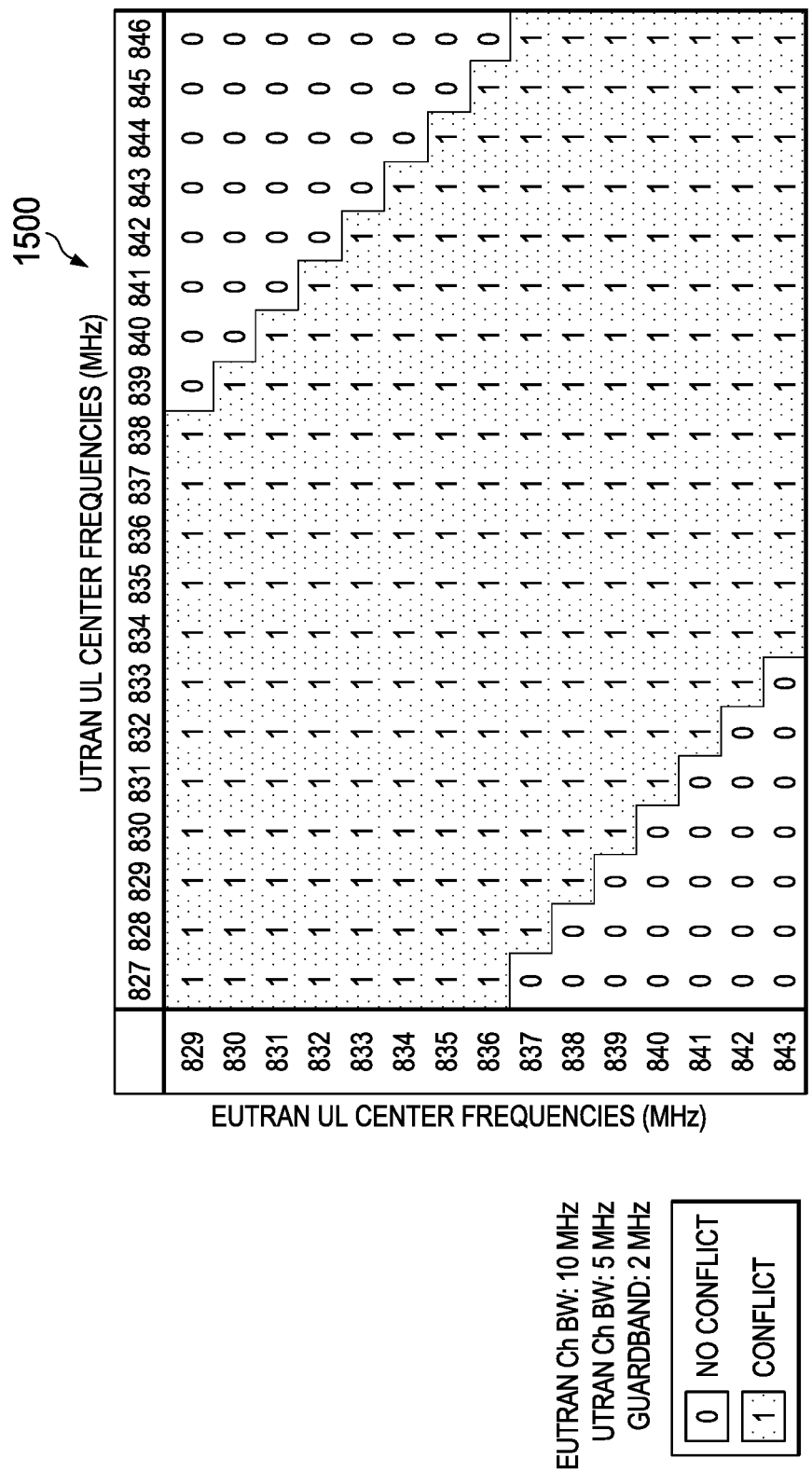
FIG. 15 is an example channel conflict table for an EUTRAN operating in Band5 with 10 MHz channel bandwidth, a UTRAN operating in Band5 with 5 MHz channel bandwidth, and 2 MHz guard band.
Figure 16A:
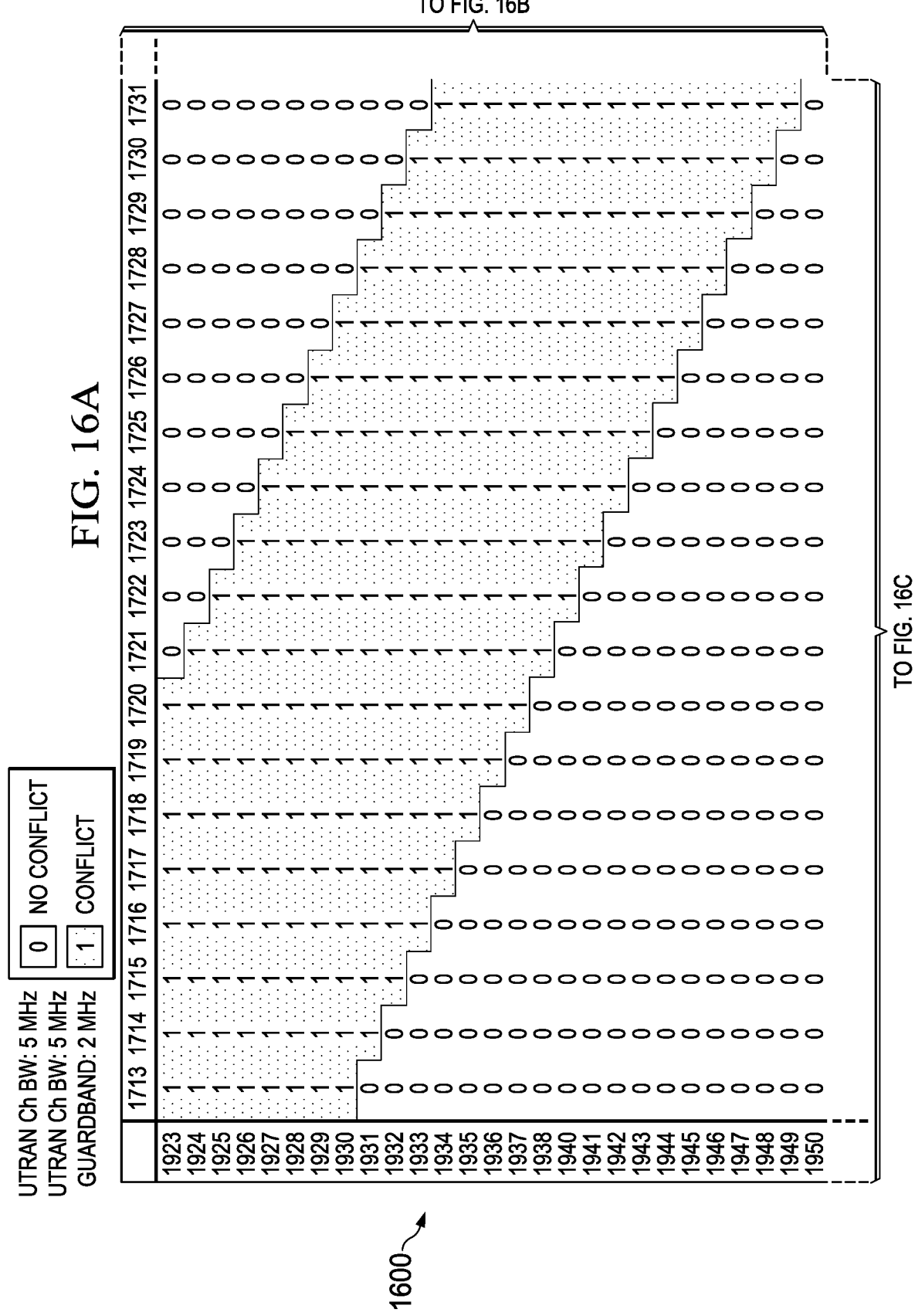
Figure 16B:
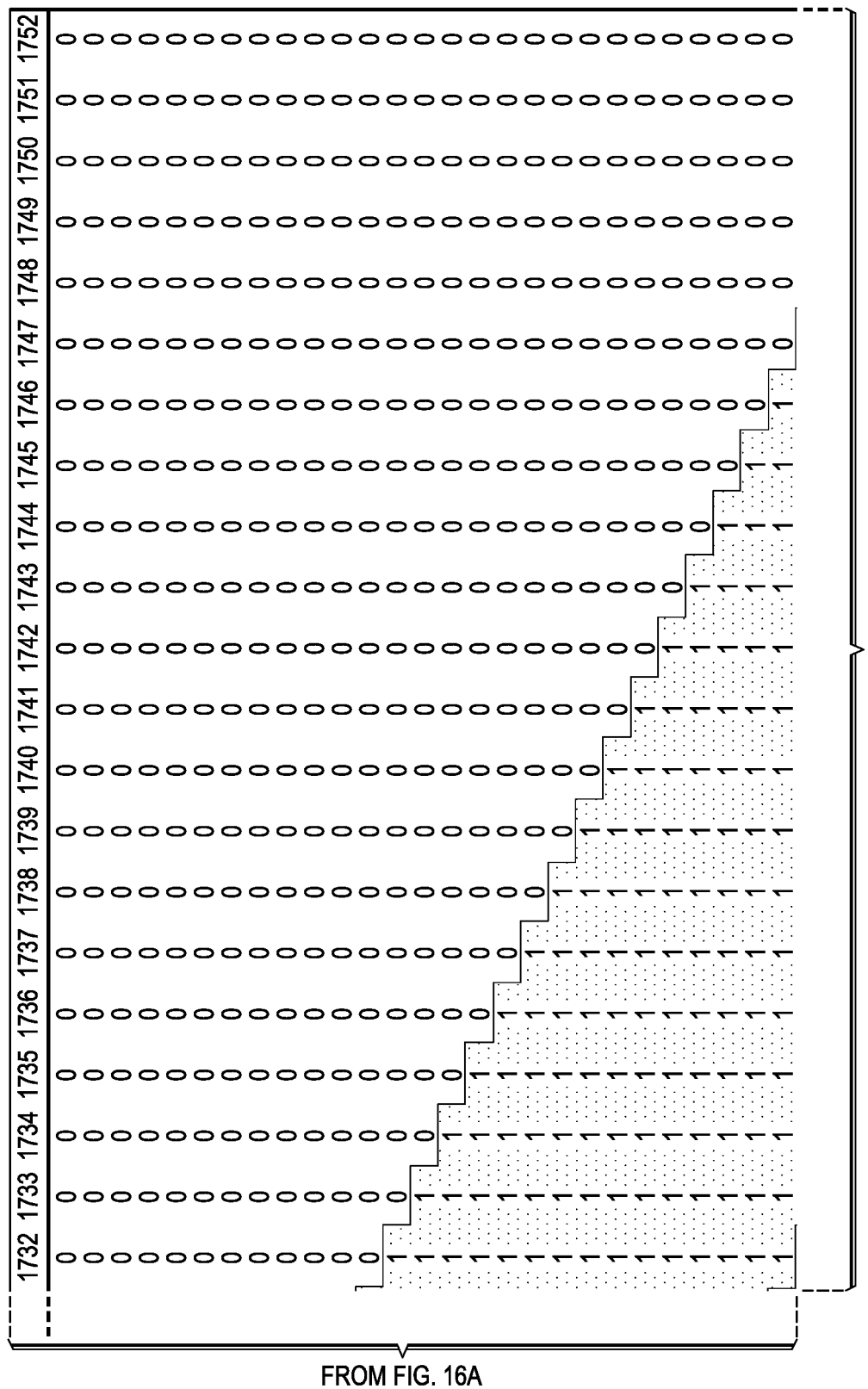
Figure 17A:
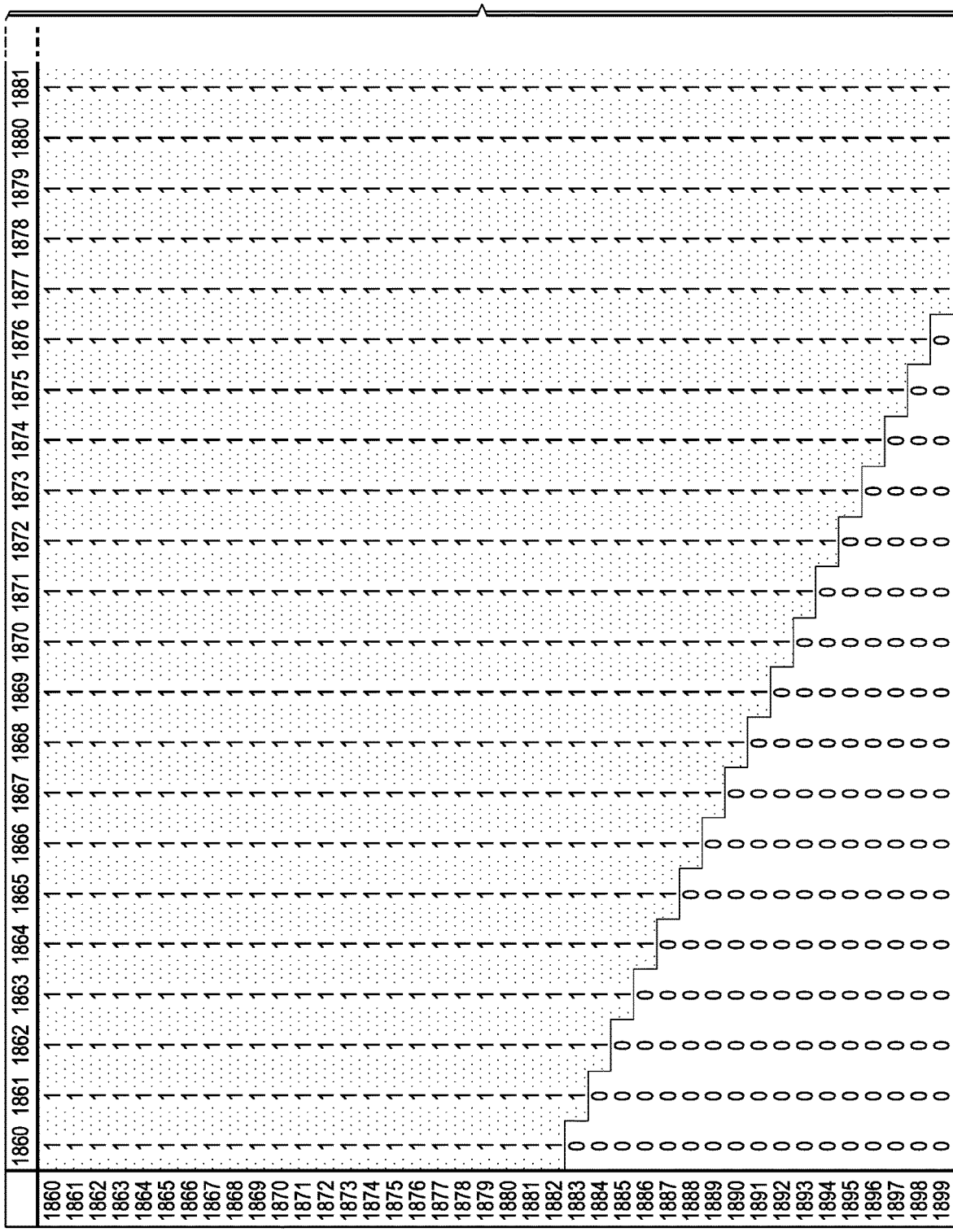
FIGS. 17A-17B are an example channel conflict table for two EUTRANs operating in Band2 with 20 MHz channel bandwidth and 2 MHz guard band.
Figure 17B:
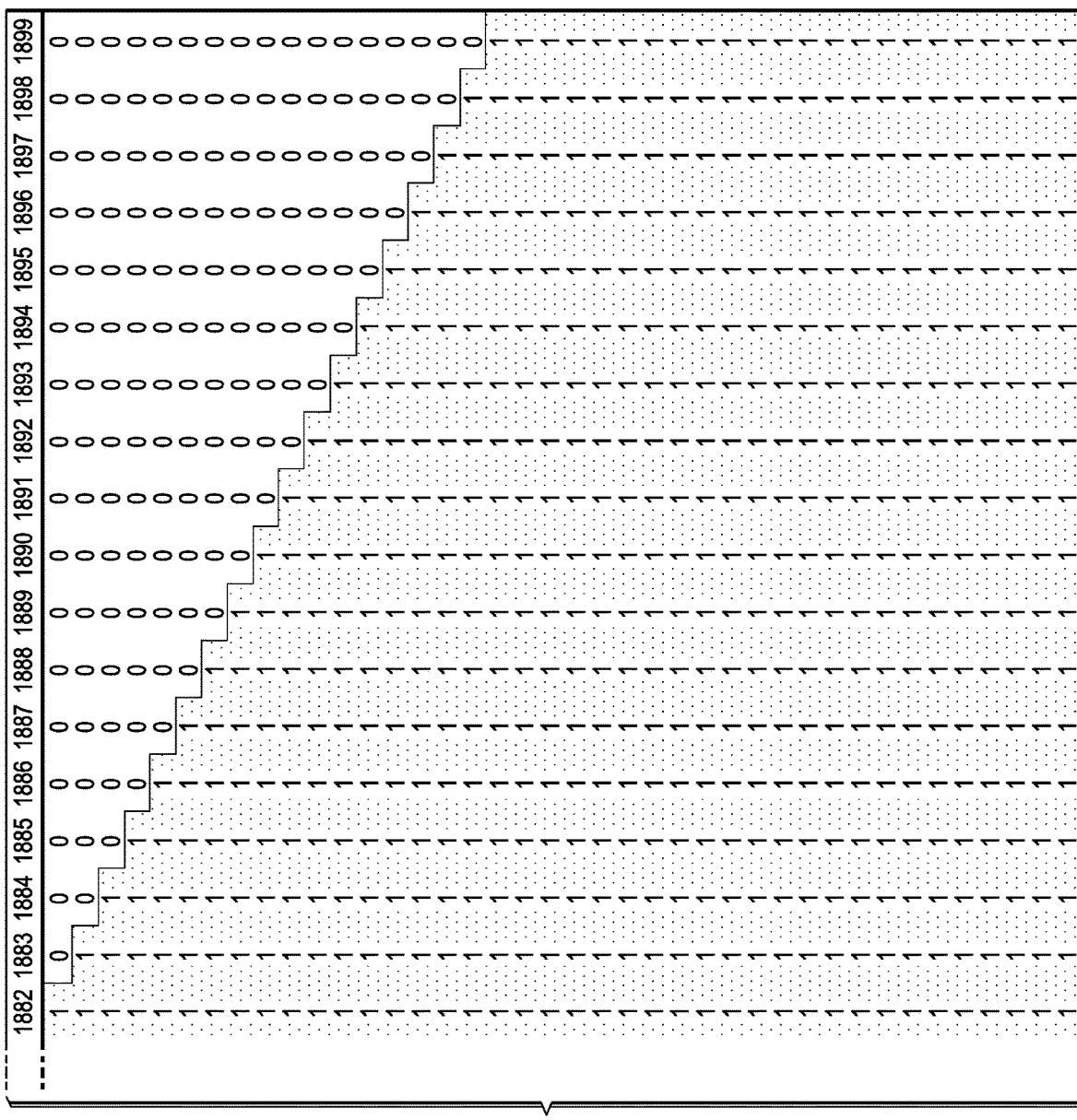

A manufacturer of the UE may create channel conflict tables based on other combinations of RATs, bands, bandwidths, and guard band requirements. As an example of inter-RAT and intra-Band combinations, FIG. 15 illustrates an example channel conflict table 1500 for an EUTRAN operating in Band5 with 20 MHz channel bandwidth, a UTRAN operating in Band5 with 5 MHz channel bandwidth, and 2 MHz guard band. Similarly, as an example of intra-RAT and inter-Band combination, FIGS. 16A-16D illustrate an example channel conflict table 1600 for a UTRAN operating in Band1 with 5 MHz channel bandwidth, a UTRAN operating in Band4 with 5 MHz channel bandwidth, and 2 MHz guard band. Furthermore, as an example of intra-RAT and intra-Band combinations, FIGS.

17A-17B illustrate an example channel conflict table 1700 for two EUTRANs operating in Band2 with 20 MHz channel bandwidth and 2 MHz guard band.

Figure 18:
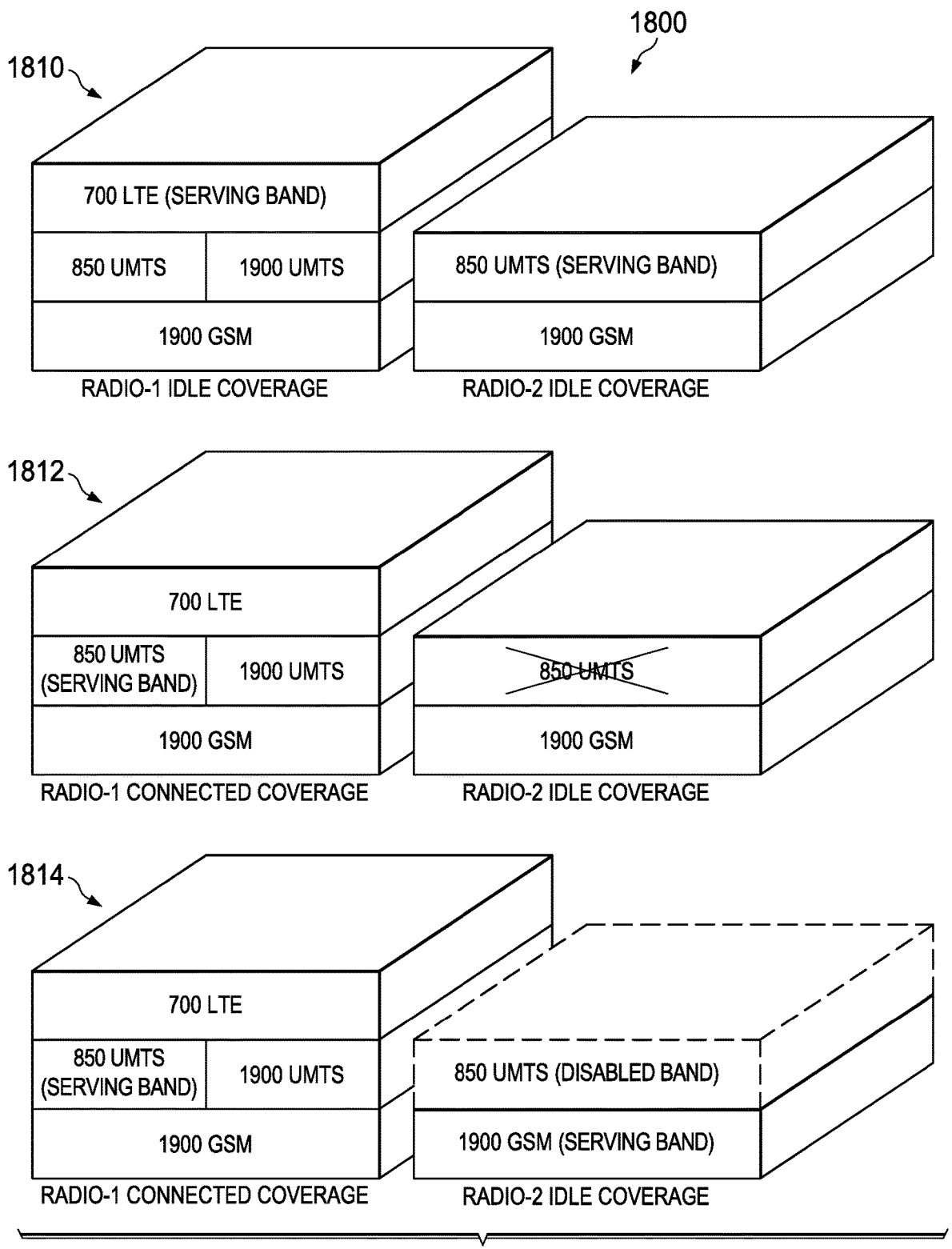
FIG. 18 is a schematic illustrating step actions for dynamically managing band capability between multiple RANs.

FIG. 18 is a schematic 1800 illustrating step actions for dynamically managing band capability between multiple RANs. In the illustrated example, a UE has a radio-1 module and a radio-2 module. At step 1810, the radio-1 module use 700 MHz LTE band as a serving band. The radio-2 module uses 850 MHz UMTS band as a serving band. The DSDA manager may determine that there are no conflicts between the two radio modules. At step 1812, the radio-1 module receives a call and moves to 850 MHz UMTS band as part of Circuit Switched fallback. The radio-1 module may also move to 850 MHz UMTS band for handover. The DSDA manager determines that there is a conflict and instructs the radio-2 module to disable its support for 850 MHz UMTS band. At step 1814, the radio-2 module disables 850 MHz UMTS band and re-selects to 1900 MHz GSM band as its serving band.

Figure 19:
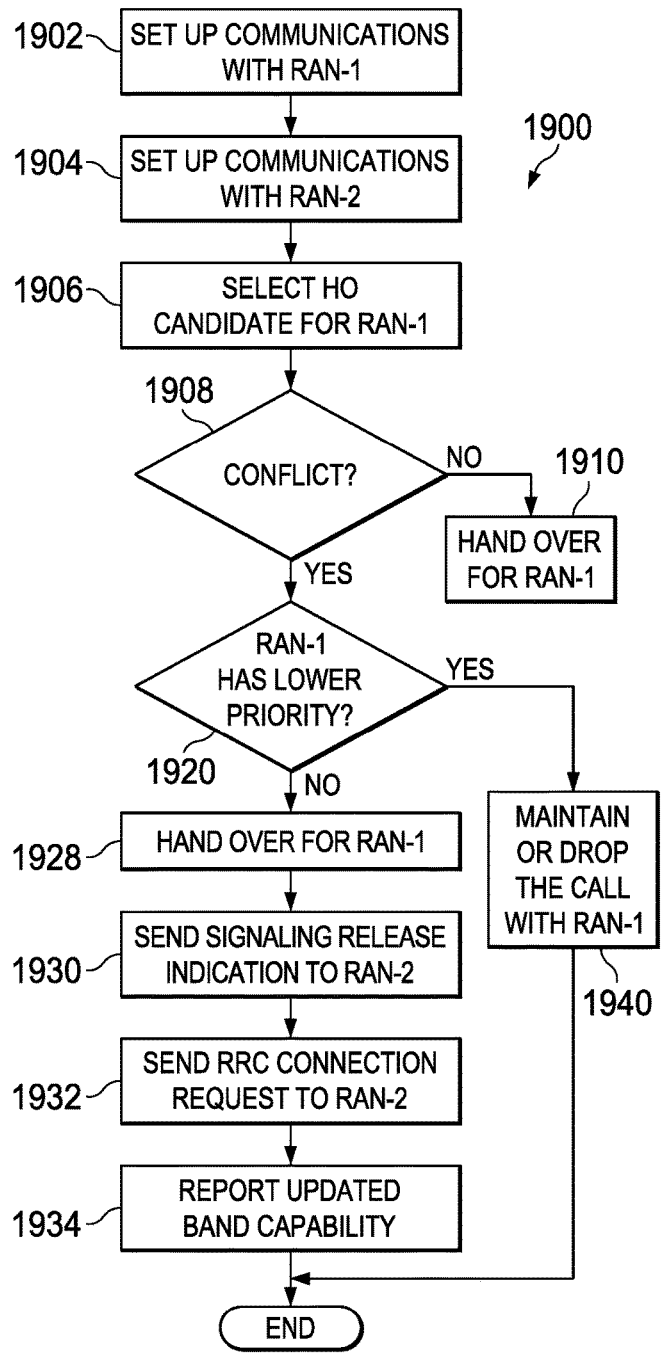
FIG. 19 is a flowchart illustrating an example dynamic band capability managing process at a UE communicating with two RANs.

FIG. 19 is a flowchart 1900 illustrating a dynamic band capacity managing process for a UE that communicates with two RANs. The flowchart 1900 begins at step 1902 where the UE sets up communications with RAN-1 on a first RF channel. At step 1904, the UE sets up communications with RAN-2 on a second RF channel. At step 1906, the UE selects a third RF channel as a handover candidate in response to an indication from RAN-1. In some implementations, the indication may be a request from the serving RAN for a measurement report. At step 1908, the UE determines whether the third RF channel conflicts with the second RF channel. The UE may determine whether the RF channels conflict by looking up a band conflict table. The UE may also determine whether the RF channels conflict by looking up a channel conflict table. The UE may generate channel conflict tables based on the channel bandwidth of the RANs. The UE may also generate channel conflict tables based on a guard band requirement. If the third RF channel does not conflict with the second RF channel, at step 1910, the UE handover to the third RF channel with RAN-1. If the third RF channel conflicts with the second RF channel, at step 1920, the UE determines the relative priorities of the two RANs based on usage scenarios of the two RANs. In the illustrated example, if the UE determines that RAN-1 has a higher priority than RAN-2, or that RAN-1 has the same priority as RAN-2, at step 1928, the UE handover to the third RF channel with RAN-1. At step 1930, the UE disables the band that includes the second RF channel with RAN-2. In the illustrated example, the UE disables the band by sending a signaling connection release indication to RAN-2. The UE may transmit the signaling connection release indication using RRC messages. At step 1932, the UE sends a RRC connection request to RAN-2 on a different band to re-establish the connection with RAN-2. At step 1934, the UE reports updated band capability to RAN-1, RAN-2, or both. If the UE determines that RAN-2 has a higher priority, at step 1940 the UE may drop the call with RAN-1 or maintain the call with RAN-1 on the first RF channel.

Figure 20:
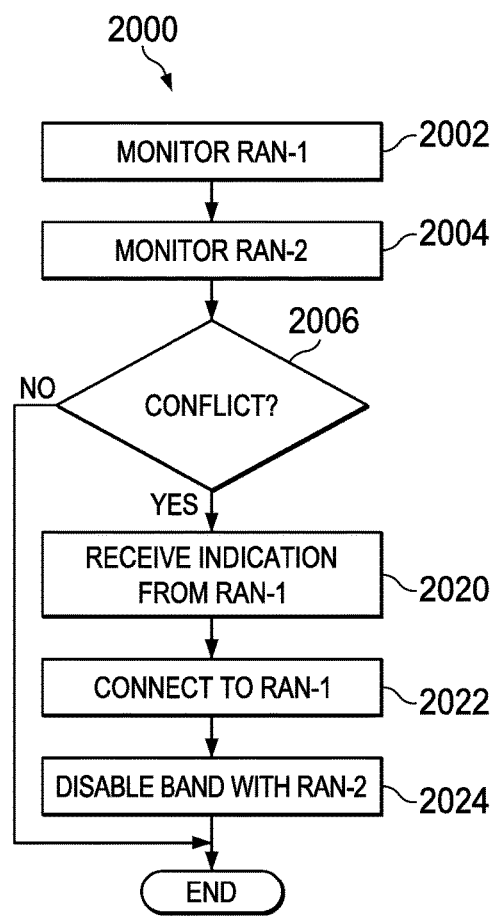
FIG. 20 is a flowchart illustrating an example dynamic band capability managing process at a UE monitoring two RANs.

FIG. 20 is a flowchart 2000 illustrating a dynamic band capacity managing process for a UE that monitors two RANs. The flowchart 2000 begins at step 2002 where the UE monitors RAN-1 on a first RF channel. At step 2004, the UE monitors RAN-2 on a second RF channel. At step 2006, the UE determines that the first RF channel conflicts with the second RF channel. The UE may determine whether the RF channels conflict by looking up a band conflict table or a channel conflict table. If there is a conflict, at step 2020, the UE may receive an indication from RAN-1 to establish a RRC connection with RAN-1 on the first RF channel. At step 2022, the UE connects to RAN-1 on the first RF channel. At step 2024, the UE disables the band that includes the second RF channel with RAN-2.

A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable y one skilled in the art and could be made without departing form the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps are not implied by the order they appear in the claims.

What is claimed is:

1. A method, comprising:
    camping on a first radio access network (RAN) on a first Radio Frequency (RF) channel using a first receiver and transmitter and a second RAN on a second RF channel using a second receiver and transmitter;
    determining, by a user equipment (UE) and based on a stored channel conflict table, that the first RF channel conflicts with the second RF channel, wherein the channel conflict table includes conflict information indicating whether one or more RF channels in a first frequency band conflicts with one or more RF channels in a second frequency band, and the first frequency band overlaps with the second frequency band, and wherein the conflict table is constructed based on at least one of a channel bandwidth of the first RAN, a channel bandwidth of the second RAN, and a guard band requirement;
    receiving, by the UE, an indication from the first RAN to establish a radio connection on the first RF channel using the first receiver and transmitter; and
    in response to the UE determining that the first RF channel conflicts with the second RF channel based on the stored channel conflict table and receiving the indication from the first RAN to establish the radio connection on the first RF channel:
connecting, by the UE, to the first RAN on the first RF channel using the first receiver and transmitter; and
disabling, by the UE and based on the stored channel conflict table, a frequency band of the second receiver and transmitter, wherein the frequency band includes the second RF channel with the second RAN.

2. The method of claim 1, wherein the camping is performed in a Radio Resource Control (RRC) Idle state.

3. The method of claim 1, wherein the determination includes using a band conflict table.

4. The method of claim 1, wherein the first RAN and second RAN comprise different types of radio access technologies.

5. The method of claim 1, wherein the first RAN is a UMTS Terrestrial Radio Access Network (UTRAN).

6. A user equipment (UE), comprising:
a first receiver and transmitter configured to camp on a first radio access network (RAN) on a first Radio Frequency (RF) channel;
a second receiver and transmitter configured to camp on a second RAN on a second RF channel; and
one or more processors configured to:
determine, by the UE and based on a stored channel conflict table, that the first RF channel conflicts with the second RF channel, wherein the channel conflict table includes conflict information indicating whether one or more RF channels in a first frequency band conflicts with one or more RF channels in a second frequency band, and the first frequency band overlaps with the second frequency band, and wherein the conflict table is constructed based on at least one of a channel bandwidth of the first RAN, a channel bandwidth of the second RAN, and a guard band requirement;
receive, by the UE, an indication from the first RAN to establish a radio connection on the first RF channel using the first receiver and transmitter; and
in response to the UE determining that the first RF channel conflicts with the second RF channel based on the stored channel conflict table and receiving the indication from the first RAN to establish the radio connection on the first RF channel:
connect, by the UE, to the first RAN on the first RF channel using the first receiver and transmitter; and
disable, by the UE and based on the stored channel conflict table, a frequency band of the second receiver and transmitter, wherein the frequency band includes the second RF channel with the second RAN.

7. The UE of claim 6, wherein the camping is performed in a Radio Resource Control (RRC) Idle state.

8. The UE of claim 6, wherein the determination includes using a band conflict table.

9. The UE of claim 6, wherein the first RAN and the second RAN comprise different types of radio access technologies.

10. The UE of claim 6, wherein the first RAN is a UMTS Terrestrial Radio Access Network (UTRAN).

11. An apparatus comprising instructions embodied on a tangible, non-transitory computer-readable medium, the instructions operable when executed to cause a computing system to perform operations comprising:
camping on a first radio access network (RAN) on a first Radio Frequency (RF) channel using a first receiver and transmitter and a second RAN on a second RF channel using a second receiver and transmitter;
determining, by a user equipment (UE) and based on a stored channel conflict table, that the first RF channel conflicts with the second RF channel, wherein the channel conflict table includes conflict information indicating whether one or more RF channels in a first frequency band conflicts with one or more RF channels in a second frequency band, and the first frequency band overlaps with the second frequency band, and wherein the conflict table is constructed based on at least one of a channel bandwidth of the first RAN, a channel bandwidth of the second RAN, and a guard band requirement;
receiving, by the UE, an indication from the first RAN to establish a radio connection on the first RF channel using the first receiver and transmitter; and
in response to the UE determining that the first RF channel conflicts with the second RF channel based on the stored channel conflict table and receiving the indication from the first RAN to establish the radio connection on the first RF channel:
connecting, by the UE, to the first RAN on the first RF channel using the first receiver and transmitter; and
disabling, by the UE and based on the stored channel conflict table, a frequency band of the second receiver and transmitter, wherein the frequency band includes the second RF channel with the second RAN.

12. The apparatus of claim 11, wherein the camping is performed in a Radio Resource Control (RRC) Idle state.

13. The apparatus of claim 11, wherein the determination includes using a band conflict table.

14. The apparatus of claim 11, wherein the first RAN and the second RAN comprise different types of radio access technologies.

* * * * *